(12) United States Patent
Huang et al.

(10) Patent No.: US 12,137,449 B2
(45) Date of Patent: Nov. 5, 2024

(54) METHOD AND APPARATUS FOR TRANSMITTING UPLINK CONTROL INFORMATION IN A WIRELESS COMMUNICATION SYSTEM

(71) Applicant: ASUS Technology Licensing Inc., Taipei (TW)

(72) Inventors: Chun-Wei Huang, Taipei (TW); Yu-Hsuan Guo, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/519,190

(22) Filed: Nov. 27, 2023

(65) Prior Publication Data

US 2024/0107528 A1  Mar. 28, 2024

Related U.S. Application Data

(63) Continuation of application No. 18/215,204, filed on Jun. 28, 2023, now Pat. No. 11,877,281.

(60) Provisional application No. 63/356,560, filed on Jun. 29, 2022, provisional application No. 63/356,565, filed on Jun. 29, 2022, provisional application No. 63/356,554, filed on Jun. 29, 2022.

(51) Int. Cl.
*H04W 72/1268* (2023.01)
*H04L 1/1812* (2023.01)
*H04W 72/21* (2023.01)

(52) U.S. Cl.
CPC ....... *H04W 72/1268* (2013.01); *H04L 1/1812* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 11,595,981 | B2* | 2/2023 | Zhang | H04L 1/1819 |
| 11,617,195 | B2* | 3/2023 | Huang | H04L 5/0048 |
| | | | | 370/329 |
| 11,877,281 | B1* | 1/2024 | Huang | H04L 5/0055 |
| 2016/0183195 | A1* | 6/2016 | Gao | H04W 52/146 |
| | | | | 455/522 |
| 2019/0141696 | A1* | 5/2019 | Kim | H04L 5/0055 |
| 2019/0215823 | A1* | 7/2019 | Kim | H04L 1/0031 |
| 2019/0306841 | A1* | 10/2019 | Huang | H04L 5/0055 |
| 2021/0051671 | A1* | 2/2021 | Myung | H04W 72/21 |
| 2021/0092763 | A1* | 3/2021 | Li | H04W 72/569 |

(Continued)

*Primary Examiner* — Hassan A Phillips
*Assistant Examiner* — Gautam Sharma
(74) *Attorney, Agent, or Firm* — Cooper Legal Group LLC

(57) ABSTRACT

A method and apparatus are disclosed. In an example from the perspective of a User Equipment (UE), the UE receives one or more signals indicative of a first Physical Uplink Shared Channel (PUSCH) and a second PUSCH on a first cell and in a Transmission Time Interval (TTI). The UE determines to transmit a first Uplink Control Information (UCI) in the TTI, wherein the first UCI overlaps with the first PUSCH and the second PUSCH in time domain. The UE selects the first PUSCH for multiplexing the first UCI based on whether the UE is configured with joint Hybrid Automatic Repeat Request (HARQ) feedback mode or separate HARQ feedback mode. The UE transmits the first PUSCH and the second PUSCH on the first cell, wherein the first PUSCH transmitted on the first cell includes the first UCI.

20 Claims, 14 Drawing Sheets

(56) References Cited

U.S. PATENT DOCUMENTS

| | | | | |
|---|---|---|---|---|
| 2022/0167383 A1* | 5/2022 | Aiba | .................... | H04L 5/0053 |
| 2022/0287054 A1* | 9/2022 | Kim | .................... | H04W 72/569 |
| 2022/0394707 A1* | 12/2022 | Chen | .................... | H04L 5/0053 |
| 2023/0023982 A1* | 1/2023 | Kim | .......................... | H04L 1/08 |
| 2023/0067736 A1* | 3/2023 | Yang | .................... | H04W 72/12 |
| 2023/0275641 A1* | 8/2023 | Rosa | .................... | H04B 7/0695 |
| | | | | 375/267 |
| 2023/0397121 A1* | 12/2023 | Matsumura | ........... | H04W 72/12 |

* cited by examiner

1000

> DETERMINE ONE OF TWO OVERLAPPING CHANNELS IN TIME DOMAIN FOR UCI MULTIPLEXING, WHEREIN TWO OVERLAPPING CHANNELS HAVE SAME STARTING SYMBOL IN FIRST SERVING CELL, AND WHEREIN FIRST INDEX ASSOCIATED WITH FIRST CHANNEL OF TWO OVERLAPPING CHANNELS IS LOWER THAN SECOND INDEX ASSOCIATED WITH SECOND CHANNEL OF TWO OVERLAPPING CHANNELS ⎯ 1005

BASED ON THERE BEING TWO CONCURRENT PUSCHS/PUCCHS, THAT BOTH HAVE SAME STARTING SYMBOL, ON SERVING CELL FOR MULTIPLEXING UCI, MULTIPLEX AND/OR TRANSMIT UCI ON BOTH OF TWO CONCURRENT PUSCHS/PUCCHS ON SERVING CELL ⟵ 1105

FIG. 11

METHOD AND APPARATUS FOR TRANSMITTING UPLINK CONTROL INFORMATION IN A WIRELESS COMMUNICATION SYSTEM

CROSS-REFERENCE TO RELATED APPLICATIONS

The present application claims priority to and is a continuation of U.S. application Ser. No. 18/215,204, filed on Jun. 28, 2023, entitled "METHOD AND APPARATUS FOR TRANSMITTING UPLINK CONTROL INFORMATION IN A WIRELESS COMMUNICATION SYSTEM", which claims the benefit of U.S. Provisional Patent Application Ser. No. 63/356,560 filed on Jun. 29, 2022, claims the benefit of U.S. Provisional Patent Application Ser. No. 63/356,554 filed on Jun. 29, 2022, and also claims the benefit of U.S. Provisional Patent Application Ser. No. 63/356,565 filed on Jun. 29, 2022. The entire disclosure of U.S. application Ser. No. 18/215,204, U.S. Provisional Patent Application Ser. No. 63/356,560, U.S. Provisional Patent Application Ser. No. 63/356,554 and U.S. Provisional Patent Application Ser. No. 63/356,565 are incorporated herein in their entirety by reference.

FIELD

This disclosure generally relates to wireless communication networks, and more particularly, to a method and apparatus for transmitting uplink control information in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives one or more signals indicative of a first Physical Uplink Shared Channel (PUSCH) and a second PUSCH on a first cell and in a Transmission Time Interval (TTI). The UE determines to transmit a first Uplink Control Information (UCI) in the TTI, wherein the first UCI overlaps with the first PUSCH and the second PUSCH in time domain. The UE selects the first PUSCH for multiplexing the first UCI based on whether the UE is configured with joint Hybrid Automatic Repeat Request (HARQ) feedback mode or separate HARQ feedback mode. The UE transmits the first PUSCH and the second PUSCH on the first cell, wherein the first PUSCH transmitted on the first cell comprises the first UCI.

In an example from the perspective of a UE, the UE receives one or more signals indicative of a first PUSCH and a second PUSCH on a first cell and in a TTI. The UE determines to transmit a first Uplink Control Information (UCI) on the first cell in the TTI, wherein the first UCI overlaps with the first PUSCH and the second PUSCH in time domain. The UE selects the first PUSCH to comprise the first UCI based on whether the UE is configured with joint Hybrid Automatic Repeat Request (HARQ) feedback mode or separate HARQ feedback mode. The UE transmits the first PUSCH and the second PUSCH on the first cell, wherein the first PUSCH transmitted on the first cell comprises the first UCI.

BRIEF DESCRIPTION OF THE DRAWINGS

FIG. 10 is a flow chart according to one exemplary embodiment.

FIG. 11 is a flow chart according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: RP-213598, Samsung; 3GPP TS 38.213 V17.2.0 (2022-06) 3rd Generation Partnership Project; Technical Specification Group Radio Access Network; NR; Physical layer procedures for control (Release 17); 3GPP TS 38.214 V17.2.0 (2022-06) 3rd Generation Partnership Project; Technical Specification Group Radio Access Network; NR; Physical layer procedures for data (Release 17); 3GPP TS 38.331 V17.0.0 (2022-03) 3rd Generation Partnership Project; Technical Specification Group Radio Access Network; NR; Radio Resource Control (RRC) protocol specification (Release 17); 3GPP TS 38.212 V17.1.0 (2022-03) 3rd Generation Partnership Project; Technical Specification Group Radio Access Network; NR; Multiplexing and channel coding (Release 17); 3GPP TS 38.321 V17.0.0 (2022-03) 3rd Generation Partnership Project; Technical Specification Group Radio Access Network; NR; Medium Access Control (MAC) protocol specification (Release 17). The standards and documents listed above are hereby expressly incorporated by reference in their entirety.

Figure 1:
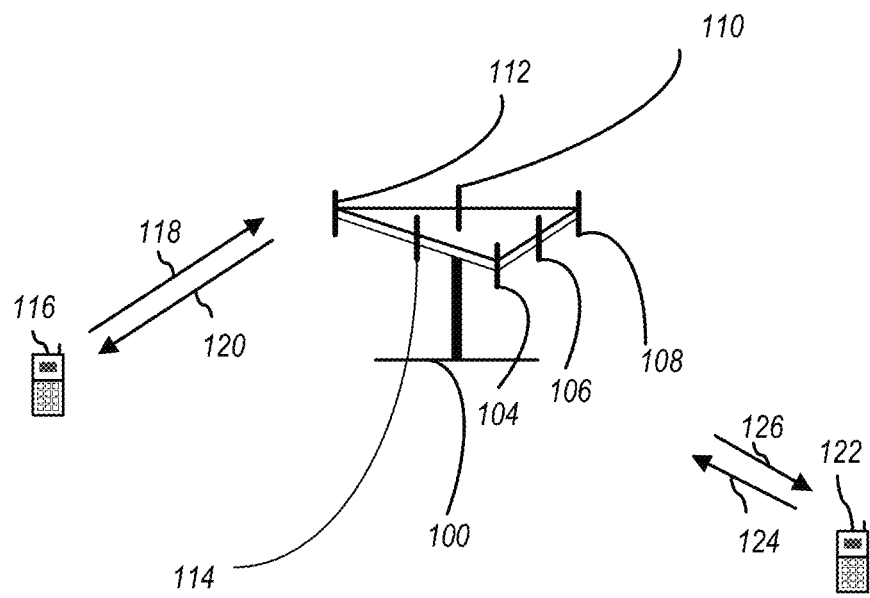
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
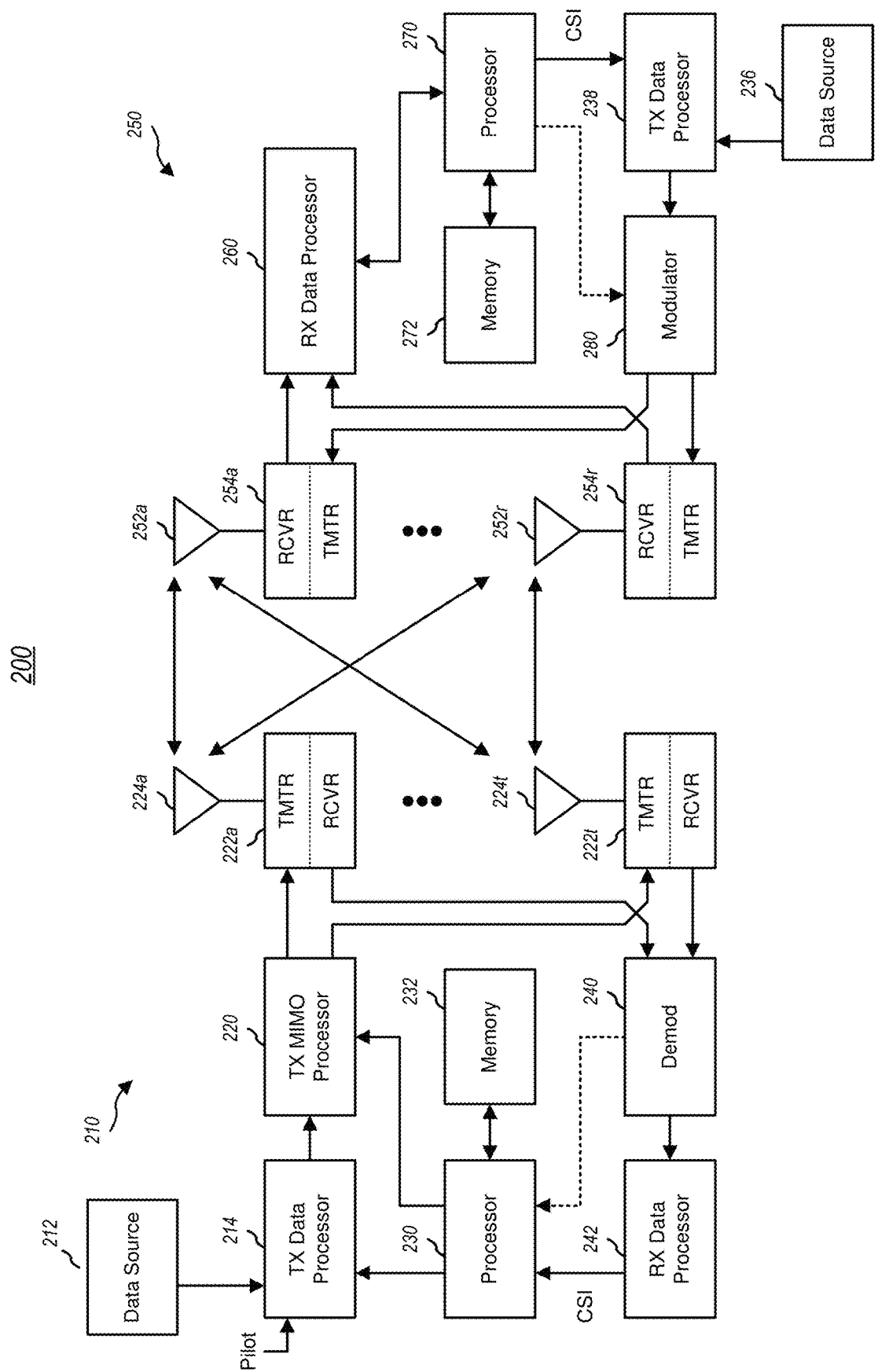
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
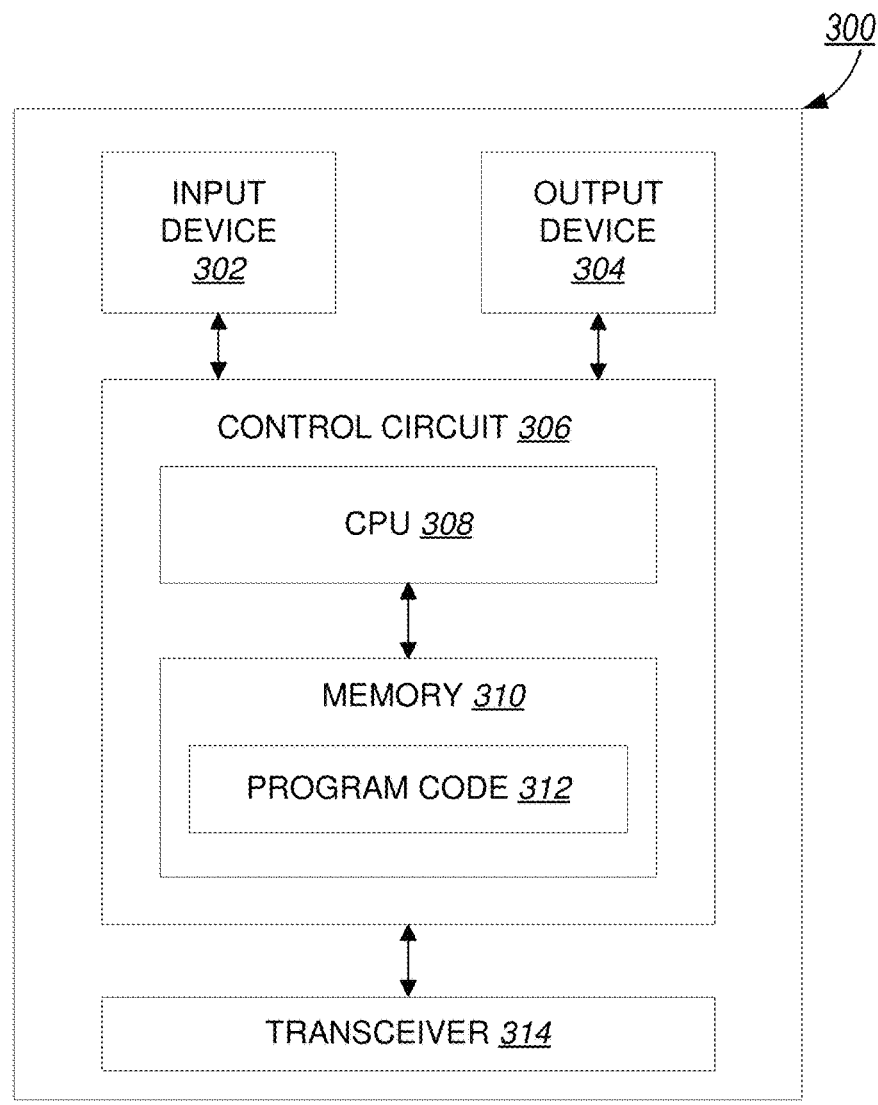
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
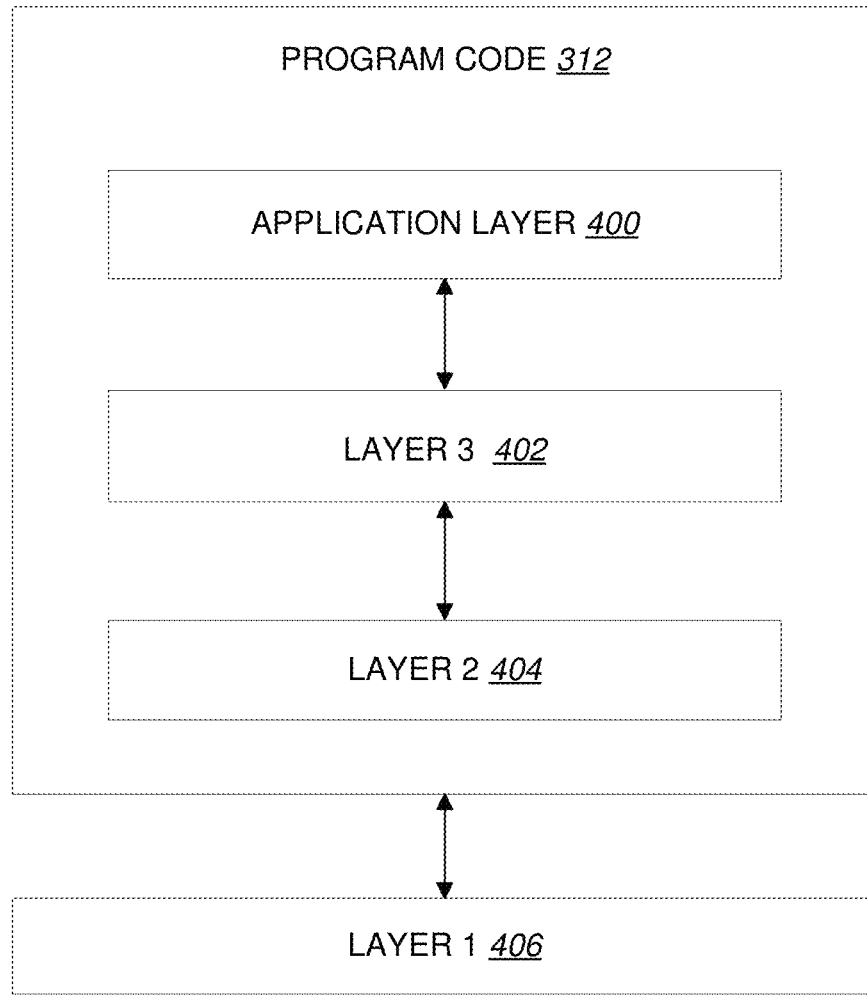
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Justification and/or objective of multiple-input and multiple-output (MIMO) in Release 18 (Rel-18) are discussed in RP-213598. One or more parts of RP-213598 are quoted below:

3 Justification

MIMO is one of the key technologies in NR systems and is successful in commercial deployment. In Rel-15/16/17, MIMO features were investigated and specified for both FDD and TDD systems, of which major parts were for downlink MIMO operation. In Rel-18, it is important to identify and specify necessary enhancements for uplink MIMO, while necessary enhancements on downlink MIMO that facilitate the use of large antenna array, not only for FR1 but also for FR2, would still need to be introduced to fulfil the request for evolution of NR deployments. This comprises the following areas of enhancement. First, significant loss of performance for a UE at high/medium speed has been observed in commercial deployments especially in multi-user MIMO (MU-MIMO) scenarios. As the performance loss is partly caused by outdated CSI, enhancements on CSI acquisition to alleviate such loss can be beneficial. Second, the unified TCI framework was introduced in Rel-17 which facilitates streamlined multi-beam operation targeting FR2. As Rel-17 focuses on single-TRP use cases, extension of unified TCI framework that focuses on multi-TRP use cases is beneficial. Third, due to the increasing need for multiplexing capacity of downlink and uplink demodulation reference signal (DMRS) from various use cases, there is a need for increasing the number of orthogonal ports for DMRS. Fourth, features for facilitating multi-TRP deployments have been introduced in Rel-16/17 focusing on non-coherent joint transmission (NC-JT). As coherent joint transmission (CJT) improves coverage and average throughput in commercial deployments with high-performance backhaul and synchronization, enhancement on CSI acquisition for FDD and TDD, targeting FR1, can be beneficial in expanding the utility of multi-TRP deployments. Fifth, as advanced UEs (e.g. CPE, FWA, vehicle, industrial devices) become more relevant, introducing necessary enhancements to support for 8 antenna ports as well as 4 and more layers for UL transmission can offer the needed improvement for UL coverage and average throughput. Sixth, with the introduction of features for UL panel selection in Rel-17, advanced UEs (e.g. CPE, FWA, vehicle, industrial devices) can benefit from higher UL coverage and average throughput with simultaneous UL multi-panel transmission. Finally, some further enhancement to facilitate UL multi-TRP deployments via two timing advances (TAs) and enhanced UL power control can offer additional UL performance improvement.

4 Objective 4.1 Objective of SI or Core Part WI or Testing Part WI

The detailed objectives are as follows:
RAN1:
1. Study, and if needed, specify the following items to facilitate simultaneous multi-panel UL transmission for higher UL throughput/reliability, focusing on FR2 and multi-TRP, assuming up to 2 TRPs and up to 2 panels, targeting CPE/FWA/vehicle/industrial devices (if applicable)
   UL precoding indication for PUSCH, where no new codebook is introduced for multi-panel simultaneous transmission
      The total number of layers is up to four across all panels and total number of codewords is up to two across all panels, considering single DCI and multi-DCI based multi-TRP operation.
   UL beam indication for PUCCH/PUSCH, where unified TCI framework extension in objective 2 is assumed, considering single DCI and multi-DCI based multi-TRP operation
      For the case of multi-DCI based multi-TRP operation, only PUSCH+PUSCH, or PUCCH+PUCCH is transmitted across two panels in a same CC.

One or more aspects of UCI multiplexing and/or PUCCH are provided in 3GPP TS 38.213 V17.2.0. One or more parts of 3GPP TS 38.213 V17.2.0 are quoted below.

9 UE Procedure for Reporting Control Information

. . .

If a UE
   is not provided coresetPoolIndex or is provided coreset-PoolIndex with a value of 0 for first CORESETs on active DL BWPs of serving cells, and
   is provided coresetPoolIndex with a value of 1 for second CORESETs on active DL BWPs of the serving cells, and
   is provided ackNackFeedbackMode=separate
the UE shall separately apply the procedures described in clauses 9.1 and 9.2.3 for reporting HARQ-ACK information associated with the first CORESETs on active DL BWP of the serving cells and for reporting HARQ-ACK information associated with the second CORESETs on active DL BWP of the serving cells, and the UE does not expect to be provided with subslotLengthForPUCCH or to be indicated by pdsch-HARQ-ACK-CodebookList to generate two HARQ-ACK codebooks on active DL BWP of the serving cells. HARQ-ACK information reporting is associated with a CORESET through a reception of a PDCCH with a DCI format triggering the reporting of the HARQ-ACK information by the UE.
. . .

A PUSCH or a PUCCH transmission other than PUCCH transmissions with SL HARQ-ACK reports, including repetitions if any, can be of priority index 0 or of priority index 1. For a configured grant PUSCH transmission, a UE determines a priority index from phy-PriorityIndex, if provided. For a PUCCH transmission with HARQ-ACK information corresponding to a SPS PDSCH reception or a SPS PDSCH release, a UE determines a priority index from harq-CodebookID, if provided. For a PUCCH transmission with SR, a UE determines the corresponding priority as described in clause 9.2.4. For a PUSCH transmission with semi-persistent CSI report, a UE determines a priority index from a priority indicator field, if provided, in a DCI format that activates the semi-persistent CSI report. If a priority index is not provided to a UE for a PUSCH or a PUCCH transmission other than PUCCH transmissions with SL HARQ-ACK reports, the priority index is 0.

If a UE is provided subslotLengthForPUCCH in a PUCCH-Config of a given priority index, in a slot of $N_{sym}^{slot}$ symbols [4, TS 38.211] with HARQ-ACK, the UE does not expect that HARQ-ACK information in response to SPS PDSCH reception(s) only (if any) or SR (if any) of the given priority index in a slot of subslotLengthForPUCCH symbols is moved to a different slot of subslotLengthForPUCCH symbols after multiplexing overlapping PUCCHs.

If in an active DL BWP a UE monitors PDCCH for detection of DCI format that includes a priority indicator field, a priority index can be provided by the priority indicator field. If a UE indicates a capability to monitor, in an active DL BWP, PDCCH for detection of DCI format that includes a priority indicator field, the DCI format can schedule PUSCH transmissions of any priority, or PDSCH receptions and/or trigger a PUCCH transmission with corresponding HARQ-ACK information of any priority, and DCI format 1_1 or DCI format 1_2 can indicate a TCI state update and trigger a PUCCH transmission with corresponding HARQ-ACK information of any priority.

If a UE
   is provided simultaneousPUCCH-PUSCH and would transmit a PUCCH with a first priority index and PUSCHs with a second priority index that is different than the first priority index, where the PUCCH and the PUSCHs overlap in time
   can simultaneously transmit the PUCCH and the PUSCHs [18, TS 38.306],
the UE excludes the PUSCHs for resolving the time overlapping between the PUCCH and PUSCHs, where the timeline conditions are not required for the excluded PUSCHs.

When a UE determines overlapping for PUCCH and/or PUSCH transmissions of different priority indexes, other than PUCCH transmissions with SL HARQ-ACK reports, before considering limitations for transmission as described in clause 11.1 and clause 11.1.1, including repetitions if any, if the UE is provided UCI-MuxWithDifferentPriority and the timeline conditions in clause 9.2.5 for multiplexing UCI in a PUCCH or a PUSCH are satisfied
   first, the UE resolves overlapping for PUCCH and/or PUSCH transmissions of a same priority index as described in clauses 9.2.5 and 9.2.6
   second, the UE resolves the overlapping for PUCCH transmissions of different priority indexes, and
   if the UE is provided subslotLengthForPUCCH in the second PUCCH-Config, a PUCCH transmission of smaller priority index is associated with the first overlapping slot with subslotLengthForPUCCH symbols of larger priority index; otherwise, the PUCCH transmission of smaller priority index is associated with the overlapping slot with $N_{sym}^{slot}$ symbols [4, TS 38.211] of larger priority index.
   the UE first resolves the overlapping for PUCCH transmissions, where at least one of the PUCCH transmissions is with $N_{PUCCH}^{repeat}>1$ repetitions, within a slot of larger priority index as is subsequently described in this clause, if any, and then the UE resolves the overlapping for PUCCH transmissions without repetitions within the slot using the pseudo-code in clause 9.2.5
   if the UE determines that a first PUCCH transmission of the smaller priority index is not dropped and the UCI of the first PUCCH transmission is not multiplexed in a second PUCCH transmission of larger priority index in an overlapping slot with subslotLengthForPUCCH symbols, the first PUCCH transmission is associated with the next overlapping slot with subslotLengthForPUCCH symbols for PUCCH transmissions with the larger priority index
   the UE does not expect a PUCCH transmission that includes UCI of different priority indexes to overlap with a PUCCH transmission with $N_{PUCCH}^{repeat}>1$ repetitions after resolving the overlapping for PUCCH transmissions without repetitions within a slot
   the UE does not expect a PUCCH transmission with UCI of first and second priority indexes to overlap with a PUCCH transmission with HARQ-ACK information of the first priority index, or with a PUCCH transmission or with a PUSCH transmission of the second priority index when the second priority index is larger than the first priority index
   the UE does not expect a PUCCH transmission with HARQ-ACK information of larger priority index to overlap with more than one PUCCH transmissions with HARQ-ACK information of smaller priority index third, the UE resolves the overlapping for PUCCH and PUSCH transmissions of different priority indexes
  the UE drops PUSCH transmissions of smaller priority index that overlap with a PUCCH transmission with positive SR of larger priority index prior to multiplexing UCI in a PUSCH transmission of smaller priority index, if any
  the UE drops PUSCH transmissions of smaller priority index that overlap with a PUCCH transmission with $N_{PUCCH}^{repeat}>1$ repetitions of larger priority index prior to multiplexing UCI in a PUSCH transmission of smaller priority index, if any
  the UE multiplexes HARQ-ACK information in a PUSCH transmission, as is subsequently described in this clause for multiplexing HARQ-ACK information from a PUCCH transmission in a PUSCH transmission of a same priority index, if a PUCCH transmission with HARQ-ACK information of a first priority index overlaps with one or more PUSCH transmissions of a second priority index that is different than the first priority index
if // this is for cases the UE supports multiplexing information of different priorities in a PUCCH/PUSCH transmission
  a PUCCH transmission with HARQ-ACK information, without repetitions, with smaller priority index overlaps with a PUCCH transmission only with HARQ-ACK information, without repetitions, with larger priority index, or
  a PUCCH transmission without repetitions that includes HARQ-ACK information of smaller priority index overlaps with a PUCCH transmission without repetitions using a PUCCH resource with PUCCH format 2/3/4 with HARQ-ACK information and SR of larger priority index, or
  a PUCCH transmission with HARQ-ACK information, without repetitions, with smaller or larger priority index overlaps, respectively, with a PUSCH transmission with larger or smaller priority index
the UE
  multiplexes HARQ-ACK information of different priority indexes and SR information of larger priority index, if any, in a same PUCCH transmission of larger priority index, or multiplexes HARQ-ACK information the UE would provide in a PUCCH transmission of smaller or larger priority index in a PUSCH transmission of larger or smaller priority index, respectively, and applies the procedures in clause 9.2.5.3 or 9.3, respectively, and
  drops CSI and/or SR carried in the PUCCH transmission of smaller priority index, if any
  drops negative SR carried in the PUCCH transmission of larger priority index, if any, if the UE would multiplex the HARQ-ACK information of larger priority index in a PUSCH transmission of smaller priority index
  drops HARQ-ACK information of smaller priority index if the UE would multiplex the HARQ-ACK information of smaller priority index in a PUSCH transmission where the UE multiplexes Part 1 CSI reports and Part 2 CSI reports of larger priority index
  drops Part 2 CSI reports of smaller priority index if the UE would multiplex the HARQ-ACK information of smaller and larger priority indexes in a PUSCH transmission where the UE multiplexes Part 1 CSI reports and Part 2 CSI reports of smaller priority index else
  if the UE would transmit the following channels that would overlap in time where, if a channel transmission is with repetitions, the following are applicable per repetition
    a first PUCCH transmission of larger priority index and a second PUCCH transmission of smaller priority index
    a first PUCCH transmission of larger priority index and a second PUSCH transmission of smaller priority index when the UE cannot simultaneously transmit the first PUCCH and second PUSCH
    a first PUCCH transmission of smaller priority index and a second PUSCH transmission of larger priority index when the UE cannot simultaneously transmit the first PUCCH and second PUSCH
  the UE
    transmits the PUCCH or the PUSCH of the larger priority index, and
    does not transmit a PUCCH or a PUSCH of smaller priority index
When a UE determines overlapping for PUCCH and/or PUSCH transmissions of different priority indexes, other than PUCCH transmissions with SL HARQ-ACK reports, before considering limitations for transmissions including with repetitions, if any, as described in clauses 11.1 and 11.1.1, if the UE is not provided UCI-MuxWithDifferent-Priority, the UE first resolves overlapping for PUCCH and/or PUSCH transmissions of smaller priority index as described in clauses 9.2.5 and 9.2.6. Then,
  if a transmission of a first PUCCH of larger priority index scheduled by a DCI format in a PDCCH reception would overlap in time with a repetition of a transmission of a second PUSCH or a second PUCCH of smaller priority index, the UE cancels the repetition of a transmission of the second PUSCH or the second PUCCH before the first symbol that would overlap with the first PUCCH transmission
  if a transmission of a first PUSCH of larger priority index scheduled by a DCI format in a PDCCH reception would overlap in time with a repetition of the transmission of a second PUCCH of smaller priority index, the UE cancels the repetition of the transmission of the second PUCCH before the first symbol that would overlap with the first PUSCH transmission
  where
  the overlapping is applicable before or after resolving overlapping among channels of larger priority index, if any, as described in clauses 9.2.5 and 9.2.6
  any remaining PUCCH and/or PUSCH transmission after overlapping resolution is subjected to the limitations for UE transmission as described in clause 11.1 and clause 11.1.1
  the UE expects that the transmission of the first PUCCH or the first PUSCH, respectively, would not start before $T_{proc,2}$ after a last symbol of the corresponding PDCCH reception
  $T_{proc,2}$ is the PUSCH preparation time for a corresponding UE processing capability assuming $d_{2,1}=d_1$[6, TS 38.214], based on $\mu$ and $N_2$ as subsequently defined in this clause, and $d_1$ is determined by a reported UE capability
If a UE would transmit the following channels, including repetitions if any, that would overlap in time
  a first PUCCH of larger priority index with SR and a second PUCCH or PUSCH of smaller priority index, or a configured grant PUSCH of larger priority index and a PUCCH of smaller priority index, or a first PUCCH of larger priority index with HARQ-ACK information only in response to PDSCH(s) reception without corresponding PDCCH(s) and a second PUCCH of smaller priority index with HARQ-ACK information only in response to PDSCH(s) reception without corresponding PDCCH(s), or a second PUCCH of smaller priority index with SR and/or CSI, or a configured grant PUSCH with smaller priority index, or a PUSCH of smaller priority index with SP-CSI report(s) without a corresponding PDCCH, or a PUSCH of larger priority index with SP-CSI reports(s) without a corresponding PDCCH and a PUCCH of smaller priority index with SR, or CSI, or HARQ-ACK information only in response to PDSCH(s) reception without corresponding PDCCH(s), or a configured grant PUSCH of larger priority index and a configured grant PUSCH of smaller priority index on a same serving cell a PUSCH of smaller priority index scheduled by a DCI format and a configured grant PUSCH of larger priority index on a same serving cell if the UE is provided prioritizationBetweenLP-DG-PUSCHandHP-CG-PUSCH the UE is expected to cancel a repetition of the PUCCH/PUSCH transmissions of smaller priority index before the first symbol overlapping with the PUCCH/PUSCH transmission of larger priority index if the repetition of the PUCCH/PUSCH transmissions of smaller priority index overlaps in time with the PUCCH/PUSCH transmissions of larger priority index. In case of a PUSCH of larger priority index scheduled by a DCI format in a PDCCH reception and a configured grant PUSCH of smaller priority index on a same serving cell and the UE is provided prioritizationBetweenHP-DG-PUSCHandLP-CG-PUSCH the UE expects that the transmission of the PUSCH of larger priority index would not start before $T_{proc,2}$ after a last symbol of the corresponding PDCCH reception $T_{proc,2}$ is the PUSCH preparation time for a corresponding UE processing capability assuming $d_{2,1}=d_1+d_3$ [6, TS 38.214], based on $\mu$ and $N_2$ as subsequently defined in this clause, and $d_1$ and $d_3$ are determined by a reported UE capability The UE determines the PUSCH for UCI multiplexing by applying the following procedure on the candidate PUSCHs as described in this clause:

If the candidate PUSCHs that include first PUSCHs that are scheduled by DCI formats and second PUSCHs configured by respective ConfiguredGrantConfig or semiPersistentOnPUSCH, and the UE would multiplex UCI in one of the candidate PUSCHs, and the candidate PUSCHs fulfil the conditions in clause 9.2.5 for UCI multiplexing, the UE multiplexes the UCI in a PUSCH from the first PUSCHs.

If the UE would multiplex UCI in one of the candidate PUSCHs and the UE does not multiplex aperiodic CSI in any of the candidate PUSCHs, the UE multiplexes the UCI in a PUSCH of the serving cell with the smallest ServCellIndex subject to the conditions in clause 9.2.5 for UCI multiplexing being fulfilled. If the UE transmits more than one PUSCHs in the slot on the serving cell with the smallest ServCellIndex that fulfil the conditions in clause 9.2.5 for UCI multiplexing, the UE multiplexes the UCI in the earliest PUSCH that the UE transmits in the slot.

9.2.5 UE Procedure for Reporting Multiple UCI Types

. . .

If a UE would transmit multiple overlapping PUCCHs in a slot or overlapping PUCCH(s) and PUSCH(s) in a slot and, when applicable as described in clauses 9.2.5.1 and 9.2.5.2, the UE is configured to multiplex different UCI types in one PUCCH, and at least one of the multiple overlapping PUCCHs or PUSCHs is in response to a DCI format detection by the UE, the UE multiplexes all corresponding UCI types if the following conditions are met. If one of the PUCCH transmissions or PUSCH transmissions is in response to a DCI format detection by the UE, the UE expects that the first symbol $S_0$ of the earliest PUCCH or PUSCH, among a group overlapping PUCCHs and PUSCHs in the slot, satisfies the following timeline conditions $S_0$ is not before a symbol with CP starting after $T_{proc,1}^{mux}$ after a last symbol of any corresponding PDSCH, $T_{proc,1}^{mux}$ is given by maximum of $\{T_{proc,1}^{mux,1}, \cdots, T_{proc,1}^{mux,i}, \cdots\}$ where for the i-th PDSCH with corresponding HARQ-ACK transmission on a PUCCH which is in the group of overlapping PUCCHs and PUSCHs, $T_{proc,1}^{mux,i}=(N_1+d_{1,1}+1)\cdot(2048+144)\cdot\kappa\cdot 2^{-\mu}\cdot T_C$, $d_{1,1}$ is selected for the i-th PDSCH following [6, TS 38.214], $N_1$ is selected based on the UE PDSCH processing capability of the i-th PDSCH and SCS configuration $\mu$, where $\mu$ corresponds to the smallest SCS configuration among the SCS configurations used for the PDCCH scheduling the i-th PDSCH, the i-th PDSCH, the PUCCH with corresponding HARQ-ACK transmission for the i-th PDSCH, and all PUSCHs in the group of overlapping PUCCHs and PUSCHs.

A UE that is not provided coresetPoolIndex or is provided coresetPoolIndex with a value of 0 for first CORESETs on active DL BWPs of serving cells, and is provided coresetPoolIndex with a value of 1 for second CORESETs on active DL BWPs of the serving cells, and is provided ackNackFeedbackMode=separate does not expect a PUCCH or a PUSCH transmission triggered by a detection of a DCI format in a PDCCH received in a CORESET from the first CORESETs to overlap in time with a PUCCH or a PUSCH transmission triggered by a detection of a DCI format in a PDCCH received in a CORESET from the second CORESETs.

. . .

9.2.6 PUCCH Repetition Procedure

A UE can be indicated to transmit a PUCCH over $N_{PUCCH}^{repeat}$ slots using a PUCCH resource, where if the PUCCH resource is indicated by a DCI format and includes PUCCH-nrofSlots, $N_{PUCCH}^{repeat}$ is provided by PUCCH-nrofSlots otherwise, $N_{PUCCH}^{repeat}$ is provided by nrofSlots If the UE is provided subslotLengthForPUCCH, a slot for a PUCCH transmission with repetitions over $N_{PUCCH}^{repeat}>1$ slots includes a number of symbols indicated by subslotLengthForPUCCH.

For $N_{PUCCH}^{repeat}>1$ the UE repeats the PUCCH transmission with the UCI over $N_{PUCCH}^{repeat}$ slots a repetition of the PUCCH transmission in each of the $N_{PUCCH}^{repeat}$ slots has a same number of consecutive symbols, as provided by nrofSymbols a repetition of the PUCCH transmission in each of the $N_{PUCCH}^{repeat}$ slots has a same first symbol, as provided by startingSymbolIndex if subslotLengthForPUCCH is not provided; otherwise mod(startingSymbolIndex, subslotLengthForPUCCH)

If the UE determines that, for a repetition of a PUCCH transmission in a slot, the number of symbols available for the PUCCH transmission is smaller than the value provided by nrofSymbols for the corresponding PUCCH format, the UE does not transmit the PUCCH repetition in the slot.

If a UE would transmit a PUCCH over a first number $N_{PUCCH}^{repeat}>1$ of slots and the UE would transmit a PUSCH with repetition Type A or with TB processing over multiple slots over a second number of slots, and the PUCCH transmission would overlap with the PUSCH transmission in one or more slots, and the conditions in clause 9.2.5 for multiplexing the UCI in the PUSCH are satisfied in the overlapping slots, the UE transmits the PUCCH and does not transmit the PUSCH in the overlapping slots.

When a PUCCH resource used for repetitions of a PUCCH transmission by a UE includes first and second spatial settings, or first and second sets of power control parameters, as described in [11, TS 38.321] and in clause 7.2.1, the UE uses the first and second spatial settings, or the first and second sets of power control parameters, for first and second repetitions of the PUCCH transmission, respectively, when $N_{PUCCH}^{repeat}=2$, alternates between the first and second spatial settings, or between the first and second sets of power control parameters, respectively, per $N_{PUCCH}^{switch}$ repetitions of the PUCCH transmission, where $N_{PUCCH}^{switch}=1$ if mappingPattern='cyclicMapping'; else, $N_{PUCCH}^{switch}=2$ A UE does not expect a PUCCH that is in response to a DCI format detection to overlap with any other PUCCH that does not satisfy the corresponding timing conditions in clause 9.2.5.

If a UE would transmit a PUCCH over $N_{PUCCH}^{repeat}$ slots and the UE does not transmit the PUCCH in a slot from the $N_{PUCCH}^{repeat}$ slots due to overlapping with another PUCCH transmission in the slot, the UE counts the slot in the number of $N_{PUCCH}^{repeat}$ slots.

One or more parts of 3GPP TS 38.214 V17.2.0 are quoted below:

5.1 UE Procedure for Receiving the Physical Downlink Shared Channel

. . .

If a UE is configured by higher layer parameter PDCCH-Config that contains two different values of coresetPoolIndex in ControlResourceSet, the UE may expect to receive multiple PDCCHs scheduling fully/partially/non-overlapped PDSCHs in time and frequency domain. The UE may expect the reception of full/partially-overlapped PDSCHs in time, only when PDCCHs that schedule two PDSCHs are associated to different ControlResourceSets having different values of coresetPoolIndex. For a ControlResourceSet without coresetPoolIndex, the UE may assume that the ControlResourceSet is assigned with coresetPoolIndex as 0. When the UE is configured with [NumberOfAdditionalPCI], ControlResourceSets corresponding to different coresetPoolIndex values may be associated with different physical cell IDs via activated TCI states of the ControlResourceSets, where ControlResourceSets corresponding to one coresetPoolIndex can be associated with one physical cell ID and ControlResourceSets corresponding to another coresetPoolIndex can be associated with another physical cell ID. When the UE is scheduled with full/partially/non-overlapped PDSCHs in time and frequency domain, the full scheduling information for receiving a PDSCH is indicated and carried only by the corresponding PDCCH, the UE is expected to be scheduled with the same active BWP and the same SCS. When the UE is scheduled with full/partially-overlapped PDSCHs in time and frequency domain, the UE can be scheduled with at most two codewords simultaneously.

5.1.5 Antenna Ports Quasi Co-Location

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'typeA': {Doppler shift, Doppler spread, average delay, delay spread}
'typeB': {Doppler shift, Doppler spread}
'typeC': {Doppler shift, average delay}
'typeD': {Spatial Rx parameter}

The UE can be configured with a list of up to 128 DLorJointTCIState configurations, within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS.

If the DLorJointTCIState or UL-TCIState configurations are absent in a BWP of the CC, the UE can apply the DLorJointTCIState or UL-TCIState configurations from a reference BWP of a reference CC. The UE is not expected to be configured with TCI-State, SpatialRelationInfo or PUCCH-SpatialRelationInfo, except SpatialRelationInfoPos in a CC in a band, if the UE is configured with DLorJointTCIState or UL-TCIState in any CC in the same band. The UE can assume that when the UE is configured with TCI-State in any CC in the CC list configured by simultaneousTCI-UpdateList1-r16, simultaneousTCI-UpdateList2-r16, simultaneousSpatial-UpdatedList1-r16, or simultaneousSpatial-UpdatedList2-r16, the UE is not configured with DLorJointTCIState or UL-TCIState in any CC within the same band in the CC list.

The UE receives an activation command, as described in clause 6.1.3.14 of [10, TS 38.321] or 6.1.3.x of [10, TS 38.321], used to map up to 8 TCI states and/or pairs of TCI states, with one TCI state for DL channels/signals and one TCI state for UL channels/signals to the codepoints of the DCI field 'Transmission Configuration Indication' for one or for a set of CCs/DL BWPs, and if applicable, for one or for a set of CCs/UL BWPs. When a set of TCI state IDs are activated for a set of CCs/DL BWPs and if applicable, for a set of CCs/UL BWPs, where the applicable list of CCs is determined by the indicated CC in the activation command, the same set of TCI state IDs are applied for all DL and/or UL BWPs in the indicated CCs. If the activation command maps DLorJointTCIState and/or UL-TCIState to only one TCI codepoint, the UE shall apply the indicated DLorJointT-CIState and/or UL-TCIState to one or to a set of CCs/DL BWPs, and if applicable, to one or to a set of CCs/UL BWPs once the indicated mapping for the one single TCI codepoint is applied as described in [11, TS 38.133].

When the bwp-id or cell for QCL-TypeA/D source RS in a QCL-Info of the TCI state configured with DLorJointT-CIState is not configured, the UE assumes that QCL-TypeA/D source RS is configured in the CC/DL BWP where TCI state applies.

When tci-PresentInDCI is set as 'enabled' or tci-PresentDCI-1-2 is configured for the CORESET, the UE with activated DLorJointTCIState or UL-TCIState receives DCI format 1_1/1_2 providing indicated DLorJointTCIState or UL-TCIState for a CC or all CCs in the same CC list configured by simultaneousTCI-UpdateList1-r17, simultaneousTCI-UpdateList2-r17, simultaneousTCI-UpdateList3-r17, simultaneousTCI-UpdateList4-r17. The DCI format 1_1/1_2 can be with or without, if applicable, DL assignment. If the DCI format 1_1/1_2/ is without DL assignment, the UE can assume the following:

CS-RNTI is used to scramble the CRC for the DCI
The values of the following DCI fields are set as follows:
RV=all '1's
MCS=all '1's
NDI=0
Set to all '0's for FDRA Type 0, or all '1's for FDRA Type 1, or all '0's for dynamicSwitch (same as in Table 10.2-4 of [6, TS 38.213]).

. . .

If the UE is configured with SSB-MTC-AddtionalPCI and with PDCCH-Config that contains two different values of coresetPoolIndex in ControlResourceSet, the UE receives an activation command for CORESET associated with each coresetPoolIndex, as described in clause 6.1.3.14 of [10, TS 38.321], used to map up to 8 TCI states to the codepoints of the DCI field 'Transmission Configuration Indication' in one CC/DL BWP. When a set of TCI state IDs are activated for a coresetPoolIndex, the activated TCI states corresponding to one coresetPoolIndex can be associated with one physical cell ID and activated TCI states corresponding to another coresetPoolIndex can be associated with another physical cell ID.

6.1 UE Procedure for Transmitting the Physical Uplink Shared Channel

When the UE is configured DLorJointTCIState or UL-TCIState, the UE shall perform PUSCH transmission corresponding to a Type 1 configured grant or a Type 2 configured grant or a dynamic grant according to the spatial relation, if applicable, with a reference to the RS for determining UL Tx spatial filter or the RS configured with qcl-Type set to 'typeD' of the indicated DLorJointTCIState or UL-TCIState.

6.1.1.2 Non-Codebook Based UL Transmission

When two SRS resource sets are configured in srs-ResourceSetToAddModList or srs-ResourceSetToAddModListDCI-0-2 with higher layer parameter usage in SRS-ResourceSet set to 'codebook' or 'noncodebook', for PUSCH repetition Type A, in case K>1, the same symbol allocation is applied across the K consecutive slots and the PUSCH is limited to a single transmission layer. The UE shall repeat the TB across the K consecutive slots applying the same symbol allocation in each slot, and the association of the first and second SRS resource set in srs-ResourceSetToAddModList or srs-ResourceSetToAddModListDCI-0-2 to each slot is determined as follows:

if a DCI format 0_1 or DCI format 0_2 indicates codepoint "00" for the SRS resource set indicator, the first SRS resource set is associated with all K consecutive slots, if a DCI format 0_1 or DCI format 0_2 indicates codepoint "01" for the SRS resource set indicator, the second SRS resource set is associated with all K consecutive slots, if a DCI format 0_1 or DCI format 0_2 indicates codepoint "10" for the SRS resource set indicator, the first and second SRS resource set association to K consecutive slots is determined as follows:

When K=2, the first and second SRS resource sets are applied to the first and second slot of 2 consecutive slots, respectively.

When K>2 and cyclicMapping in PUSCH-Config is enabled, the first and second SRS resource sets are applied to the first and second slot of K consecutive slots, respectively, and the same SRS resource set mapping pattern continues to the remaining slots of K consecutive slots.

When K>2 and sequentialMapping in PUSCH-Config is enabled, first SRS resource set is applied to the first and second slots of K consecutive slots, and the second SRS resource set is applied to the third and fourth slot of K consecutive slots, and the same SRS resource set mapping pattern continues to the remaining slots of K consecutive slots.

Otherwise, a DCI format 0_1 or DCI format 0_2 indicates codepoint "11" for the SRS resource set indicator, and the first and second SRS resource set association to K consecutive slots is determined as follows, When K=2, the second and first SRS resource set are applied to the first and second slot of 2 consecutive slots, respectively.

When K>2 and cyclicMapping in PUSCH-Config is enabled, the second and first SRS resource sets are applied to the first and second slot of K consecutive slots, respectively, and the same SRS resource set mapping pattern continues to the remaining slots of the K consecutive slots.

When K>2 and sequentialMapping in PUSCH-Config is enabled, the second SRS resource set is applied to the first and second slot of K consecutive slots, and the first SRS resource set is applied to the third and fourth slot of K consecutive slots, and the same SRS resource set mapping pattern continues to the remaining slots of the K consecutive slots.

. . .

For PUSCH repetition Type A, when a DCI format 0_1 and DCI format 0_2 indicate codepoint "10" or "11" for the SRS resource set indicator and schedule aperiodic CSI report(s) on PUSCH with transport block by a 'CSI request' field on a DCI, the CSI report(s) multiplexing is determined as follows if higher layer parameter AP-CSI-MultiplexingMode in CSI-AssociatedReportConfigInfo is enabled and UCI other than CSI report(s) are not multiplexed on PUSCH, the CSI report(s) is transmitted separately only on the first transmission occasion associated with the first SRS resource set and the first transmission occasion associated with the second SRS resource set.

otherwise, the CSI report(s) is transmitted only on the first transmission occasion.

. . .

6.1.2.3 Resource Allocation for Uplink Transmission with Configured Grant

When PUSCH resource allocation is semi-statically configured by higher layer parameter configuredGrantConfig in BWP-UplinkDedicated information element, and the PUSCH transmission corresponding to a configured grant, the following higher layer parameters are applied in the transmission:

For Type 1 PUSCH transmissions with a configured grant, the following parameters are given in configuredGrant-Config unless mentioned otherwise:

. . .

. . .

For Type 2 PUSCH transmissions with a configured grant:
  the resource allocation follows the higher layer configuration according to [10, TS 38.321], and UL grant received on the DCI.
  The PUSCH repetition type and the time domain resource allocation table are determined by the PUSCH repetition type and the time domain resource allocation table associated with the UL grant received on the DCI, respectively, as defined in Clause 6.1.2.1. The value of $K_{offset}$, if configured, is applied when determining the first transmission opportunity.

For PUSCH transmissions with a Type 1 or Type 2 configured grant, the number of (nominal) repetitions K to be applied to the transmitted transport block is provided by the indexed row in the time domain resource allocation table if numberOfRepetitions is present in the table; otherwise K is provided by the higher layer configured parameters repK.

For PUSCH transmissions with a Type 1 configured grant, when two SRS resource sets are configured in srs-ResourceSetToAddModList or srs-ResourceSetToAddModListDCI-0-2, if configuredGrantConfig contains only one pathloss-ReferenceIndex, p0-PUSCH-Alpha, powerControlLoopToUse, srs-ResourceIndicator and precodingAndNumberOfLayers (applicable when higher layer parameter usage in SRS-ResourceSet set to 'codebook'), PUSCH repetitions are associated only with the first SRS resource set.

One or more parts of 3GPP TS 38.331 V17.0.0, discussing one or more relevant parameters, are quoted below:

PhysicalCellGroupConfig

. . .

| PhysicalCellGroupConfig field descriptions |
| --- |
| ackNackFeedbackMode<br>Indicates which among the joint and separate ACK/NACK feedback modes to use within a slot as specified in TS 38.213 [13] (clause 9). |

ServingCellConfig

. . .

| |
| --- |
| additionalPCIList-r17          SEQUENCE<br>(SIZE(1..maxNrofAdditionalPCI-r17) ) OF SSB-MTC-AdditionalPCI-r17<br>OPTIONAL,  -- Need R |

| ServingCellConfig field descriptions |
| --- |
| additionalPCIList<br>List of timing information for the additional SSB with different PCI than serving cell PCI. |

SSB-MTC

. . .

| |
| --- |
| SSB-MTC-AdditionalPCI-r17 ::= SEQUENCE {<br>   additionalPCIIndex-r17         AdditionalPCIIndex-r17,<br>   additionalPCI-r17              PhysCellId,<br>   periodicity-r17                ENUMERATED { ms5, ms10, ms20,<br>  ms40, ms80, ms160, spare2,        OPTIONAL,  -- Need S<br>spare1 }<br>   ssb-PositionsInBurst-r17       CHOICE {<br>     shortBitmap                  BIT STRING (SIZE (4) ),<br>     mediumBitmap                 BIT STRING (SIZE (8) ),<br>     longBitmap                   BIT STRING (SIZE (64) )<br>   },<br>   SS-PBCH-BlockPower-r17         INTEGER (-60..50)<br>}<br>--Editor's note: more RAN1 input may be coming for this IE<br>AdditionalPCIIndex-r17 ::= INTEGER(0..maxNrofAdditionalPCI-1-r17) |

TCI-State

The IE TCI-State associates one or two DL reference signals with a corresponding quasi-colocation (QCL) type. If additionalPCI is configured for the reference signal, same value is configured for both DL reference signals.

| TCI-State information element |
| --- |
| -- ASN1START<br>-- TAG-TCI-STATE-START<br>TCI-State ::=                    SEQUENCE {<br>  tci-StateId                   TCI-StateId,<br>  qcl-Type1                     QCL-Info,<br>  qcl-Type2                     QCL-Info<br>OPTIONAL,   -- Need R<br>. . .<br>}<br>QCL-Info ::=                     SEQUENCE { |

| TCI-State information element |
|---|
| cell                       ServCellIndex
OPTIONAL,  -- Need R
    bwp-Id                  BWP-Id
OPTIONAL, -- Cond CSI-RS-Indicated
    referenceSignal         CHOICE {
        csi-rs              NZP-CSI-RS-ResourceId,
        ssb                 SSB-Index
    },
    qcl-Type                ENUMERATED {typeA, typeB, typeC, typeD},
    ...,
    [ [
    additionalPCI-r17       AdditionalPCIIndex-r17
OPTIONAL   -- Need R
    ] ]
}
DLorJoint-TCIState-r17 ::=  SEQUENCE {
    tci-StateUnifiedId-r17  TCI-StateId,
    qcl-Type1-r17           QCL-Info,
    qcl-Type2-r17           QCL-Info
OPTIONAL,  -- Need R
    ul-powerControl-r17     Uplink-powerControlId-r17
OPTIONAL,  -- Need R
    pathlossReferenceRS-Id-r17    PUSCH-PathlossReferenceRS-Id
OPTIONAL   -- Need S
}
UL-TCIState-r17 ::=         SEQUENCE {
    ul-TCIState-Id-r17      UL-TCIState-Id-r17,
    servingCellId-r17       ServCellIndex
OPTIONAL,  -- Need S
    referenceSignal-r17     CHOICE {
        ssb-Index-r17       SSB-Index,
        csi-RS-Index-r17    NZP-CSI-RS-ResourceId,
        srs-r17             PUCCH-SRS
    },
    additionalPCI-r17       AdditionalPCIIndex-r17 |

| TCI-State information element |
|---|
| OPTIONAL,  -- Need R
    ul-powerControl-r17     Uplink-powerControlId-r17
OPTIONAL,  -- Need R
    pathlossReferenceRS-Id-r17    PUSCH-PathlossReferenceRS-Id
OPTIONAL   -- Need S
        -- Editor's Note: Check if new id -r17 is needed to cover full ID range
}
-- TAG-TCI-STATE-STOP
-- ASN1STOP |

| QCL-Info field descriptions |
|---|
| bwp-Id
The DL BWP which the RS is located in.
cell
The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See TS 38.214 [19] clause 5.1.5.
referenceSignal
Reference signal with which quasi-collocation information is provided as specified in TS 38.214 [19] clause 5.1.5.
qcl-Type
QCL type as specified in TS 38.214 [19] clause 5.1.5. |

ControlResourceSet

The IE ControlResourceSet is used to configure a time/frequency control resource set (CORESET) in which to search for downlink control information (see TS 38.213 [13], clause 10.1).

| ControlResourceSet information element |
|---|
| -- ASN1START
-- TAG-CONTROLRESOURCESET-START
ControlResourceSet ::=                SEQUENCE {
    controlResourceSetId              ControlResourceSetId,
    tci-StatesPDCCH-ToAddList         SEQUENCE(SIZE (1..maxNrofTCI-StatesPDCCH) ) OF TCI-StateId OPTIONAL,   -- Cond NotSIB1-initialBWP
    tci-StatesPDCCH-ToReleaseList     SEQUENCE(SIZE (1..maxNrofTCI-StatesPDCCH) ) OF TCI-StateId OPTIONAL,   -- Cond NotSIB1-initialBWP
    tci-PresentInDCI                  ENUMERATED {enabled}
OPTIONAL, -- Need S
    coresetPoolIndex-r16              INTEGER (0..1)
OPTIONAL, -- Need S
    controlResourceSetId-v1610        ControlResourceSetId-v1610
OPTIONAL  -- Need S
    ] ],
    [ [
    followUnifiedTCIstate-r17         ENUMERATED {enabled}
OPTIONAL  -- Need R
    ] ]
}
-- TAG-CONTROLRESOURCESET-STOP
-- ASN1STOP |

| ControlResourceSet field descriptions |
| --- |
| coresetPoolIndex<br>The index of the CORESET pool for this CORESET as specified in TS 38.213 [13] (clauses 9 and 10) and TS 38.214 [19] (clauses 5.1 and 6.1). If the field is absent, the UE applies the value 0.<br>followUnifiedTCIstate<br>When set to enabled, for PDCCH reception on this CORESET, the UE applies the "indicated" Rel-17 DL only or joint TCI as specified in TS 38.214 clause 5.1.5.<br>tci-PresentInDCI<br>This field indicates if TCI field is present or absent in DCI format 1_1. When the field is absent the UE considers the TCI to be absent/disabled. In case of cross carrier scheduling, the network sets this field to enabled for the ControlResourceSet used for cross carrier scheduling in DCI format 1_1 in the scheduling cell if enableDefaultBeamForCCS is not configured (see TS 38.214 [19], clause 5.1.5).<br>tci-StatesPDCCH-ToAddList<br>A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports (see TS 38.213 [13], clause 6.). The network configures at most maxNrofTCI-StatesPDCCH entries. |

3GPP TS 38.212 V17.1.0 discusses DCI format. One or more parts of 3GPP TS 38.212 V17.1.0 are quoted below:

7.3.1 DCI Formats

The DCI formats defined in table 7.3.1-1 are supported.

TABLE 7.3.1-1

DCI formats

| DCI format | Usage |
| --- | --- |
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of one or multiple PDSCH in one cell, and/or triggering one shot HARQ-ACK codebook feedback |
| 1_2 | Scheduling of PDSCH in one cell |

7.3.1.1.2 Format 0_1

DCI format 0_1 is used for the scheduling of one or multiple PUSCH in one cell, or indicating CG downlink feedback information (CG-DFI) to a UE.

The following information is transmitted by means of the DCI format 0_1 with CRC scrambled by C-RNTI or CS-RNTI or SP-CSI-RNTI or MCS-C-RNTI:

Identifier for DCI formats—1 bit
  The value of this bit field is always set to 0, indicating an UL DCI format
. . .
SRS resource set indicator—0 or 2 bits
  2 bits according to Table 7.3.1.1.2-36 if
    txConfig=nonCodeBook, and there are two SRS resource sets configured by srs-ResourceSetToAddModList and associated with the usage of value 'nonCodeBook', or
    txConfig=codebook, and there are two SRS resource sets configured by srs-ResourceSetToAddModList and associated with usage of value 'codebook';
  0 bit otherwise.

SRS resource indicator—

$$\left\lceil \log_2\left( \sum_{k=1}^{\min\{L_{max}, N_{SRS}\}} \binom{N_{SRS}}{k} \right) \right\rceil \text{ or } \lceil \log_2(N_{SRS}) \rceil \text{ bits,}$$

where $N_{SRS}$ is the number of configured SRS resources in the SRS resource set indicated by SRS resource set indicator field if present; otherwise $N_{SRS}$ is the number of configured SRS resources in the SRS resource set configured by higher layer parameter srs-ResourceSet-ToAddModList and associated with the higher layer parameter usage of value 'codeBook' or 'nonCode-Book', $$\left\lceil \log_2\left( \sum_{k=1}^{\min\{L_{max}, N_{SRS}\}} \binom{N_{SRS}}{k} \right) \right\rceil \text{ bits}$$

according to Tables 7.3.1.1.2-28/29/30/31 if the higher layer parameter txConfig=nonCodebook, where $N_{SRS}$ is the number of configured SRS resources in the SRS resource set indicated by SRS resource set indicator field if present, otherwise $N_{SRS}$ is the number of configured SRS resources in the SRS resource set configured by higher layer parameter srs-ResourceSetToAddModList and associated with the higher layer parameter usage of value 'nonCodeBook', and if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

$\lceil \log_2(N_{SRS}) \rceil$ bits according to Tables 7.3.1.1.2-32, 7.3.1.1.2-32A and 7.3.1.1.2-32B if the higher layer parameter txConfig=codebook, where $N_{SRS}$ is the number of configured SRS resources in the SRS resource set indicated by SRS resource set indicator field if present, otherwise $N_{SRS}$ is the number of configured SRS resources in the SRS resource set configured by higher layer parameter srs-ResourceSetToAddModList and associated with the higher layer parameter usage of value 'codeBook'.

Second SRS resource indicator—

$$0, \left\lceil \log_2\left( \max_{k \in \{1,2,\ldots,\min\{L_{max}, L_{SRS}\}\}} \binom{N_{SRS}}{k} \right) \right\rceil \text{ or } \lceil \log_2(N_{SRS}) \rceil \text{ bits,}$$

$$\left\lceil \log_2\left( \max_{k \in \{1,2,\ldots,\min\{L_{max}, L_{SRS}\}\}} \binom{N_{SRS}}{k} \right) \right\rceil \text{ bits,}$$

bits according to Tables 7.3.1.1.2-28/29A/30A/31A with the same number of layers indicated by SRS resource indicator field if the higher layer parameter txConfig=nonCodebook and SRS resource set indicator field is present, where $N_{SRS}$ is the number of configured SRS resources in the second SRS resource set, and if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

$\lceil \log_2(N_{SRS}) \rceil$ bits according to Tables 7.3.1.1.2-32, 7.3.1.1.2-32A and 7.3.1.1.2-32B if the higher layer parameter txConfig=codebook and SRS resource set indicator field is present, where $N_{SRS}$ is the number of configured SRS resources in the second SRS resource set.

0 bit otherwise.

. . .

CSI request—0, 1, 2, 3, 4, 5, or 6 bits determined by higher layer parameter reportTriggerSize.

. . .

Priority indicator—0 bit if higher layer parameter priorityIndicatorDCI-0-1 is not configured; otherwise 1 bit as defined in Clause 9 in [5, TS 38.213].

TABLE 7.3.1.1.2-36

SRS resource set indication

| Bit field mapped to index | SRS resource set indication |
|---|---|
| 0 | SRS resource indicator field and Precoding information and number of layers field are associated with the first SRS resource set; Second SRS resource indicator field and Second Precoding information field are reserved. |
| 1 | SRS resource indicator field and Precoding information and number of layers field are associated with the second SRS resource set; Second SRS resource indicator field and Second Precoding information field are reserved. |
| 2 | SRS resource indicator field and Precoding information and number of layers field are associated with the first SRS resource set; Second SRS resource indicator field and Second Precoding information field are associated with the second SRS resource set. |
| 3 | SRS resource indicator field and Precoding information and number of layers field are associated with the first SRS resource set; Second SRS resource indicator field and Second Precoding information field are associated with the second SRS resource set. |

NOTE 1:
The first and the second SRS resource sets are respectively the ones with lower and higher srs-ResourceSetId of the two SRS resources sets configured by higher layer parameter srs-ResourceSetToAddModList or srs-ResourceSetToAddModListDCI-0-2, and associated with the higher layer parameter usage of value 'nonCodeBook' if txConfig=nonCodebook or 'codeBook' if txConfig=codebook. When only one SRS resource set is configured by higher layer parameter srs-ResourceSetToAddModList or srs-ResourceSetToAddModListDCI-0-2, and associated with the higher layer parameter usage of value 'codeBook' or 'nonCodeBook' respectively, the first SRS resource set is the SRS resource set. The association of the first and second SRS resource sets to PUSCH repetitions for each bit field index value is as defined in Clause 6.1.2.1 of [6, TS 38.214].

7.3.1.2.2 Format 1_1

DCI format 1_1 is used for the scheduling of one or multiple PDSCH in one cell.

The following information is transmitted by means of the DCI format 1_1 with CRC scrambled by C-RNTI or CS-RNTI or MCS-C-RNTI:

Identifier for DCI formats—1 bits
The value of this bit field is always set to 1, indicating a DL DCI format

. . .

PDSCH-to-HARQ_feedback timing indicator—0, 1, 2, or 3 bits as defined in Clause 9.2.3 of [5, TS 38.213]. The bitwidth for this field is determined as $\lceil \log_2(I) \rceil$ bits, where I is the number of entries in the higher layer parameter dl-DataToUL-ACK.

. . .

Transmission configuration indication—0 bit if higher layer parameter tci-PresentInDCI is not enabled; otherwise 3 bits as defined in Clause 5.1.5 of [6, TS38.214].

. . .

Priority indicator—0 bit if higher layer parameter priorityIndicatorDCI-1-1 is not configured; otherwise 1 bit as defined in Clause 9 in [5, TS 38.213].

One, some and/or all of the following terminology and assumptions may be used hereafter.

Base station (BS): a network central unit and/or a network node in New Radio (NR) that is used to control one or more transmission and/or reception points (TRPs) which are associated with one or more cells. Communication between a base station and one or more TRPs may be via fronthaul. Base station may be referred to as central unit (CU), eNB, gNB, and/or NodeB.

TRP: a TRP may provide network coverage and/or may directly communicate with UEs. A TRP may be referred to as distributed unit (DU) and/or network node.

Cell: a cell comprises one or more associated TRPs (e.g., coverage of the cell may comprise coverage of some and/or all associated TRP(s)). One cell may be controlled by one base station. Cell may be referred to as TRP group (TRPG).

In NR Rel-15/16 (NR Releases 15 and/or 16), a UE may perform uplink transmission via one UE panel. In NR Rel-17 (NR Release 17), a UE may perform uplink transmission via multiple UE panels in time division multiplexing (TDM) mechanism (in order to fulfill stringent reliability requirement, for example). For example, the UE may perform uplink transmission via one active UE panel in one timing (e.g., one slot). Through transmission on different UE panels, reliability of the transmission may be improved (and/or the transmission may fulfill more stringent reliability requirements). However, in NR Rel-18 (NR Release 18), with the introduction of more services requiring high data rate, higher rank uplink transmission may be considered. In some implementations, multiple UE panels may be utilized for concurrent (e.g., simultaneous) uplink transmission to provide higher data rate via spatial domain. For example, more than one active UE panel may be used (and/or considered) a given time (e.g., a UE may use multiple active UE panels for an uplink transmission in a given time). Alternatively and/or additionally, services with reliability and latency may also be improved by concurrent (e.g., simultaneous) uplink transmission via different UE panels (e.g., concurrently performing uplink transmission via different UE panels may fulfill more stringent reliability and/or latency requirements). Time-frequency resources for concurrent (e.g., simultaneous) transmissions via the multiple panels may be the same time-frequency resource. Alternatively and/or additionally, the time-frequency resources for concurrent (e.g., simultaneous) transmissions via the multiple panels may have at least partially overlapping time resources and/or at least partially overlapping frequency resources (such as where a time-frequency resource for a transmission via a first panel at least partially overlaps in time domain or frequency domain with a time-frequency resource for a transmission via a second panel).

A first issue may be when there are two Physical Uplink Shared Channels (PUSCHs) that are transmitted concurrently (e.g., simultaneously) to two TRPs via two different panels of a UE, the UE may have these two candidate PUSCHs for transmitting multiplexed Uplink Control Information (UCI), and thus, a network node may need to blindly decode these two PUSCHs if there is no further design of UCI multiplexing. In some examples, the two TRPs may be in one serving cell. In some examples, one of the two TRPs is in a serving cell and the other one of the two TRPs may be in a neighboring serving cell (associated with the serving cell, for example). In some examples, the neighboring cell may have a different Physical Cell Identity (PCI) than the serving cell. In some examples, the two TRPs are associated with different CORESETPoolIndex (e.g., one of the two TRPs is associated with one CORESETPoolIndex and the other one of the two TRPs may be associated with another CORESETPoolIndex). Alternatively and/or additionally, the TRPs may be associated with different indexes (e.g., specific indexes) associated with TRP and/or CORESETPoolIndex. In some examples, the neighboring cell may be with additionalPCI/additionalPCIindex. In the present disclosure, the term "additionalPCI/additionalPCIindex" may refer to additionalPCI (e.g., an additional PCI) and/or additionalPCIindex (e.g., an additional PCI index). In some examples, the two PUSCHs being transmitted to the two TRPs may be scheduled by a single Downlink Control Information (DCI) (e.g., single DCI scheduling multiple transmission and/or reception point (mTRP)). In some examples, the two PUSCHs being transmitted to the two TRPs may be scheduled by respective DCIs (e.g., multiple DCI scheduling mTRP).

In some examples, when UE would transmit one or more PUSCHs and/or one or more Physical Uplink Control Channels (PUCCHs) that at least partially overlap with each other in time domain, the UE may multiplex UCI (which is carried on PUCCH, for example) into PUSCH (e.g., the UE may multiplex UCI into PUSCH in a scenario in which the PUSCH and the PUCCH have the same priority index). In some examples, when there are multiple serving cells with overlapped PUSCHs, UCI multiplexing may be applied on a PUSCH that starts earlier (among the overlapped PUSCHs, for example) and/or in a serving cell which that has a smallest serving cell index (among one or more serving cells, for example). However, if there are two PUSCHs, with the same starting symbol, on a serving cell, whether UCI multiplexing is allowed on this serving cell may be unclear and/or may need further design.

In some examples, how a UE can perform UCI multiplexing may need further design in some scenarios, such as when the UE transmits (i) two PUCCHs associated with different priority indexes (e.g., priority index=0 or 1 for one PUCCH) on a first serving cell and (ii) two PUSCHs associated with different priority indexes (e.g., priority index=0 or 1 for one PUSCH), on a second serving cell. In some examples, the two PUCCHs in a first serving cell are transmitted concurrently (e.g., simultaneously) to two TRPs via UE's two different panels. In some examples, the two PUSCHs in a second serving cell are transmitted concurrently (e.g., simultaneously) to two TRPs via UE's two different panels. In some examples, if one of the first or second serving cell does not support mTRP transmission or concurrent (e.g., simultaneous) uplink transmission (e.g., there are merely one PUCCH or one PUSCH), how to handle UCI multiplexing with another serving cell with supported mTRP transmission or concurrent (e.g., simultaneous) uplink transmission.

A second issue may be that enhancement on concurrent (e.g., simultaneous) PUSCH and PUCCH transmission. For same priority index of PUSCH and PUCCH, UE may multiplex them, transmit the multiplexed UCI on the PUSCH, and/or drop the unused/non-transmitted/deprioritized PUCCH. However, since UCI may associate one TRP rather than another TRP, multiplexing first TRP's UCI on PUSCH toward second TRP may cause some problem. For example, additional exchanged time between TRPs may need in network node side, and if first TRP and second TRP are associated with different uplink timing (e.g., if the first TRP and second TRP are associated with different Timing Advances and/or different Time Alignments), whether/how to multiplex UCI may also need further design. For different priority index, whether to allow concurrent (e.g., simultaneous) uplink transmission with different priority index may also need to design.

A third issue may be associated with how UE and network node align understanding of which scheme for uplink transmission(s) when UE supports concurrent (e.g., simultaneous) uplink transmissions (via mTRP, for example). In some examples, whether one or more uplink transmission is associated with single TRP uplink transmission, or mTRP uplink transmission. For example, when network node provides configuration of PUCCH/PUSCH, how UE knows operating in single TRP uplink transmission, TDM for mTRP uplink transmission, Frequency Domain Multiplexing (FDM) for mTRP uplink transmission, and/or Spatial Domain Multiplexing (SDM) for mTRP uplink transmission.

A fourth issue may be associated with how to define Hybrid Automatic Repeat Request (HARQ) feedback scheme for mTRP downlink reception and concurrent (e.g., simultaneous) uplink transmission. Since legacy NR does not support concurrent (e.g., simultaneous) uplink transmission in one serving cell, no matter joint or separate HARQ feedback (scheme) (which is configured, for example) for the UE, the UE may multiplex two sub-codebooks respectively associated with different TRPs (i.e., joint HARQ feedback), or may transmit TDMed PUCCH which is associated with different TRPs in one slot or different slot (i.e., separate HARQ feedback). However, when the UE is configured with concurrent (e.g., simultaneous) uplink transmission, whether separate HARQ feedback scheme is still applicable may need further discuss.

A first concept of the present disclosure may be when a UE is scheduled or configured to transmit two concurrent (e.g., simultaneous) uplink transmissions/channels (with same starting symbol, for example) on a first serving cell, UCI multiplexing may not be allowed to consider/use/determine/derive the first serving cell (e.g., UCI multiplexing may not be allowed to be considered/used/determined/derived for the two concurrent uplink transmissions/channels). In the present disclosure, the term "consider/use/determine/derive" may refer to consider, use, determine and/or derive. In some examples, the two concurrent uplink transmissions/channels on the first serving cell is not allowed to multiplex UCI. In some examples, UCI multiplexing is not allowed in slot with two concurrent uplink transmissions/channels (with same starting symbol) on the first serving cell. Alternatively and/or additionally, UCI multiplexing may be allowed on this serving cell but is allowed in slot with no concurrent uplink transmissions/channels or a slot with different starting symbols of two concurrent uplink transmissions/channels on the first serving cell. In some examples, a slot with no concurrent uplink transmissions/channels may correspond to a slot that does not include multiple uplink transmissions on the first serving cell with the same starting symbol. In some examples, a slot with no concurrent uplink transmissions/channels may be a slot with a single TRP uplink transmission (without repetition in one slot, and/or no FDM, SDM repetition in one slot, for example). In some examples, a restriction in a network node is that the network node needs to schedule different starting symbol of two concurrent uplink transmissions/channels, and preferably two concurrent uplink transmissions/channels are associated with respective first or second index (e.g., CORESETPoolindex=0/1, or first/second group index).

Alternatively and/or additionally, when a UE is scheduled or configured to transmit two concurrent uplink transmissions/channels (with same starting symbol) on a first serving cell, the first concept may be that the UE determines (e.g., selects) one of the two concurrent uplink transmissions/channels on the first serving cell for UCI multiplexing. In some examples, the UE determines (e.g., selects) one of the two concurrent uplink transmissions/channels on the first serving cell for UCI multiplexing based on (selecting one of the two concurrent uplink transmissions/channels associated with) lower (TRP/TRP group) index or lower CORESET-Poolindex. In some examples, for the two concurrent uplink transmissions/channels on inter-cell mTRP (one uplink transmission on the first serving cell and the other uplink transmission on a second cell with additionalPCIindex or additionalPCI), the UE determines (e.g., selects) one of the two concurrent uplink transmissions/channels on the first serving cell for UCI multiplexing based on the first serving cell which is serving cell (rather than non-serving cell or said second cell with additionalPCIindex or additionalPCI). In some examples, the UE determines (e.g., selects) one of the two concurrent uplink transmissions/channels on the first serving cell for UCI multiplexing based on which uplink transmission/channel of the two concurrent uplink transmissions/channels being associated with Uplink (UL) Transmission Configuration Indicator (TCI) state associated with serving cell. In some examples, the UE determines (e.g., selects) one of the two concurrent uplink transmissions/channels on the first serving cell for UCI multiplexing based on which uplink transmission/channel of the two concurrent uplink transmissions/channels being associated with UL TCI state associated with lower additionalPCIindex or additionalPCI. In some examples, the UE may be configured with that UCI is multiplexed on which one of the two concurrent uplink transmissions/channels (when the UE determines the first serving cell for multiplexing UCI). In some examples, for the two concurrent uplink transmissions/channels associated with/scheduled by DCI, the DCI may provide information of whether one or two transmissions/channels is allowed for UCI multiplexing. In some examples, for the two concurrent uplink transmissions/channels associated with/configured by RRC signaling, the Radio Resource Control (RRC) signaling may provide information of whether one or two transmissions/channels is allowed for UCI multiplexing. In some examples, one of the two concurrent uplink transmissions/channels on the first serving cell for UCI multiplexing determined (e.g., selected) by the UE can be determined (e.g., derived) based on characteristics of each of the two concurrent uplink transmissions/channels. In some examples, the characteristics of a transmission/channel may be configured grant PUSCH, dynamic grant PUSCH, msg3 PUSCH, msgA PUSCH, or semi-persistent PUSCH. In some examples, the characteristics of a transmission/channel may be aperiodic PUCCH, semi-persistent PUCCH, periodic PUCCH. In some examples, the UE does not determine (or select) one of the two concurrent uplink transmissions/channels which has one or more second characteristics (e.g., which is msg3 or msgA PUSCH). In some examples, the UE may determine (e.g., select) one of the two concurrent uplink transmissions/channels which has one or more first characteristics (e.g., which is Dynamic Grant (DG), Configured Grant (CG), and/or semi-persistent PUSCH). In some examples, when both the two concurrent uplink transmissions/channels are associated with one or more the first characteristics, the UE may determine (e.g., select) the one of the two concurrent uplink transmissions/channels which is associated with dynamic grant PUSCH. Alternatively and/or additionally, when both the two concurrent uplink transmissions/channels are associated with the one or more first characteristics, the UE may determine (e.g., select) the one of the two concurrent uplink transmissions/channels which is associated with configured grant PUSCH. Alternatively and/or additionally, when both the two concurrent uplink transmissions/channels are associated with same characteristics, the UE may determine (e.g., select) the one of the two concurrent uplink transmissions/channels which is associated with lower (TRP/TRP group) index. In some examples, the characteristics of a transmission/channel may be priority index of the transmission/channel. In some examples, the UE may determine (e.g., select) the one of the two concurrent uplink transmissions/channels which is associated with higher priority index. In some examples, when both the two concurrent uplink transmissions/channels are associated with same priority index, the UE may determine (e.g., select) the one of the two concurrent uplink transmissions/channels which is associated with lower (TRP/TRP group) index. In some examples, instances of the present disclosure that indicate that a first element with a lower index is determined may imply that (i) an index of the first element is lower than an index of a second element and/or that (ii) the first element is selected (for UCI multiplexing, for example) from two (or more) elements comprising the first element and the second element based on the index of the first element being lower than the index of the second element (and/or other elements of the two or more elements). For example, an indication that "the UE may determine the one of the two concurrent uplink transmissions/channels which is associated with lower TRP/TRP group index" may imply that (i) a TRP/TRP group index of the one of the two concurrent uplink transmissions/channels is lower than a TRP/TRP group index of another one of the two concurrent uplink transmissions/channels and/or that (ii) the one of the two concurrent uplink transmissions/channels is selected from the two concurrent uplink transmissions/channels (for UCI multiplexing, for example) based on the TRP/TRP group of the first element being lower than the index of the second element (and/or other elements of the two or more elements). In some examples, instances of the present disclosure that indicate that a first element with a higher index is determined may imply that (i) an index of the first element is higher than an index of a second element and/or that (ii) the first element is selected (for UCI multiplexing, for example) from two (or more) elements comprising the first element and the second element based on the index of the first element being higher than the index of the second element (and/or other elements of the two or more elements). In some examples, each of the two concurrent uplink transmissions/channels is associated with a respective/different TRP/TRP group index (e.g., CORESETPoolIndex). In some examples, the two concurrent uplink transmissions/channels are associated with multiple DCI (mDCI) based mTRP operation (or each of the two concurrent uplink transmissions/channels is scheduled by respective DCI or configured by respective configured grant). In some examples, one of the two concurrent uplink transmissions/channels on the first serving cell for UCI multiplexing determined (e.g., selected) by the UE can be determined (e.g., derived) based on content of UCI and/or characteristic associated with UCI. In some examples, based on which associated TRP/TRP group of UCI (which would be multiplexed, for example), the UE may determine (e.g., select) the one of the two concurrent uplink transmissions/channels which is associated with the associated TRP/TRP group of UCI. In some examples, per TRP based UCI multiplexing may be performed. In some examples, for UCI (e.g., HARQ information or Scheduling Request (SR)) associated with a first TRP/TRP group, the UE may determine (e.g., select) the one of the two concurrent uplink transmissions/channels which is associated with the first TRP/TRP group. In some examples, for UCI (e.g., HARQ information or SR) associated with a second TRP/TRP group, the UE may determine (e.g., select) the one of the two concurrent uplink transmissions/channels which is associated with the second TRP/TRP group. In some examples, for UCI (e.g., HARQ information or SR) associated with both a first TRP/TRP group and a second TRP/TRP group, the UE may determine (e.g., select) the one of the two concurrent uplink transmissions/channels which is associated with lower (TRP/TRP group) index. In some examples, UCI (e.g., HARQ information) associated with a first TRP/TRP group may mean or correspond to UCI is in response to a transmission (scheduled by DCI or configured by RRC signaling) associated with the first TRP/TRP group. In some examples, UCI (e.g., HARQ information) associated with a second TRP/TRP group may mean or correspond to UCI is in response to a transmission (scheduled by DCI or configured by RRC signaling) associated with the second TRP/TRP group.

Alternatively and/or additionally, when a UE is scheduled or configured to transmit two concurrent uplink transmissions/channels (with same starting symbol) on a first serving cell, the first concept may be that the UE may determine (e.g., select) the first serving cell for multiplexing UCI, and/or the UE may (and/or may be configured to) multiplex UCI on both two concurrent uplink transmissions/channels. In some examples, UCI is repeated on the two concurrent uplink transmissions/channels. In some examples, UCI may comprise HARQ information associated with a first TRP (i.e., CORESETPoolIndex=0) for one serving cell and/or HARQ information associated with a second TRP (i.e., CORESETPoolIndex=1) for same serving cell or a neighboring cell with additionalPCI or additional PCI index. In some examples, no matter the UCI comprising which TRP's or both TRP's HARQ information, the UE multiplex UCI on both two concurrent uplink transmissions/channels (with same starting symbol). In some examples, for different starting symbol of two concurrent uplink transmissions/channels (with partially overlapping in time domain on the first serving cell), the UE multiplex UCI on (merely) one uplink transmission/channel of the two concurrent uplink transmissions/channels which starts earlier. In some examples, for same starting symbol of two concurrent uplink transmissions/channels on the first serving cell, the UE may transmit UCI on both two concurrent uplink transmissions/channels on the first serving cell. In some examples, for same starting symbol of two concurrent uplink transmissions/channels which one on the first serving cell and the other one is on a second cell with additionalPCIindex or additionalPCI, the UE may transmit UCI on both two concurrent uplink transmissions/channels. In some examples, for same starting symbol of two concurrent uplink transmissions/channels which one on the first serving cell and the other one is on a second (serving) cell without having additionalPCIindex or additionalPCI, the UE may transmit both two concurrent uplink transmissions/channels, and/or may transmit UCI on (merely) one of both two concurrent uplink transmissions/channels which is on serving cell with lower serving cell index. In some examples, when the UE multiplex UCI on one or two of the two concurrent uplink transmissions/channels, the UE may drop one or more PUCCHs (originally) for the UCI. In some examples, the UE may multiplex UCI (e.g., HARQ information or SR) associated with both a first TRP/TRP group and a second TRP/TRP group into both of the two concurrent uplink transmissions/channels. In some examples, the UE may determine whether to multiplex UCI into both of the two concurrent uplink transmissions/channels based on whether single DCI (sDCI) based mTRP operation is applied (to the two concurrent uplink transmissions/channels). In some examples, when and/or if the two concurrent uplink transmissions/channels are scheduled by a single DCI (e.g., with same starting symbol of both uplink transmissions/channels), the UE multiplex UCI into both of the two concurrent uplink transmissions/channels. In some examples, when the UE is not configured with TRP/TRP group index or CORESETPoolIndex for the first serving cell, the UE may multiplex UCI into both of the two concurrent uplink transmissions/channels. On the other hands, for mDCI based mTRP operation is applied (to the two concurrent uplink transmissions/channels), the UE does not multiplex UCI on both of the two concurrent uplink transmissions/channels. In some examples, when the two concurrent uplink transmissions/channels are scheduled by respective DCI (rather than scheduled by a single DCI), or the two concurrent uplink transmissions/channels is configured with TRP/TRP group index, the UE does not multiplex UCI on both of the two concurrent uplink transmissions/channels. In some examples, (for mDCI based mTRP operation), the UE multiplex UCI on one of the two concurrent uplink transmissions/channels. In some examples, the UE multiplex UCI on both of the two concurrent uplink transmissions/channels regardless of/no matter of sDCI based mTRP operation or mDCI based mTRP operation. In some examples, the UE multiplex UCI on one of the two concurrent uplink transmissions/channels regardless of/no matter of sDCI based mTRP operation or mDCI based mTRP operation.

In some examples, UCI0 corresponds to a first plurality of UCI(s) associated with a first index (e.g., CORESETPoolindex=0, or a first TRP group index). In some examples, UCI 0 may also include UCI(s) corresponding to serving cell(s) without being configured with CORESETPoolIndex or mTRP operation for Physical Downlink Shared Channel (PDSCH), Physical Downlink Control Channel (PDCCH), PUSCH, and/or PUCCH.

In some examples, UCI1 corresponds to a second plurality of UCI(s) associated with a second index (e.g., CORESETPoolindex=1, or a second TRP group index).

In some examples, for which TRP's UCI will be multiplexed into above one or more uplink channel(s) may be associated with one or more of the following: (i) UCI0 is multiplexed into PUCCH/PUSCH associated with the first index and UCI1 is multiplexed into PUCCH/PUSCH associated with the second index, (ii) both UCI0 and UCI1 (e.g., UCI0+UCI1) are multiplexed into one PUSCH/PUCCH which may be determined (e.g., selected) as above, and/or (iii) both UCI0 and UCI1 (e.g., UCI0+UCI1) are multiplexed into both PUCCH/PUSCH associated with the first index and PUCCH/PUSCH associated with the second index (e.g., UCI is repeated on both channels).

In some examples, one of the two concurrent uplink transmissions/channels may be PUCCH/PUSCH associated with the first index and another one of the two concurrent uplink transmissions/channels may be PUCCH/PUSCH associated with the second index.

In some examples, the two concurrent uplink transmissions/channels are scheduled by a single DCI (e.g., sDCI based mTRP).

In some examples, the two concurrent uplink transmissions/channels are respectively scheduled by each DCI associated with the first index and the second index (e.g., mDCI based mTRP).

In some examples, the two concurrent uplink transmissions/channels is associated with or deliver same Transport Block (TB).

In some examples, the two concurrent uplink transmissions/channels are associated with or deliver different TBs.

In some examples, the two concurrent uplink transmissions/channels may be two channels (on a serving cell) which is at least partially overlapped in time domain.

In some examples, the UE transmits one of the two concurrent uplink transmissions/channels via a first joint/UL TCI state or spatial relation and transmits another one of the two concurrent uplink transmissions/channels via a second joint/UL TCI state or spatial relation.

In some examples, both the first joint/UL TCI state and the second joint/UL TCI state are indicated by a beam indication DCI.

In some examples, the first joint/UL TCI state is indicated by a first beam indication DCI.

In some examples, the first beam indication DCI is associated with the first index (e.g., CORESETPoolindex=0, or first group index).

In some examples, the second joint/UL TCI state is indicated by a second beam indication DCI.

In some examples, the second beam indication DCI is associated with the second index (e.g., CORESETPoolindex=1, or second group index).

In some examples, the first joint/UL TCI state is associated with a first Sounding Reference Signal (SRS) resource set.

In some examples, for an uplink channel associated with the first SRS resource set, UE transmits the uplink channel based on same precoder as one SRS in the first SRS resource set. The one SRS resource may be indicated by DCI or configured by RRC signaling.

In some examples, for an uplink channel associated with the second SRS resource set, UE transmits the uplink channel based on same precoder as one SRS in the second SRS resource set. The one SRS resource may be indicated by DCI or configured by RRC signaling.

A second concept of the present disclosure may be that UE may perform UCI multiplexing per TRP (or index associated with TRP). In some examples, UCI multiplexing timeline may also be applied per TRP. In some examples, there are a plurality of overlapping PUSCHs and PUCCHs comprising a first set of PUSCHs and/or PUCCHs and a second set of PUSCHs and/or PUCCHs. In one example, if an overlapping uplink channel is associated with earliest starting symbol among the plurality of overlapping PUSCHs and PUCCHs and associated with a first TRP, when the UE performs UCI multiplexing for a second TRP, the UE does not take into account the overlapping channel. Alternatively and/or additionally, when the UE determines multiplex/collect one or more UCIs for the second TRP from PUCCHs in the second set of PUCCHs, UCI in the overlapping channel is not taken into account for the one or more UCIs. Alternatively and/or additionally, when the UE performs UCI multiplexing on PUSCH for the second TRP, the UE determines (e.g., selects) a PUSCH for UCI multiplexing among PUSCHs associated with the second TRP.

Alternatively and/or additionally, the second concept may be the UE multiplex UCI (of a fifth PUCCH) on a time domain overlapping a fifth PUSCH and transmits the fifth PUSCH in a first timing, and the UE transmits a sixth PUCCH comprising UCI and a sixth PUSCH concurrently in a second timing. In some examples, the UE supports concurrent (e.g., simultaneous) PUCCH and PUSCH on different cells.

For the first timing, in some examples, the fifth PUSCH is in a first serving cell. In some examples, the fifth PUCCH is in a serving cell which may be an intra-band cell as the first serving cell. In some examples, the fifth PUCCH and the fifth PUSCH are associated with same TRP/TRP group index. In some examples, the fifth PUSCH and the fifth PUCCH are associated with same priority index. In some examples, based on same TRP/TRP group index of the fifth PUSCH and the fifth PUCCH, the UE multiplex UCI of the fifth PUCCH into the fifth PUSCH, and/or transmits the fifth PUSCH and/or drops the fifth PUCCH. In some examples, the fifth PUSCH may fulfill UCI multiplexing timeline.

For the second timing, in some examples, the sixth PUSCH is in a first serving cell. In some examples, the sixth PUCCH is in a serving cell which is inter-band cell than the first serving cell. In some examples, the sixth PUCCH and the sixth PUSCH are associated with different TRP/TRP group index. In some examples, the sixth PUSCH and the sixth PUCCH are associated with same priority index. In some examples, based on different TRP/TRP group index of the sixth PUSCH and the sixth PUCCH, the UE may concurrently transmit the sixth PUCCH and the sixth PUSCH.

In some examples, UCI multiplexing timeline may be any one of any combined bullets below:

A first timing threshold (e.g., $T_{proc,1}^{mux}$) corresponds to (a required) time interval between PDSCH and PUCCH.

A second timing threshold (e.g., $T_{proc,release}^{mux}$) corresponds to (a required) time interval between PDCCH and PUCCH.

A third timing threshold (e.g., $T_{proc,2}^{mux}$) corresponds to (a required) time interval between PDCCH and PUSCH without aperiodic Channel State Information (CSI) report.

A fourth timing threshold (e.g., $T_{proc,csi}^{mux}$) corresponds to (a required) time interval between PDCCH and PUSCH with aperiodic CSI report.

The first/second/third/fourth threshold may correspond time interval between last symbol of earlier channel and first/starting symbol of latter channel of respective two channels for the first/second/third/fourth threshold.

In some examples, when the UE multiplex UCI on a resultant/specific/determined channel, the resultant/specific/determined channel needs to satisfy UCI multiplexing timeline. In some examples, if there are more than one candidate resultant/specific/determined channels satisfying UCI multiplexing timeline, the UE determines (e.g., selects) the resultant/specific/determined channel with earliest starting symbol.

In some examples, for per TRP UCI multiplexing timeline, for one or more PUSCH(s) or PUCCH(s) without (TRP) index or index associated with TRP or CORESET-PoolIndex, the one or more PUSCH(s) or PUCCH(s) corresponds to TRP with a first CORESETPoolIndex (e.g., CORESETPoolIndex=0). In some examples, the one or more PUSCH(s) or PUCCH(s) may be in serving cell(s) without being configured with CORESETPoolindex or mTRP operation for PDCCH, PDSCH, PUSCH, and/or PUCCH.

For example, in one slot/subslot, {uplink channel 1, 2, 3, 4, 5, 6, 7, 8} are partially or fully overlapping in time domain, and preferably associated with one or more serving cell(s). In the present disclosure, the term "slot/subslot" may refer to a slot and/or a subslot. In some examples, uplink channel 1, 3, 5, 7 is associated with a first index associated with TRP or associated with serving cell without being configured with mTRP operation for PDCCH, PDSCH, PUSCH, and/or PUCCH. In some examples, uplink channel 2, 4, 6, 8 is associated with a second index associated with TRP. In some examples, starting symbol of uplink channel {1, 2, 3, 4, 5, 6, 7, 8} is based on a non-strictly ascending order, and/or starting symbol of uplink channel i is the same or earlier than starting symbol of uplink channel i+1, wherein i=1~7. In some examples, ending symbol of each uplink channel is in a same slot/subslot. In some examples, for uplink channel 1, 3, 5, 7, the UE may determine (e.g., select) a first resultant/specific/determined channel for UCI multiplexing, and/or uplink channel 1 may be determined (e.g., selected) as the first resultant/specific/determined channel. In some examples, the first resultant/specific/determined channel is used for multiplexing UCI(s) in uplink channel 1, 3, 5, 7. In some examples, for uplink channel 2, 4, 6, 8, the UE may determine (e.g., select) a second resultant/specific/determined channel for UCI multiplexing, and/or uplink channel 2 may be determined (e.g., selected) as the second resultant/specific/determined channel. In some examples, the second resultant/specific/determined channel is used for multiplexing UCI(s) in uplink channel 2, 4, 6, 8 (even uplink channel 1 with earlier starting symbol satisfying UCI multiplexing for 8 uplink channels).

In some examples, the first set of PUSCHs and/or PUCCHs are associated with a first set of serving cells. In some examples, the second set of PUSCHs and/or PUCCHs are associated with a second set of serving cells. In some examples, the UE may multiplex UCI from PUCCHs in the first set of PUSCHs and/or PUCCHs into a first PUSCH. In some examples, the first PUSCH is in a first serving cell with lowest serving cell index among the first set of serving cells. In some examples, the first serving cell may not be with lowest serving cell index among serving cell(s) for the plurality of overlapping PUSCHs and PUCCHs. In some examples, the UE may multiplex UCI from PUCCHs in the second set of PUSCHs and/or PUCCHs into a second PUSCH. In some examples, the second PUSCH is in a second serving cell with lowest serving cell among the second set of serving cells. In some examples, the second serving cell may not be with lowest serving cell index among serving cell(s) for the plurality of overlapping PUSCHs and PUCCHs. In some examples, the first PUSCH may be overlapped with the second PUSCH in time domain. In some examples, the first PUSCH and the second PUSCH may be in same serving cell or in different cell. In some examples, the first PUSCH and the second PUSCH may be in inter-band cells or intra-band cells. In some examples, the first PUSCH may associated with same or different priority index than the second PUSCH. In some examples, the first PUSCH may be with earliest starting symbol among the first set of PUSCHs and/or PUCCHs.

In some examples, the first set of PUSCHs and/or PUCCHs are associated with a first CORESETPoolIndex. In some examples, the second set of PUSCH and/or PUCCHs are associated with a second CORESETPoolIndex. In some examples, the first set of PUSCHs and/or PUCCHs are associated with one or more serving cells being configured with single TRP (or without being configured with mTRP or without configured with CORESETPoolIndex), or associated with one or more serving cells comprising respective first TRP associated with the first CORESETPoolIndex. In some examples, the second set of PUSCHs and/or PUCCHs are associated with another one or more serving cells comprising respective second TRP associated with the second CORESETPoolIndex.

In some examples, the UE determines whether to perform per TRP based UCI multiplexing based on a number of joint/Downlink (DL)/UL TCI states in a beam indication DCI. In the present disclosure, the term "joint/DL/UL" may refer to joint, DL and/or UL.

In some examples, when a beam indication DCI indicates one joint/UL TCI state, the UE does not perform per TRP based UCI multiplexing or the UE performs UCI multiplexing among all overlapping uplink channels.

In some examples, when a beam indication DCI indicates two joint/UL TCI states, the UE may perform per TRP based UCI multiplexing.

In some examples, no matter a number of joint/UL TCI states indicated by a beam indication DCI, the UE does not perform per TRP based UCI multiplexing or the UE performs UCI multiplexing among all overlapping uplink channels.

In some examples, no matter a number of joint/UL TCI states indicated by a beam indication DCI, the UE may perform per TRP based UCI multiplexing.

In some examples, for a first TRP or TRP associated with a first index (e.g., CORESETPoolIndex, or TRP group index), the UE may receive a first beam indication DCI indicating joint/DL/UL TCI state for the first TRP. In some examples, with respect to a link between the first TRP and the UE, the link may be considered as single TRP operation.

In some examples, for a second TRP or TRP associated with a second index (e.g., CORESETPoolIndex, or TRP group index), the UE may receive a second beam indication DCI indicating joint/DL/UL TCI state for the second TRP. In some examples, with respect to a link between the second TRP and the UE, the link may be considered as single TRP operation.

In some examples, a first serving cell may comprise TRP1 and TRP2, wherein TRP1 is associated with a first index (e.g., CORESETPoolIndex, or TRP group index) and TRP2 is associated with a second index (e.g., CORESETPoolIndex, or TRP group index).

In some examples, a second serving cell may comprise TRP3 and TRP4, wherein TRP3 is associated with a first index (e.g., CORESETPoolIndex, or TRP group index) and TRP4 is associated with a second index (e.g., CORESETPoolIndex, or TRP group index).

In some examples, a third serving cell may comprise TRP5, wherein TRP5 is associated with a first index (e.g., CORESETPoolIndex, or TRP group index).

In some examples, a fourth cell may comprise TRP6, wherein the fourth cell may be a neighboring cell or non-serving cell or a cell with additionalPCI or additionalPCI-index, and TRP6 is associated with a second index (e.g., CORESETPoolIndex, or TRP group index).

In some examples, the fourth cell is associated with the third serving cell In some examples, TRP(s), among the first/second/third serving cell and fourth cell, and (the TRPs) being associated with the first index, if any, may be considered as a first group of TRP(s).

In some examples, TRP(s) among the first/second/third serving cell and fourth cell, and (the TRPs) being associated with the second index, if any, may be considered as a second group of TRP(s).

In some examples, after UCI multiplexing for a first CORESETPoolIndex or a first (TRP) index, the UE may perform one or more of the following: (i) the UE may transmit PUCCH1 on a first serving cell and PUSCH1 on a third serving cell, wherein priority index of the PUCCH1 and the PUSCH1 is different and preferably the UE supports inter-band concurrent (e.g., simultaneous) transmission of PUCCH and PUSCH, (ii) the UE may transmit either PUCCH1 or PUSCH1 which is associated with higher priority index, (iii) the UE may drop either PUCCH1 or PUSCH1 which is associated with lower priority index, and/or (iv) the UE may multiplex UCI of PUCCH1 on PUSCH1 and preferably drop PUCCH1, wherein PUCCH1 and PUSCH1 are associated with same priority index or preferably associated with different priority index.

In some examples, PUCCH1 and PUSCH1 may be in different serving cell.

In some examples, PUCCH1 and PUSCH1 are associated with inter-band cells.

In some examples, PUCCH1 and PUSCH1 are associated with the first set of PUSCHs and/or PUCCHs.

In some examples, UCI on PUCCH1 may be associated with one or more UCIs associated with a first CORESETPoolIndex or a first (TRP) index.

In some examples, PUSCH1 is associated with a first CORESETPoolIndex or a first (TRP) index.

In some examples, after UCI multiplexing for a second CORESETPoolIndex or a second (TRP) index, the UE may perform one or more of the following: (i) the UE may transmit PUCCH2 on a second serving cell and PUSCH2 on a fourth serving cell, wherein priority index of the PUCCH2 and the PUSCH2 is different and preferably the UE supports inter-band concurrent (e.g., simultaneous) transmission of PUCCH and PUSCH, (ii) the UE may transmit either PUCCH2 or PUSCH2 which is associated with higher priority index, (iii) the UE may drop either PUCCH2 or PUSCH2 which is associated with lower priority index, and/or (iv) the UE may multiplex UCI of PUCCH2 on PUSCH2 and preferably drop PUCCH2, wherein PUCCH2 and PUSCH2 are associated with same priority index or preferably associated with different priority index.

In some examples, PUCCH2 and PUSCH2 may be in different serving cell.

In some examples, PUCCH2 and PUSCH2 are associated with inter-band cells.

In some examples, PUCCH2 and PUSCH2 are associated with the second set of PUSCHs and/or PUCCHs.

In some examples, UCI on PUCCH2 may be associated with one or more UCIs associated with a second CORESETPoolIndex or a second (TRP) index.

In some examples, PUSCH2 is associated with a second CORESETPoolIndex or a second (TRP) index.

In some examples, the first serving cell may be the same as the third serving cell.

In some examples, the first serving cell is different than the third serving cell.

In some examples, the second serving cell may be the same as the fourth cell.

In some examples, the second serving cell is different than the fourth serving cell.

In some examples, PUSCH1, PUSCH2, PUCCH1, and/or PUCCH2 may be overlapped in time domain.

In some examples, PUSCH1, PUSCH2, PUCCH1, and/or PUCCH2 may be in a same slot or same subslot.

In some examples, PUSCH1 and PUSCH2 are overlapped in same serving cell.

In some examples, PUSCH1 and PUSCH2 are in time domain multiplexing.

In some examples, PUSCH1 and PUSCH2 are scheduled by a single DCI (e.g., a first DCI scheduling PUSCH1 and PUSCH2 on a same serving cell).

In some examples, PUSCH1, and/or PUSCH2 may be associated with configured grant PUSCH.

In some examples, PUSCH1 and PUSCH2 may associate with same CG index or different CG index.

In some examples, PUSCH1 may be scheduled by a first DCI and PUSCH2 and PUSCH3 may be scheduled by a second DCI.

In some examples, PUSCH1 and PUSCH2 are associated with same HARQ process number.

In some examples, the UE may transmit PUSCH1, PUSCH2, PUCCH1, and PUCCH2 concurrently (e.g., simultaneously).

In some examples, for same (TRP/TRP group) index or CORESETPoolIndex, the UE is not allowed to transmit same priority index control channel and shared channel on inter-band cell or preferably intra-band cell, and/or the UE may multiplex UCI of PUCCH into PUSCH. In some examples, for different (TRP) index or CORESETPoolIndex, the UE may transmit same priority index control channel and shared channel on inter-band cell or preferably intra-band cell.

In some examples, when the UE supports concurrent (e.g., simultaneous) transmission of inter-band PUSCH and PUCCH and when UE performs mTRP transmission (i.e., sDCI mTRP or mDCI mTRP), the UE may transmit PUCCH1 in the first serving cell and PUSCH2 in the fourth serving cell, wherein PUCCH1 is associated with same priority index as PUSCH2. In some examples, the first serving cell and the fourth cell are in different band. In some examples, the UE does not multiplex UCI on PUCCH1 into PUSCH2. In some examples, the UE may concurrently (e.g., simultaneously) transmit PUCCH1 and PUSCH2.

In some examples, when the UE supports concurrent (e.g., simultaneous) transmission of inter-band PUSCH and PUCCH and when UE performs mTRP transmission (i.e., sDCI mTRP or mDCI mTRP), the UE may transmit PUCCH2 in the second serving cell and PUSCH1 in the third serving cell, wherein PUCCH2 is associated with same priority index as PUSCH1. In some examples, the UE does not multiplex UCI on PUCCH2 into PUSCH1. In some examples, the UE may concurrently (e.g., simultaneously) transmit PUCCH2 and PUSCH1.

In some examples, the UE is configured to separately transmit UCI for different TRP.

In some examples, the UE is configured with concurrent (e.g., simultaneous) UCI feedback for different TRP.

In some examples, TRP1 and TRP2 of cell 2 may have same Timing Advance.

In some examples, TRP1 and TRP2 of cell 2 may have same Time Alignment.

In some examples, TRP1 and TRP2 of cell 2 may have different Timing Advances.

In some examples, TRP1 and TRP2 of cell 2 may have different Time Alignments.

In some examples, PUSCH to TRP1 of cell 2

In some examples, PUSCH to TRP2 of cell 2

A third concept of the present disclosure may be that UE may receive a signal for providing information of which scheme for PUCCH transmission. Candidate/possible PUCCH scheme may be single TRP without repetition, single TRP with repetition, intra-slot TDM mTRP PUCCH, inter-slot TDM mTRP PUCCH, FDM mTRP PUCCH, and/or SDM mTRP PUCCH. The signal may be DCI, Medium Access Control (MAC) Control Element (CE), or RRC signaling. In some examples, the signal may be configuration for PUCCH resource, configuration for PUCCH format, configuration for PUCCH resource set, configuration for PUCCH, configuration for UL Bandwidth Part (BWP), configuration for one serving cell, configuration for one or more serving cells, or configuration for a cell group or a PUCCH group. In some examples, the signal may be a scheduling DCI with or without downlink assignment. In some examples, the signal may be a scheduling DCI with or without uplink assignment.

In some examples, the UE may switch/change scheme for PUCCH transmission based on at least the signal. In some examples, the signal may be the same as beam indication signaling (e.g., a beam indication DCI which is a DL DCI format with TCI field indicating a TCI code-point from a MAC CE comprising joint or DL or ULTCI state).

In some examples, the UE may dynamically switch between single TRP with repetition and FDM/SDM mTRP PUCCH. In the present disclosure, the term "FDM/SDM" may refer to FDM and/or SDM.

In some examples, the UE may dynamically switch between single TRP without repetition and FDM/SDM mTRP PUCCH.

In some examples, the UE may dynamically switch between single TRP with repetition and TDM mTRP PUCCH.

In some examples, the UE may dynamically switch between single TRP without repetition and TDM mTRP PUCCH.

In some examples, the UE is configured with one of FDM, SDM, or TDM for mTRP PUCCH.

In some examples, even when beam indication DCI indicates a TCI codepoint with two joint/UL TCI states, the signal may indicate whether to use first or second joint/UL TCI states (i.e., the signal may dynamically indicate switching between mTRP operation and single TRP operation).

In some examples, when beam indication DCI indicates a TCI codepoint with two joint/UL TCI states or there are two active joint/UL TCI states, the UE may perform mTRP PUCCH. In some examples, when beam indication DCI indicates a TCI codepoint with one joint/UL TCI states or there is one active joint/UL TCI state, the UE may perform single TRP PUCCH.

In some examples, TDM/FDM/SDM may be based on the signaling. In other words, when the signaling indicates FDM, the UE may consider FDM mTRP PUCCH with a pair of PUCCH. In some examples, one PUCCH of the pair of PUCCH starts in one Physical Resource Block (PRB) index and the other PUCCH of the pair of PUCCH starts in another PRB index. In some examples, one PUCCH of the pair of PUCCH is associated with one joint/UL TCI and the other PUCCH of the pair of PUCCH is associated with another joint/UL TCI.

In some examples, for FDM/SDM mTRP PUCCH (and when beam indication DCI indicates two joint/UL TCI states and/or there are two active joint/UL TCI states, for example) the UE may ignore configuration of a number of repeated slots (e.g., nrofslots, or pucch-RepetitionNrofSlots) if/when the UE is (also) configured with configuration of a number of repeated slots for one PUCCH. In some examples, for FDM/SDM mTRP PUCCH (and when beam indication DCI indicates one joint/UL TCI states and/or there is (e.g., only) one active joint/UL TCI state, for example), the UE may apply configuration of a number of repeated slots (e.g., nrofslots, or pucch-RepetitionNrofSlots) if/when the UE is (also) configured with configuration of a number of repeated slots for one PUCCH. In some examples, the UE may transmit PUCCH with repetition via same UL TCI state or beam (if beam indication DCI indicates one joint/UL TCI state).

In some examples, configuration of PUCCH resource may comprise a parameter (e.g., one parameter) to configure whether TDM, FDM, SDM mTRP PUCCH is configured. In some examples, the parameter (e.g., the one parameter) is applicable when beam indication DCI indicates two joint/UL TCI states or there are two active joint/UL TCI states. In some examples, the parameter is NOT applicable when beam indication DCI indicates (e.g., only) one joint/UL TCI states or there is (e.g., only) one active joint/UL TCI states. In some examples, when the UE is configured with TDM mTRP PUCCH (i.e., whether to have inter or intra slot mTRP PUCCH may be based on whether the UE is configured with subslot), the UE may be configured with a number of repeated slots. In this example, consistent configuration may be that when there are configuration for TDM mTRP PUCCH, the UE may be configured with a number of repeated slots. In some examples, when the UE is configured with FDM or SDM (concurrent uplink transmission on one serving cell), the UE does not expect to be configured with a number of repeated slots. In some examples, there is a restriction in network node that the network node is not allowed or the network node prevents from or prohibits that concurrently configuring the UE with FDM/SDM mTRP uplink operation (e.g., concurrent uplink transmission) with a number of repeated slots/a number of repetition/PUSCH aggregation factor.

Alternatively and/or additionally, the UE may be concurrently configured with repetition scheme and a number of repeated slots for one PUCCH resource (e.g., configuration of PUCCH resource may be replaced by any other configuration). In some examples, the UE may, based on a number joint/UL TCI states (being used or activated or being indicated by beam indication DCI), determine whether to apply a number of repeated slots for one PUCCH resource.

To enhance 3GPP specification, such as 3GPP TS 38.331 V17.0.0, for wireless communication in accordance with some embodiments herein, Enhancements 1-2 are provided herein. Enhancements 1-2 are reflective of implementation in accordance with some embodiments herein, and comprise modifications to various sections of 3GPP specifications. According to some embodiments, one, some and/or all of Enhancements 1-2 may be implemented and/or a portion of one, some and/or all of Enhancements 1-2 may be implemented.

Enhancement 1 may be implemented according to one or more embodiments of the present disclosure, such as one or more embodiments of the third concept. In Enhancement 1, addition 1 is made to a first section of 3GPP TS 38.331 V17.0.0. In some examples, embodiments of the third concept may be implemented via addition 1 in Enhancement 1. To distinguish addition 1 from what is originally included in the first section of 3GPP TS 38.331 V17.0.0, addition 1 is in bold, and is preceded by the term "ADDITION 1 STARTS:" and followed by the term "ADDITION 1 ENDS". In some examples, T (indicated in addition 1) is associated with inter-slot TDM mTRP PUCCH or intra-slot TDM mTRP PUCCH. In some examples, S (indicated in addition 1) is associated with SDM mTRP PUCCH.

| Enhancement 1: |  |
|---|---|
| PUCCH-ResourceExt-v1610 ::= | SEQUENCE { |
|   interlaceAllocation-r16 | SEQUENCE { |
|     rb-SetIndex | INTEGER (0..4), |
|     interlace0 | CHOICE { |
|       scs15 | INTEGER (0..9), |
|       scs30 | INTEGER (0..4) |
|     } |  |
|   } |  |
| OPTIONAL, -- Need R |  |
|   format-v1610 | CHOICE { |
|     interlace1-v1610 | INTEGER (0..9), |
|     occ-v1610 | SEQUENCE { |
|       occ-Length-v1610 | ENUMERATED |
| {n2,n4} | OPTIONAL, -- Need M |
|       occ-Index-v1610 | ENUMERATED |
| {n0,n1,n2,n3} | OPTIONAL -- Need M |
|     } |  |
|   } |  |
| OPTIONAL, --Need R |  |
| ..., |  |
| [ [ |  |
|   formatExt-v1700 | SEQUENCE { |
|     nrofPRBs-r17 | INTEGER (1..16) |
|   } |  |
| OPTIONAL, -- Need R |  |
| ADDITION 1 STARTS: |  |
|   pucch-Repetitionscheme | ENUMERATED { T, S } |
| OPTIONAL -- Need M |  |
| ADDITION 1 ENDS |  |
|   pucch-RepetitionNrofSlots-r17 | ENUMERATED { n2,n4,n8 } |
| OPTIONAL --Need M |  |
| ] ] |  |
| } |  |

Enhancement 2 may be implemented according to one or more embodiments of the present disclosure, such as one or more embodiments of the third concept. In Enhancement 2, addition 2 is made to the first section of 3GPP TS 38.331 V17.0.0. In some examples, embodiments of the third concept may be implemented via addition 2 in Enhancement 2. To distinguish addition 2 from what is originally included in the first section of 3GPP TS 38.331 V17.0.0, addition 2 is in bold, and is preceded by the term "ADDITION 2 STARTS:" and followed by the term "ADDITION 2 ENDS". In some examples, S (indicated in addition 2) is associated with SDM mTRP PUCCH.

| Enhancement 2: |  |
|---|---|
| PUCCH-ResourceExt-v1610 ::= | SEQUENCE { |
|   interlaceAllocation-r16 | SEQUENCE { |
|     rb-SetIndex | INTEGER (0..4), |
|     interlace0 | CHOICE { |
|       scs15 | INTEGER (0..9), |
|       scs30 | INTEGER (0..4) |
|     } |  |
|   } |  |
| OPTIONAL, -- Need R |  |
|   format-v1610 | CHOICE { |
|     interlace1-v1610 | INTEGER (0..9), |
|     occ-v1610 | SEQUENCE { |
|       occ-Length-v1610 | ENUMERATED |
| {n2,n4} | OPTIONAL, -- Need M |
|       occ-Index-v1610 | ENUMERATED |
| {n0,n1,n2,n3} | OPTIONAL -- Need M |
|     } |  |
|   } |  |
| OPTIONAL, -- Need R |  |
| ..., |  |
| [ [ |  |
|   formatExt-v1700 | SEQUENCE { |
|     nrofPRBs-r17 | INTEGER (1..16) |
|   } |  |
| OPTIONAL, -- Need R |  |
| ADDITION 2 STARTS: |  |
|   pucch-mTRP | CHOICE { |
|     Simultaneous-PUCCH { S} |  |
| OPTIONAL -- Need M |  |
| ADDITION 2 ENDS |  |
|   pucch-RepetitionNrofSlots-r17 | ENUMERATED { n2,n4,n8 } |
| OPTIONAL -- Need M |  |
| ] ] } |  |
| } |  |

In some examples, for FDM mTRP PUCCH, the UE is (further) configured with an offset between two FDM PUCCHs. In some examples, the offset may be configured with per PUCCH resource. In some examples, the offset is PRB between a pair of PUCCH resource. In some examples, the pair of PUCCH resource comprises two PUCCH resources with different starting PRBs. In some examples, FDM mTRP PUCCH may comprise same PRB for hopping. In some examples, for example, one PUCCH resource comprising X symbols in time domain with hopping may be earlier X/2 symbols (with ceiling or floor function) being in PRB(s) (e.g., PRB index Y(~Z)) and latter X/2 symbols (with floor or ceiling function) being in PRB(s) (e.g., PRB index W(~Q)). In some examples, when considering FDM mTRP PUCCH, PUCCHi may be earlier X/2 symbols (with ceiling or floor function) being in PRB(s) (e.g., PRB index Y(~Z)) and latter X/2 symbols (with floor or ceiling function) being in PRB(s) (e.g., PRB index W(~Q)) and PUCCHj may be earlier X/2 symbols (with ceiling or floor function) being in PRB(s) (e.g., PRB index W(~Q)) and latter X/2 symbols (with floor or ceiling function) being in PRB(s) (e.g., PRB index Y(~Z)). Alternatively and/or In some examples, for configuration of one PUCCH is with hopping and with an offset, for determining a pair of FDM PUCCH resource, PUCCHi is earlier X/2 symbols (with ceiling or floor function) being in PRB(s) (e.g., PRB index Y(~Z)) and latter X/2 symbols (with floor or ceiling function) being in PRB(s) (e.g., PRB index W(~Q)) and PUCCHj is (further) based on the offset. In some examples, the offset for hop with lower PRB index is with plus function (e.g., PRB index plus the offset for determining one hop of PUCCHj). In some examples, the offset for hop with higher PRB index is with minus function (e.g., PRB index minus the offset for determining the other hop of PUCCHj). In some examples, one possible configuration for FDM mTRP PUCCH may be that the UE is configured with PUCCH with hopping, wherein first hop in first half of one PUCCH resource in PRB Y(~Z) and second hop in second half of the one PUCCH resource in PRB W(~Q) are associated with a first joint/UL TCI state, and first hop in first half of another PUCCH resource in PRB W(~Q) and second hop in second half of the another PUCCH resource in PRB Y(~Z) are associated with a second joint/UL TCI state In some examples, PUCCH may be replaced by PUSCH.

A fourth concept of the present disclosure may be that (for sDCI based mTRP) when a UE receives a DCI scheduling two concurrent uplink transmissions/channels (preferably with same or different starting symbol) on a first serving cell, and the DCI requests (aperiodic) CSI report (e.g., CSI request field is set to 1), the UE may transmit aperiodic (AP) CSI report on both two concurrent uplink transmissions/ channels. In some examples, the UE transmits AP CSI report on both two concurrent uplink transmissions/channels regardless of/no matter whether there is UCI other than AP CSI report being overlapped with the two concurrent uplink transmissions/channels in time domain In some examples, whether there is inter-slot/subslot repetition, same/different starting symbol of two concurrent uplink transmissions/channels, whether there is another UCI other than AP CSI report, and/or sDCI/mDCI based mTRP may impact whether UE transmits/multiplexes AP CSI report on one or two transmission occasions. In the present disclosure, the term "sDCI/mDCI" may refer to sDCI and/or mDCI. In some examples, the UE determines whether to use one transmission occasion to transmit and/or multiplex AP CSI report or to use two transmission occasions to transmit and/or multiplex AP CSI report based on (i) whether there is inter-slot/subslot repetition, (ii) whether two concurrent uplink transmissions/channels both have the same starting symbol or different starting symbols, (iii) whether there is another UCI (available for transmission, for example) other than AP CSI report, and/or (iv) sDCI/mDCI based mTRP.

In some examples, one transmission occasion may correspond to one of two concurrent uplink transmissions/ channels. In some examples, two transmission occasions may correspond to both of two concurrent uplink transmissions/channels.

In some examples, when the two concurrent uplink transmissions/channels are with different starting symbols (in a slot, for example), the UE transmits AP CSI report on both two concurrent uplink transmissions/channels. Alternatively and/or additionally, when the two concurrent uplink transmissions/channels are with different starting symbols (in a slot, for example), the UE transmits AP CSI report on one of two concurrent uplink transmissions/channels (which starts earlier).

In some examples, when the two concurrent uplink transmissions/channels are with different starting symbols (in a slot, for example) and the UE may multiplex another UCI other than AP CSI report, the UE transmits AP CSI report (multiplexed with the another UCI, for example) on one of the two concurrent uplink transmissions/channels (which starts earlier). Alternatively and/or additionally, when the two concurrent uplink transmissions/channels are with different starting symbols (in a slot, for example) and the UE may multiplex another UCI other than AP CSI report, the UE transmits AP CSI report (multiplexed with the another UCI, for example) on both of the two concurrent uplink transmissions/channels.

In some examples, when the two concurrent uplink transmissions/channels are with different starting symbols (in a slot, for example) and there is another UCI other than AP CSI report overlapping with the two concurrent uplink transmissions/channels, the UE transmits AP CSI report (multiplexed with the another UCI, for example) on one of the two concurrent uplink transmissions/channels (which starts earlier). Alternatively and/or additionally, when the two concurrent uplink transmissions/channels are with different starting symbols (in a slot, for example) and there is another UCI other than AP CSI report overlapping with the two concurrent uplink transmissions/channels, the UE transmits AP CSI report (multiplexed with the another UCI, for example) on both of the two concurrent uplink transmissions/channels.

In some examples, when the two concurrent uplink transmissions/channels are with same starting symbols (in a slot, for example), the UE transmits AP CSI report on both two concurrent uplink transmissions/channels. Alternatively and/or additionally, when the two concurrent uplink transmissions/channels are with same starting symbols (in a slot, for example), the UE transmits AP CSI report on one of two concurrent uplink transmissions/channels.

In some examples, when the two concurrent uplink transmissions/channels are with same starting symbols (in a slot, for example) and the UE may multiplex another UCI other than AP CSI report, the UE transmits AP CSI report (multiplexed with the another UCI, for example) on one of the two concurrent uplink transmissions/channels. Alternatively and/or additionally, when the two concurrent uplink transmissions/channels are with same starting symbols (in a slot, for example) and the UE may multiplex another UCI other than AP CSI report, the UE transmits AP CSI report (multiplexed with the another UCI, for example) on both of the two concurrent uplink transmissions/channels.

In some examples, when the two concurrent uplink transmissions/channels are with same starting symbols (in a slot, for example) and there is another UCI other than AP CSI report overlapping with the two concurrent uplink transmissions/channels, the UE transmits AP CSI report (multiplexed with the another UCI, for example) on one of the two concurrent uplink transmissions/channels. Alternatively and/or additionally, when the two concurrent uplink transmissions/channels are with same starting symbols (in a slot, for example) and there is another UCI other than AP CSI report overlapping with the two concurrent uplink transmissions/channels, the UE transmits AP CSI report (multiplexed with the another UCI, for example) on both of the two concurrent uplink transmissions/channels.

In some examples, the one of two concurrent uplink transmissions/channels may be determined (e.g., derived) based on one or more of the following: (i) which uplink transmission/channel is associated with a first joint/UL TCI state, (ii) which uplink transmission/channel is associated with joint/UL TCI state which is associated with serving cell or without additionalPCI/additionalPCIindex, (iii) which uplink transmission/channel is associated with lower index (e.g., additionalPCI/additionalPCI index), (iv) which uplink transmission/channel is associated with first SRS resource set (which is with lower SRS resource set index than second SRS resource set), and/or (v) which uplink transmission/ channel starts earlier.

In some examples, the one of two concurrent uplink transmissions/channels may be determined (e.g., derived) based on one or more of the following: (i) which uplink transmission/channel is associated with a second joint/UL TCI state, (ii) which uplink transmission/channel is associated with joint/UL TCI state which is associated with neighboring serving cell or with additionalPCI/additionalPCIindex, (iii) which uplink transmission/channel is associated with higher index (e.g., additionalPCI/additionalPCI index), (iv) which uplink transmission/channel is associated with second SRS resource set (which is with higher SRS resource set index than first SRS resource set, for example), and/or (v) which uplink transmission/channel starts latter.

In some examples, a number of repeated slots is configured by RRC signaling or indicated by DCI may be concurrently applied with two transmissions/channels (e.g., two concurrent transmission/channels) per slot/subslot. In some examples, the number of repeated slots may be PUSCH aggregation factor (e.g., semi-statically configured) or a repetition number (e.g., semi-statically configured and/or dynamically indicated). In some examples, when there is a number of repeated slots being concurrently applied with two transmissions/channels (e.g., two concurrent transmission/channels) per slot/subslot, each slot or subslot may have two transmission occasions (e.g., with same or different starting symbols).

In some examples, (when the two concurrent uplink transmissions/channels are with same/different starting symbols (in a slot), for example), the UE may multiplex and/or transmit AP CSI report on both two concurrent uplink transmissions/channels in the earliest slot/subslot. In some examples, for transmission occasion(s) in remaining slot/subslot, the UE does not multiplex and/or not transmit AP CSI report.

In some examples, (when the two concurrent uplink transmissions/channels are with same/different starting symbols (in a slot), for example), the UE may multiplex and/or transmit AP CSI report on first channel of both two concurrent uplink transmissions/channels in the earliest slot/subslot, and the first channel may be associated with the first SRS resource set (which is with lower SRS resource set index than second SRS resource set). In some examples, (when the two concurrent uplink transmissions/channels are with different starting symbols (in a slot), for example), the UE may multiplex and/or transmit AP CSI report on second channel of both two concurrent uplink transmissions/channels in the second earliest slot/subslot, and the second channel may be associated with the second SRS resource set (which is with higher SRS resource set index than first SRS resource set, for example). In some examples, for transmission occasion(s) in remaining slot/subslot, the UE does not multiplex and/or not transmit AP CSI report. In some examples, the UE does not multiplex and/or not transmit AP CSI report in second channel which is associated with second SRS resource set in the earliest slot/subslot. In some examples, the UE does not multiplex and/or not transmit AP CSI report in first channel which is associated with first SRS resource set in the second earliest slot/subslot.

In some examples, when there is another UCI other than AP CSI report overlapping with the two concurrent uplink transmissions/channels or the UE may multiplex another UCI other than AP CSI report, the UE multiplex or transmits AP CSI report (multiplexed with the another UCI, for example) on one of the two concurrent uplink transmissions/channels.

In some examples, both the first and the second SRS resource set are configured for codebook based PUSCH transmission or non-codebook based PUSCH transmission.

In some examples, the another UCI may be in a second serving cell.

In some examples, for TDM repetition of uplink transmission/channel, AP CSI report can be multiplexed or transmitted on a first channel in earliest slot and a second channel in second earliest slot. In some examples, if there is another UCI other than AP CSI report overlapping with the two concurrent uplink transmissions/channels or the UE may multiplex another UCI other than AP CSI report, the UE multiplex or transmits AP CSI report (multiplexed with the another UCI, for example) on a second channel which is in earliest slot and associated with second SRS resource set. In some examples, the first channel is associated with first SRS resource set.

Alternatively and/or additionally, the fourth concept may be (for mDCI based mTRP) when a UE receives a first DCI scheduling a first PUSCH and a second DCI scheduling a second PUSCH, and the first PUSCH and the second PUSCH are be scheduled as two concurrent uplink transmissions/channels (e.g., with same or different starting symbol) on a first serving cell. In some examples, the first DCI is associated with a first index (e.g., CORESETPoolindex=0, or first group index). In some examples, the second DCI is associated with a second index (e.g., CORESETPoolindex=1, or second group index). In some examples, at least one of the first and the second DCI requests (aperiodic) CSI report (e.g., CSI request field is set to 1), the UE may transmit at least a first AP CSI report on both two concurrent uplink transmissions/channels. Alternatively and/or additionally, the UE may transmit at least a first AP CSI report on respective PUSCH. In some examples, based on which DCI requesting CSI report, the UE transmits and/or multiplex the first CSI report on the first or the second PUSCH.

In some examples, both sDCI and mDCI based MTRP may use same AP CSI report method as described above.

A fifth concept of the present disclosure may be that for a first type of UCI which is not associated with a first TRP/TRP group nor associated with a second TRP/TRP group, one alternative is that a UE determines the first type of UCI can be multiplexed into (any) PUSCH/PUCCH associated with the first TRP/TRP group or (any) PUSCH/PUCCH associated with the second TRP/TRP group. Alternatively and/or additionally, a UE determines the first type of UCI is multiplexed into PUSCH/PUCCH which is associated with the first TRP/TRP group (e.g., TRP/TRP group with lower TRP/TRP group index). Alternatively and/or additionally, when the UE may transmit two concurrent (e.g., simultaneous) PUSCHs in a first serving cell, the UE may multiplex the first type of UCI into both the two concurrent PUSCHs.

In some examples, for a second type of UCI which is associated with either a first TRP/TRP group or associated with a second TRP/TRP group, one alternative is that a UE may multiplex the second type of UCI into respective PUCCH/PUSCH with respect to same TRP/TRP group. In some examples, the UE multiplex the second type of UCI into (any) PUSCH/PUCCH associated with the first TRP/TRP group or (any) PUSCH/PUCCH associated with the second TRP/TRP group. Alternatively and/or additionally, when the UE may transmit two concurrent (e.g., simultaneous) PUSCHs in a first serving cell, the UE may multiplex the second type of UCI into both the two concurrent PUSCHs.

For example, when the UE may transmit two concurrent (e.g., simultaneous) PUSCHs in the first serving cell, the UE may multiplex the first type of UCI into both the two concurrent PUSCHs. And the UE may multiplex a second type of UCI associated with the first TRP/TRP group into a first PUSCH (associated with the first TRP/TRP group) of the two concurrent PUSCHs and multiplex a second type of UCI associated with the second TRP/TRP group into a second PUSCH (associated with the second TRP/TRP group) of the two concurrent PUSCHs.

A sixth concept of the present disclosure may be that (for mDCI based mTRP operation), a UE may multiplex UCI of a PUCCH associated with a first TRP/TRP group and UCI of a PUCCH associated with a second TRP/TRP group into one same PUSCH. The PUCCH associated with the first TRP/TRP group and the PUCCH associated with the second TRP/TRP group are overlapped, and/or starting symbol of the PUCCH associated with the first TRP/TRP group and starting symbol of the PUCCH associated with the second TRP/TRP group. Alternatively and/or additionally, the sixth concept may be (for mDCI based mTRP operation), a UE may multiplex both UCIs into two overlapping PUSCHs in a serving cell, wherein one of the two PUSCHs is associated with the first TRP/TRP group and the other of the two PUSCHs is associated with the second TRP/TRP group. In some examples, the two PUSCHs is overlapping with the two PUCCHs in time domain. Alternatively and/or additionally, when there are respective PUSCH for each TRP/TRP group, the UE may multiplex UCI of PUCCH associated with the first TRP/TRP group into one PUSCH of the two PUSCHs which is associated with the first TRP/TRP group. In some examples, when there are respective PUSCH for each TRP/TRP group, the UE may multiplex UCI of PUCCH associated with the second TRP/TRP group into one PUSCH of the two PUSCHs which is associated with the second TRP/TRP group. In one example, in an exemplary scenario 900 of FIG. 9, TRPA and TRP1 are associated with a first TRP/TRP group, and TRPB and TRP2 are associated with a second TRP/TRP group. In a first example, the UE may multiplex UCI of PUCCH to TRPA into PUSCH to TRP1, and multiplex UCI of PUCCH to TRPB into PUSCH to TRP2, respectively. In a second example, the UE may multiplex both UCI of PUCCH to TRPA and UCI of PUCCH to TRPB into either PUSCH to TRP1 or PUSCH to TRP2. In a third example, the UE may multiplex both UCI of PUCCH to TRPA and UCI of PUCCH to TRPB into both PUSCH to TRP1 and PUSCH to TRP2.

Alternatively and/or additionally, the sixth concept may be that (for mDCI based mTRP operation), a UE is not allowed to multiplex UCI of a PUCCH associated with a first TRP/TRP group and UCI of a PUCCH associated with a second TRP/TRP group into one same PUSCH. In some examples, based on same TRP/TRP group index between both UCI(s) and the one PUSCH, the UE may determine whether to multiplex UCI associated with the first TRP/TRP group or UCI associated with the second TRP/TRP group into the one PUSCH. For example, in an exemplary scenario 800 of FIG. 8, when cell 2 is without being configured with TRP/TRP group (index), the UE may determine PUSCH to cell 2 is associated with a first TRP/TRP group (as the UE may be configured with TRP/TRP group (index) in cell 1). The UE merely multiplex UCI of PUCCH to TRPA into PUSCH to cell 2 (if TRP is associated with the first TRP/TRP group). The UE may drop PUCCH to TRPB or does not transmit PUCCH to TRPB. The UE does not concurrently transmit PUCCH to TRPB to cell 1 and PUSCH to cell 2. The UE drops PUCCH to TRPA to cell 1 and/or the UE does not transmit PUCCH to TRPA to cell 1 (as the UE has multiplexed UCI of PUCCH to TRPA into the PUSCH to cell 2). For another example, when cell 2 is associated with mTRP operation or the UE is configured with TRP/TRP group (index) in cell 2, the PUSCH to cell 2 may associate with a first/second TRP/TRP group index. In some examples, based on the first/second TRP/TRP group index of the PUSCH to cell 2, the UE may determine whether to multiplex UCI associated with the first TRP/TRP group or UCI associated with the second TRP/TRP group into the PUSCH to cell 2.

In some examples, based on joint HARQ feedback mode (or mode for separate HARQ feedback scheme with concurrent, such as simultaneous, transmission) for mTRP (e.g., ackNackFeedbackMode="joint"), the UE may multiplex both UCI0 and UCI1 into a PUSCH. In some examples, UCI0 and UCI1 is associated with different TRP/TRP group. In some examples, when there is (e.g., only) one PUSCH overlapping with PUCCH for UCI0 and PUCCH for UCI1 in time domain. In some examples, the UCI0 and UCI1 may concentrate based on (ascending) order of associated TRP/TRP group index.

In some examples, based on separate HARQ feedback mode (or mode for separate HARQ feedback scheme with concurrent, such as simultaneous, transmission) for mTRP (e.g., ackNackFeedbackMode="separate" or "simultaneous with separate"), the UE is not allowed to multiplex UCI0 and UCI1 into a PUSCH. In some examples, UCI0 and UCI1 is associated with different TRP/TRP group. In some examples, when there is (e.g., only) one PUSCH overlapping with PUCCH for UCI0 and PUCCH for UCI1 in time domain, UE may multiplex either UCI0 or UCI1 into the one PUSCH. In some examples, based on same TRP index between the one PUSCH and UCI0/UCI1, the UE may determine to multiplex UCI0 or UCI1 into the one PUSCH. In some examples, if the one PUSCH is without being configured with TRP/TRP group index (e.g., CORESET-PoolIndex), the UE may determine to multiplex UCI0 or UCI1 based on which SRS resource set index associated with the one PUSCH. In some examples, if the one PUSCH is without being configured with TRP/TRP group index (e.g., CORESETPoolIndex), the UE may determine to the one PUSCH is associated with a first TRP/TRP group index (e.g., CORESETPoolindex=0). In some examples, the UE may be configured with mTRP operation on one of serving cell(s), or the UE may be configured with mDCI based mTRP operation, or the UE may be configured with TRP/TRP group index on one of serving cell(s). In some examples, the one PUSCH is in a first serving cell different than serving cell for PUCCH for UCI0 and different than serving cell for PUCCH for UCI1. In some examples, serving cell for PUCCH for UCI0 may be the same or different than serving cell for PUCCH for UCI1. In some examples, (when the UE multiplex UCI0 into the one PUSCH), the UE may transmit the one PUSCH and PUCCH for UCI1 concurrently (e.g., simultaneously) and/or drops PUCCH for UCI0. In some examples, (based on separate HARQ feedback mode) the UE is not allowed to multiplex UCI belonging to different TRP/TRP group index into the one PUSCH.

A seventh concept of the present disclosure may be that a UE may provide information associated with its capability regarding whether to support two concurrent (e.g., simultaneous) transmissions/channels in respective serving cells (i.e., a first feature) and/or whether to support two concurrent (e.g., simultaneous) transmissions/channels in one same serving cell (i.e., a second feature), and/or whether to support both features (i.e., the first and the second feature) (concurrently, such as simultaneously, and/or in the same Transmission Time Interval (TTI)/slot). In some examples, the UE supports the first feature for a given TTI (e.g., slot/subslot). In some examples, the UE supports the first feature when a number of channel in a given TTI in each of respective serving cells for two concurrent (e.g., simultaneous) transmissions/channels is one (i.e., one channel in a first serving cell and one channel in a second serving cell), the UE may transmit two concurrent (e.g., simultaneous) transmissions/channels in respective serving cells. In some examples, the UE may be configured with inter-slot or intra-slot TDM mTRP PUCCH/PUSCH in one serving cell. In some examples, for a given TTI, when the UE may transmit a first PUSCH in a first serving cell and a second PUCCH in a second serving cell, the UE may transmit the first PUSCH and the second PUCCH concurrently (e.g., simultaneously) (even the first PUSCH or the second PUCCH is associated with mTRP operation which is TDM mTRP PUSCH/PUCCH). In some examples, the first PUSCH may be single TRP PUSCH or the first serving cell is without being configured with mTRP operation or TRP/TRP group index. In some examples, the second PUCCH may be single TRP PUCCH or the second serving cell is without being configured with mTRP operation or TRP/TRP group index.

Figure 9:
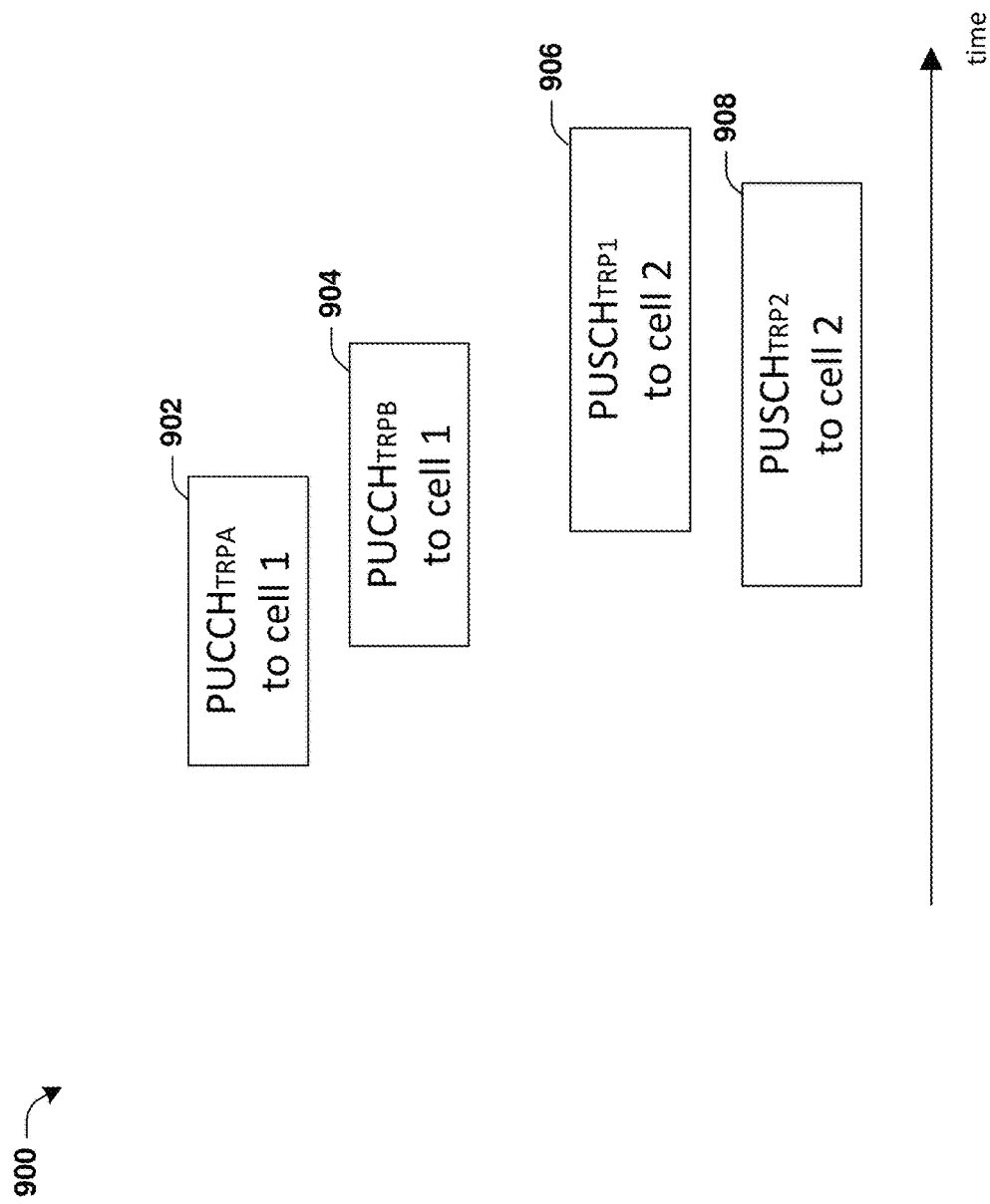
FIG. 9 is a timing diagram illustrating an exemplary scenario associated with a UE transmitting overlapping PUCCH and/or PUSCH according to one exemplary embodiment.

In some examples, when the UE faces with situation of an exemplary scenario 900 of FIG. 9 without supporting both features (concurrently, such as simultaneously, and/or in the same TTI/slot). In some examples, two PUSCHs in FIG. 5 may be DG PUSCH, CG PUSCH, or msg3/A PUSCH. In some examples, two PUCCHs in FIG. 5 may be semi-persistent configured PUCCH (e.g., SR, periodic CSI report, and/or semi-persistent CSI report). In some examples, the UE may perform per TRP/TRP group UCI multiplexing. In some examples, then after UCI multiplexing, the UE may transmit merely the PUSCH to TRP1 and TRP2 of cell 2.

For example, when the UE does not support both features (concurrently, such as simultaneously, and/or in the same TTI/slot, for example) and the situation (e.g., concurrent transmissions of PUCCH in a first serving cell and PUSCH in a second serving cell, and/or concurrent transmissions of two PUCCHs in the first serving cell or two PUSCHs in the second serving cell) occurs, the UE may perform one or more of the following: (i) multiplex UCI on PUCCH(s) into PUSCH(s) (and drop PUCCH(s)), (ii) multiplex UCI on a PUCCH into the other PUCCH (and transmit the other PUCCH and drop the PUCCH)), (iii) transmit PUSCH(s) (and drop (UCI on) one PUCCH or both PUCCHs), (iv) transmit PUCCH(s) (and drop one PUSCH or both PUSCHs), (v) transmit one PUCCH and one PUSCH (and drop the other PUCCH and/or the other PUSCH), and/or (vi) transmit one PUCCH and one PUSCH (and drop the other PUCCH and/or the other PUSCH).

In some examples, the transmitted PUCCH/PUSCH may associate with a higher priority index (e.g., priority index=1).

Alternatively and/or additionally, seventh concept may be a network node is not allowed to concurrently configure a UE with two concurrent (e.g., simultaneous) transmissions/channels in two serving cells (the first feature) and two concurrent (e.g., simultaneous) transmissions/channels in one same serving cell (the second feature). In some examples, in response to receiving capability of UE (supporting both the first and the second feature), a network node is not allowed to concurrently configure the first and the second feature. In some examples, the network node may configure the UE with either the first feature or the second feature. In short, in some examples, feature of concurrent (e.g., simultaneous) uplink transmission via two panels and/or feature of concurrent (e.g., simultaneous) PUCCH and PUSCH on different cells may not concurrently be supported and/or configured.

In some examples, the first feature may be inter-band concurrent (e.g., simultaneous) transmission of PUCCH and PUSCH.

In some examples, the second feature may be mTRP operation, FDM or SDM of two concurrent (e.g., simultaneous) uplink transmissions via two UE panels (to different TRPs). In some examples, same type of channel for two concurrent (e.g., simultaneous) uplink transmissions is applied (e.g., PUSCH+PUSCH, or PUCCH+PUCCH).

With respect to one or more embodiments herein, such as one or more techniques, devices, concepts, methods, example scenarios and/or alternatives described above, in some examples, UCI multiplexing on PUSCH in one slot may be replaced by UCI multiplexing on PUSCH in one subslot. In some examples, subslot may be 7 or 2 symbols in one slot. In some examples, one slot may comprise more than one subslots.

With respect to one or more embodiments herein, in some examples, UCI may be HARQ information, SR, and/or CSI report.

With respect to one or more embodiments herein, in some examples, UCI may be aperiodic, periodic, and/or semi-persistent.

With respect to one or more embodiments herein, in some examples, UE is configured to separately transmit HARQ associated with different CORESETPoolIndex or different TRP. In some examples, UE may need to transmit With respect to one or more embodiments herein, in some examples, UE is configured to multiplex HARQ associated with different CORESETPoolIndex or different TRP.

With respect to one or more embodiments herein, in some examples, a UE is capable of performing concurrent (e.g., simultaneous) uplink transmission via multiple UE panels (e.g., multiple separate and/or different UE panels). The UE may switch from concurrent (e.g., simultaneous) uplink transmission (e.g., concurrent uplink transmission via multiple UE panels) to single uplink transmission (e.g., uplink transmission via one multiple UE panel at a given time). Alternatively and/or additionally, the UE may switch from single uplink transmission (e.g., uplink transmission via one multiple UE panel at a given time) to concurrent (e.g., simultaneous) uplink transmission (e.g., concurrent uplink transmission via multiple UE panels).

With respect to one or more embodiments herein, in some examples, in NR, Physical Uplink Shared Channel (PUSCH) transmission may be non-codebook (NCB)-based or codebook (CB)-based. For CB-based PUSCH, a Sounding Reference Signal (SRS) resource set for CB PUSCH may be configured to UE (e.g., the UE may be configured with the SRS resource set for CB PUSCH) and a network may determine uplink channel condition and identify which UE beam is preferred (e.g., strong Reference Signal Received Power (RSRP) and/or less interference) based on measuring SRS in the SRS resource set. In some examples, the UE beam may be selected based on a determination (e.g., a determination based on measuring one or more SRSs in the SRS resource set) that the UE beam has a strong RSRP (e.g., a RSRP that is higher than a threshold and/or higher than other RSRPs of one or more other UE beams) and/or less interference (e.g., less interference than a threshold and/or less interference than one or more other UE beams). The network may schedule CB PUSCH via DCI indicating Transmit Precoding Matrix Index (TPMI) (for indicating precoding in UE side, for example) and SRS Resource Indicator (SRI) (for indicating which beam and/or power related control to use, for example).

With respect to one or more embodiments herein, in some examples, NCB-based PUSCH, an SRS resource set for NCB PUSCH may be configured to UE (e.g., the UE may be configured with the SRS resource set for NCB PUSCH) and a network may determine uplink channel condition and identify which UE beam is preferred (e.g., strong RSRP and/or less interference) based on a Channel State Information (CSI) report of the UE (e.g., a CSI report associated with the UE, such as a CSI report transmitted by the UE). In some examples, the UE beam may be selected based on a determination (e.g., a determination based on the CSI report of the UE) that the UE beam has a strong RSRP (e.g., a RSRP that is higher than a threshold and/or higher than other RSRPs of one or more other UE beams) and/or less interference (e.g., less interference than a threshold and/or less interference than one or more other UE beams). NCB-based PUSCH may be based on downlink/uplink (DL/UL) channel reciprocity. The network may schedule NCB PUSCH via DCI indicating SRI (for indicating which beam and power related control to use, for example). The UE may determine which precoding to use based on a Channel State Information based Reference Signal (CSI-RS) associated with the SRI.

Figure 5:
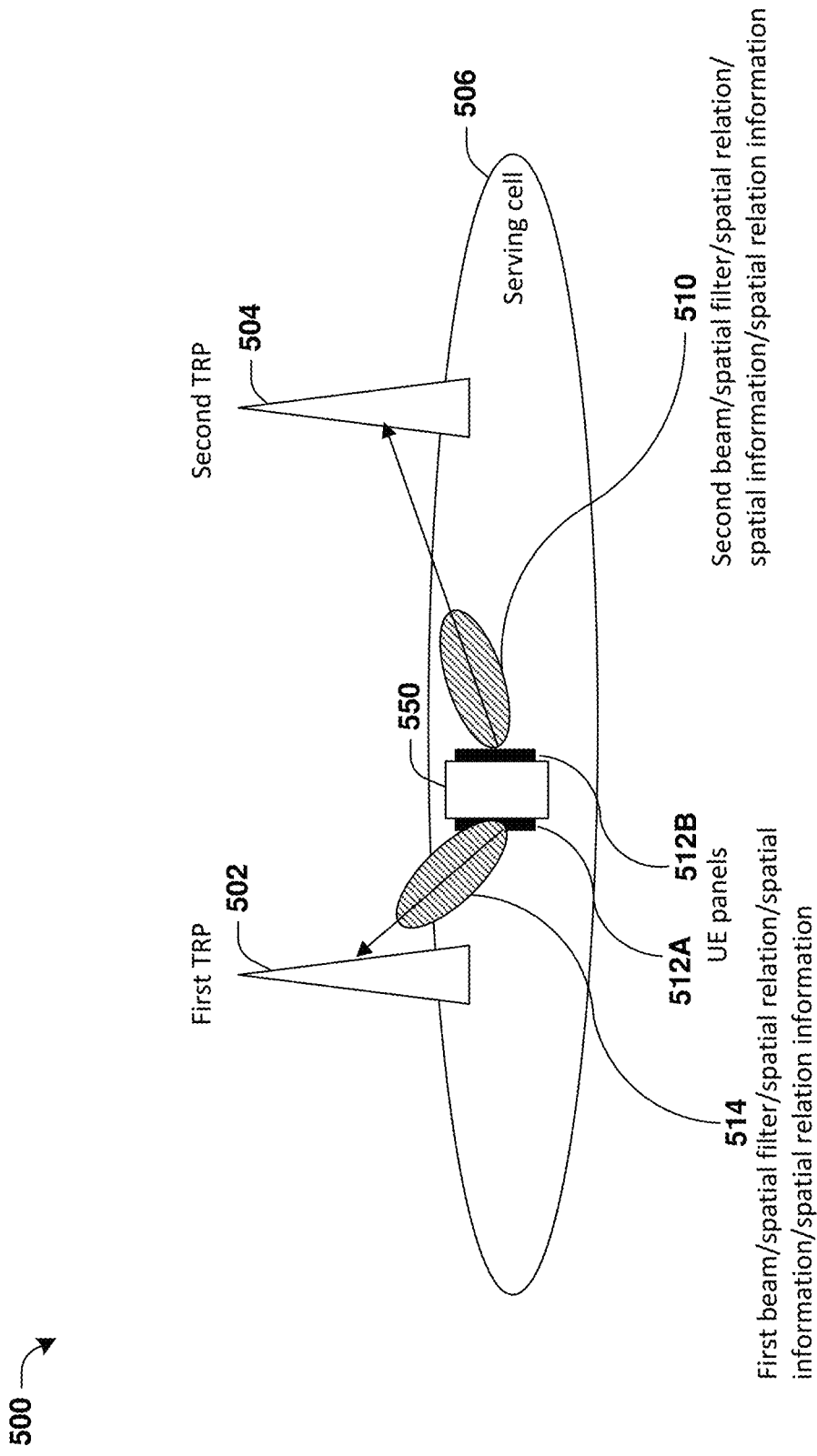
FIG. 5 is a diagram illustrating an exemplary scenario associated with a UE, a first transmission and/or reception point (TRP) and/or a second TRP according to one exemplary embodiment.

With respect to one or more embodiments herein, in some examples, a UE may communicate with a plurality of TRPs comprising a first TRP and a second TRP. FIG. 5 illustrates a scenario 500 in which the UE (shown with reference number 550) communicates with the first TRP (shown with reference number 502) and the second TRP (shown with reference number 504) in a serving cell 506 (e.g., a single serving cell). For example, in the scenario 500, the first TRP 502 and the second TRP 504 may both be in the serving cell 506.

Figure 6:
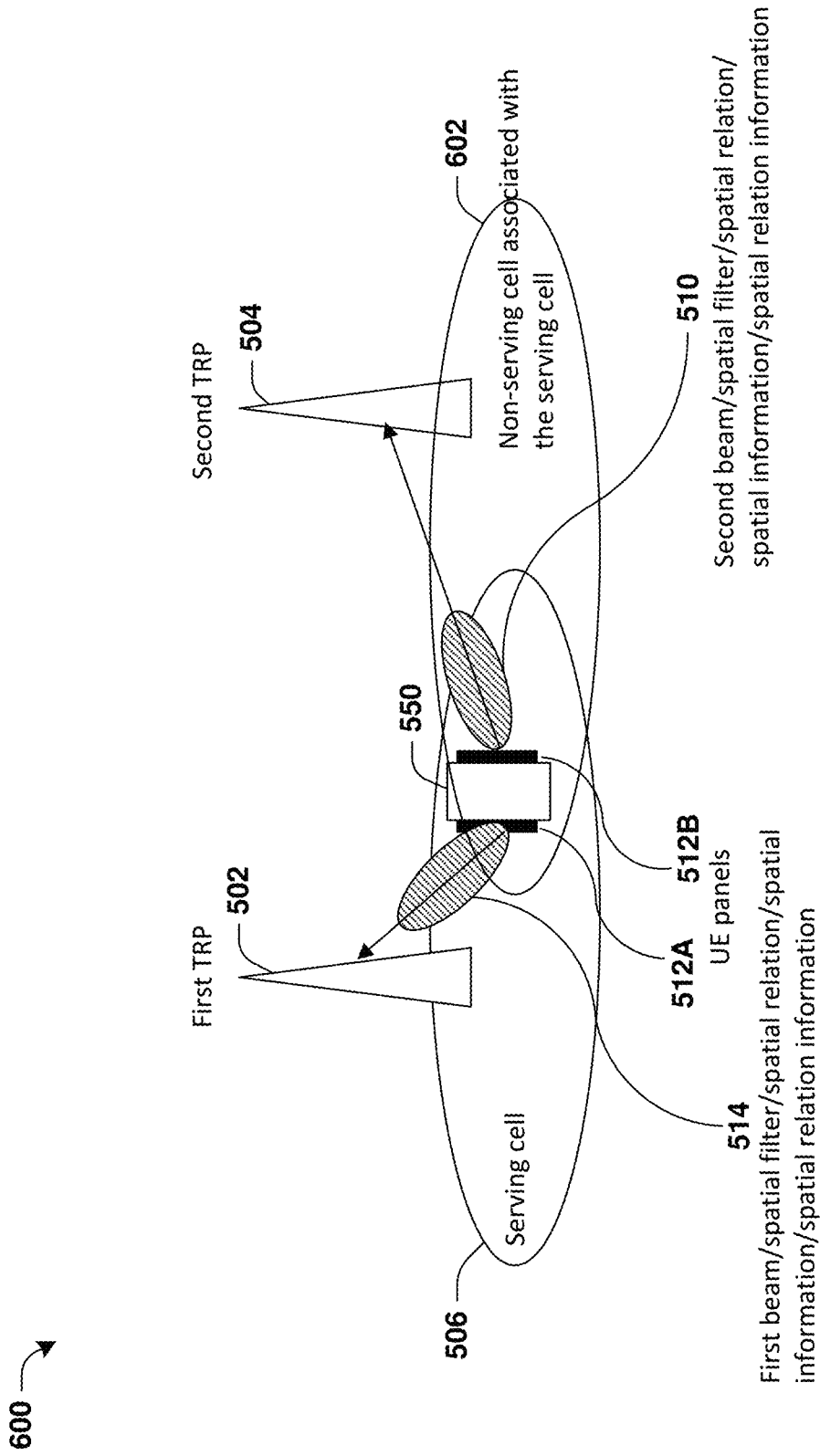
FIG. 6 is a diagram illustrating an exemplary scenario associated with a UE, a first TRP and/or a second TRP according to one exemplary embodiment.

FIG. 6 illustrates a scenario 600 in which the UE 550 communicates with the first TRP 502 and the second TRP 504, wherein the first TRP 502 is in the serving cell 506 and the second TRP 504 is in a cell 602, such as a non-serving cell and/or a neighbor cell. For example, rather than both the first TRP 502 and the second TRP 504 being in the serving cell 506 (such as shown in the scenario 500 of FIG. 5), the first TRP 502 and the second TRP 504 may be in different cells in the scenario 600.

In some examples, such as in the scenario 500 shown in FIG. 5 and in the scenario 600 shown in FIG. 6, the UE 550 may communicate with the first TRP 502 via a first UE panel 512A and/or the UE 550 may communicate with the second TRP 504 via a second UE panel 512B. In some examples, communication between the first TRP 502 and the UE 550 may be via a first beam/spatial filter/spatial relation/spatial information/spatial relation information 514. In the present disclosure, the term "beam/spatial filter/spatial relation/spatial information/spatial relation information" may correspond to a beam, a spatial filter, a spatial relation, spatial information and/or spatial relation information. In some examples, communication between the second TRP 504 and the UE 550 may be via a second beam/spatial filter/spatial relation/spatial information/spatial relation information 510.

Figure 7:
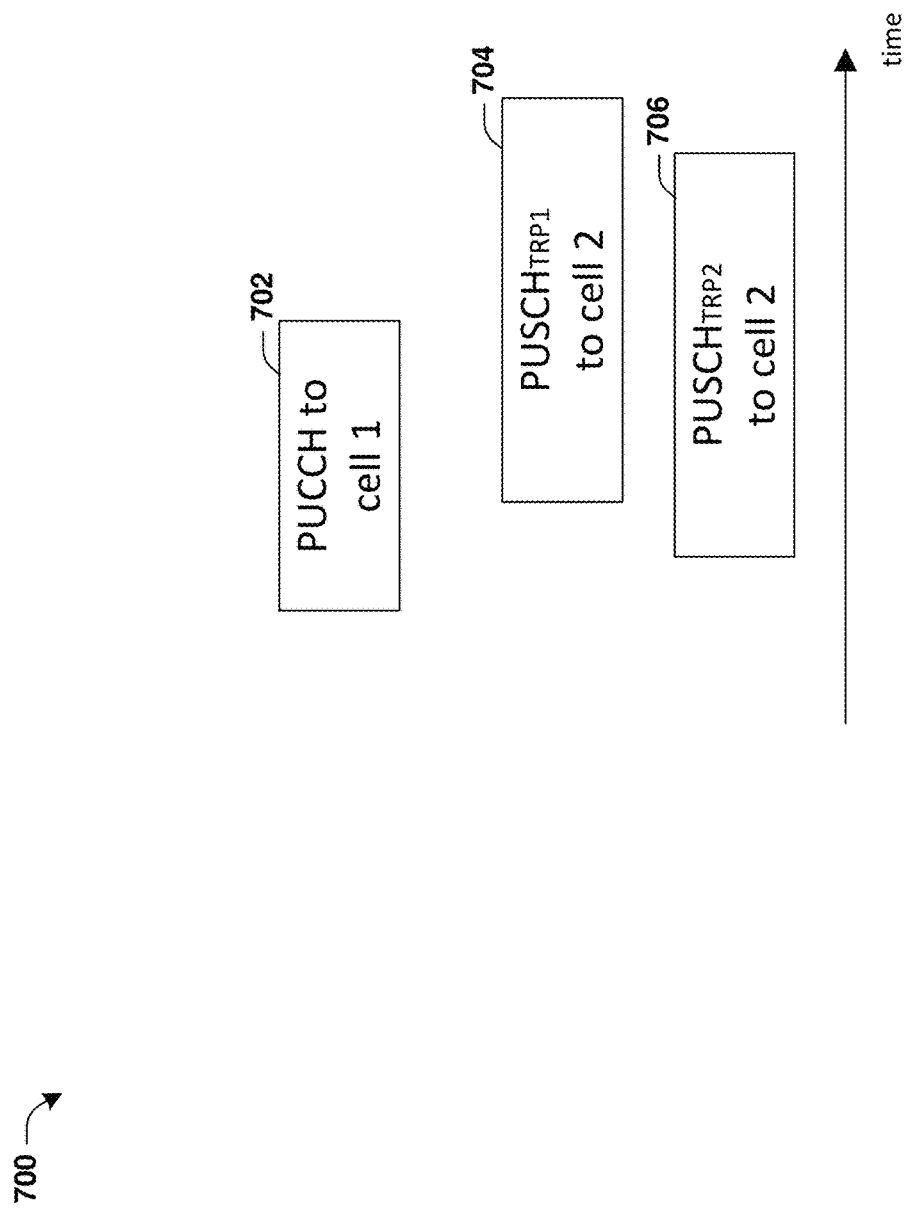
FIG. 7 is a timing diagram illustrating an exemplary scenario associated with a UE transmitting overlapping Physical Uplink Control Channel (PUCCH) and/or Physical Uplink Shared Channel (PUSCH) according to one exemplary embodiment.

In some examples, such as in the scenario 500 shown in FIG. 5 and in the scenario 600 shown in FIG. 6, the UE may perform (e.g., transmit) a first uplink transmission via the first beam/spatial filter/spatial relation/spatial information/spatial relation information 514 (e.g., the first uplink transmission may be transmitted to the first TRP 502). In some examples, the UE may perform (e.g., transmit) a second uplink transmission via the second beam/spatial filter/spatial relation/spatial information/spatial relation information 510 (e.g., the second uplink transmission may be transmitted to the second TRP 504). The first uplink transmission and the second uplink transmission may be performed (e.g., transmitted by the UE) concurrently (e.g., simultaneously). FIG. 7 illustrates a timing diagram of an exemplary scenario 700 associated with a UE transmitting PUCCH 702 to cell 1, PUSCH 704 to TRP1 of cell 2, and/or PUSCH 706 to TRP2 of cell 2, wherein these three channels are overlapped (e.g., at least partially overlap) in time domain. In some examples, a starting symbol of PUSCH 704 to TRP1 of cell 2 and a starting symbol of PUSCH 706 to TRP2 of cell 2 may be different (as shown in the exemplary scenario 700 of FIG. 7) or the same. In some examples, the UE may transmit PUSCH 704 to TRP1 of cell 2 via a first joint/UL TCI state and/or a first spatial relation. In some examples, the UE may transmit PUSCH 706 to TRP2 of cell 2 via a second joint/UL TCI state and/or a second spatial relation. In some examples, the UE may transmit PUCCH 702 to cell 1 via a third joint/UL TCI state and/or a third spatial relation. In some examples, the UE may receive a first beam indication DCI for cell 2 and a second beam indication DCI for cell 1 (since cell 1 and cell 2 are inter-band cells, for example). In some examples, the three channels are (at least) in a same slot/subslot.

In some examples, when starting symbol of two PUSCHs 704 and 706 are the same (e.g., the two PUSCHs 704 and 706 start at the same starting symbol) and the UE multiplexes a UCI on the PUCCH 702 into PUSCH on cell 2, the UE may multiplex the UCI on both PUSCH (e.g., the UE may multiplex the UCI into PUSCH 704 and may multiplex the UCI into PUSCH 706). Alternatively and/or additionally, the UE may multiplex UCI on one PUSCH of the two PUSCHs 704 and 706. For example, the UE may multiplex the UCI into a PUSCH, of the two PUSCHs 704 and 706, that has a lower index (e.g., CORESETPoolIndex, TRP group index, SRS resource set index) than the other PUSCH of the two PUSCHs 704 and 706 (e.g., if PUSCH 704 has a lower index than PUSCH 706, the UE may multiplex the UCI into PUSCH 704 and/or may not multiplex UCI into PUSCH 706). In some examples, when the UE multiplex UCI on PUSCH (e.g., PUSCH 704 and/or PUSCH 706), the UE drops PUCCH 702 to cell 1.

In some examples, for per TRP UCI multiplexing, when PUCCH 702 to cell 1 is without being configured with index associated with TRP (e.g., when PUCCH 702 to cell 1 is not configured with an index associated with TRP and/or when the UE is not configured with a TRP-associated index associated with PUCCH 702), UCI on PUCCH 702 to cell 1 may be determined as being associated with a first index. In some examples, the UE may determine (e.g., select) either PUSCH 704 to TRP1 or PUSCH 706 to TRP2 for multiplexing the UCI. In some examples, based on which PUSCH is associated with the first index, the UE multiplex the UCI into the determined PUSCH. In an example in which PUSCH 704 to TRP1 is associated with the first index, even if PUSCH 706 to TRP2 is earlier than PUSCH 704 to TRP1, since PUSCH 704 to TRP1 is associated with the first index (while PUSCH 706 to TRP2 is associated with second index different than the first index, for example), the UE may multiplex the UCI on PUSCH 704 to TRP1. In some examples, both PUSCH (e.g., both PUSCH 704 and PUSCH 706) satisfy UCI multiplexing timeline. In some examples, when the UE multiplexes UCI on PUSCH (e.g., PUSCH 704 and/or PUSCH 706), the UE drops PUCCH 702 to cell 1.

In some examples, considering priority index aspect, if priority index of PUSCH 704 to TRP1 and/or PUSCH 706 to TRP2 is different than priority index of PUCCH, the UE may concurrently (e.g., simultaneously) transmit three channels (e.g., PUCCH 702, PUSCH 704 and/or PUSCH 706). In some examples, the UE transmits the three channels when the UE supports concurrent (e.g., simultaneous) PUSCH and PUCCH transmission (with different priority index, for example). In some examples, the UE transmits the three channels when cell 1 and cell 2 are in different bands (e.g., inter-band cells). In some examples, the UE may be configured whether to concurrently transmit PUSCH and PUCCH (e.g., whether the UE concurrently transmits PUSCH and PUCCH is based on a configuration with which the UE is configured), wherein one of PUSCH or PUCCH (e.g., PUCCH 702, PUSCH 704 or PUSCH 706) is associated with FDM/SDM mTRP operation (e.g., concurrent, such as simultaneous, transmission within one serving cell). In some examples, PUCCH (e.g., PUCCH 702) may comprise UCI associated with priority index=1 (e.g., higher priority) and PUSCH 704 and 706 to TRP1 and TRP2 may be associated with priority index=0 (e.g., lower priority). In some examples, if the UE does not support concurrent (e.g., simultaneous) transmission of PUSCH and PUCCH, the UE prioritizes and/or transmits channel with higher priority index (e.g., higher priority) and/or drops or does not transmit channel with lower priority index (e.g., lower priority).

In some examples, the UE may consider two PUSCHs as one pair of PUSCHs. In some examples, for the one pair of PUSCHs, one PUSCH may be used as reference PUSCH. In some examples, the reference PUSCH may start earlier than other PUSCH of the pair of PUSCHs. In some examples, the reference PUSCH may be associated with lower or higher index (e.g., CORESETPoolindex, TRP group index, SRS resource set index) than the other PUSCH of the pair of PUSCHs. In some examples, when the UE multiplex UCI into PUSCH, the UE uses at least the reference PUSCH (e.g., the UE multiplexes UCI into at least the reference PUSCH). In some examples, once the reference PUSCH is multiplexed with UCI, the other PUSCH in the pair is also multiplexed with the UCI. In some examples, the UE multiplexes the UCI into the reference PUSCH, and after multiplexing the UCI into the reference PUSCH, the UE multiplexes the UCI into the other PUSCH. In some examples, when performing multiplexing procedure, PUSCH of a pair which is not a reference PUSCH is excluded for determining multiplexing (e.g., the other PUSCH may not be used for multiplexing the UCI and/or the reference PUSCH may be the only PUSCH used for multiplexing the UCI). Alternatively and/or additionally, the UE may merely multiplex UCI on the reference PUSCH and/or may not multiplex UCI on the other PUSCH (which is not reference PUSCH) in the pair of PUSCH. In some examples, when the UE multiplex UCI on PUSCH, the UE drops PUCCH to cell 1.

Figure 8:
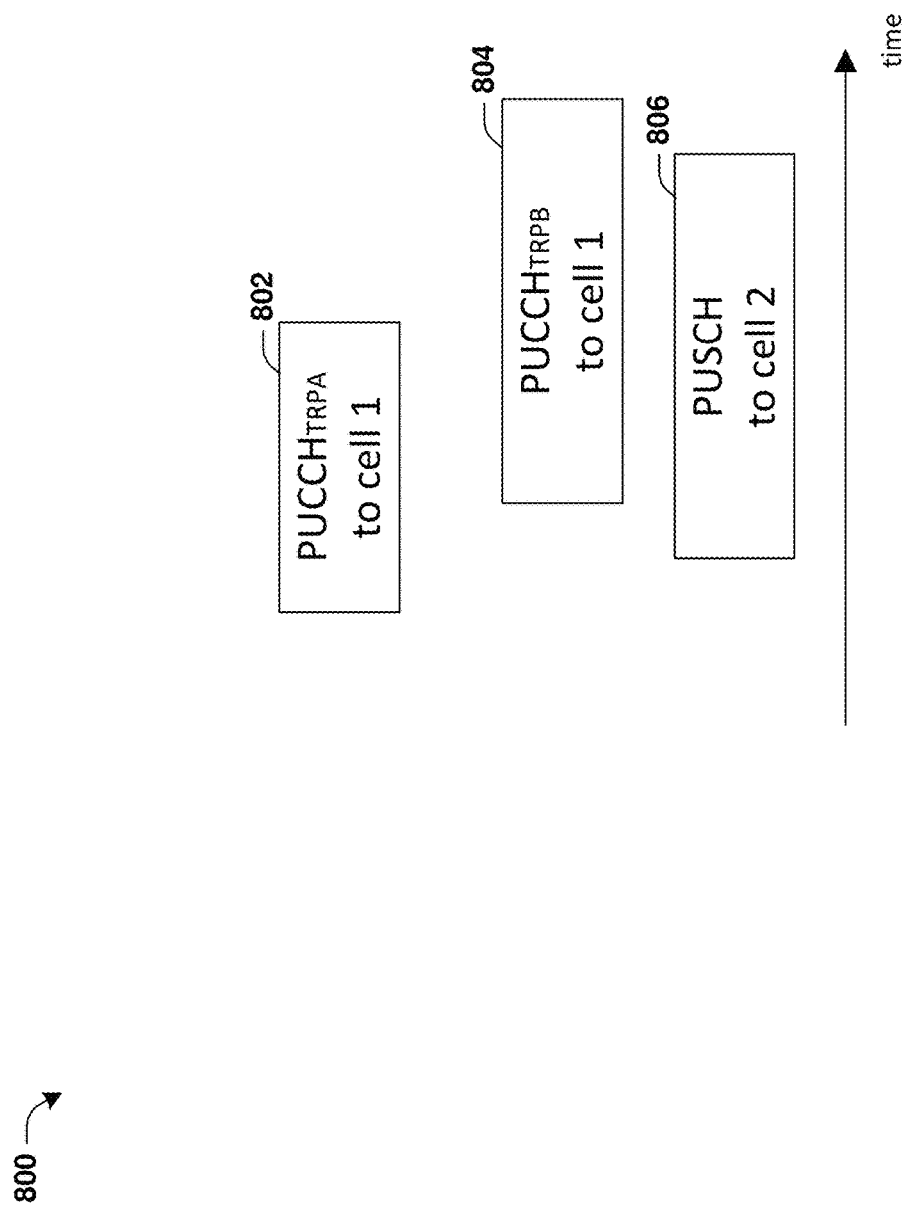
FIG. 8 is a timing diagram illustrating an exemplary scenario associated with a UE transmitting overlapping PUCCH and/or PUSCH according to one exemplary embodiment.

FIG. 8 illustrates a timing diagram of an exemplary scenario 800 associated with a UE transmitting PUSCH 806 to cell 2, PUCCH 802 to TRPA of cell 1, and PUCCH 804 to TRPB of cell 1, wherein these three channels are overlapped (e.g., at least partially overlap) in time domain. In some examples, a starting symbol of PUCCH 802 to TRPA of cell 1 and starting symbol of PUCCH 804 to TRPB of cell 1 may be different (as shown in the exemplary scenario 800 of FIG. 8) or the same. In some examples, the UE may transmit PUCCH 802 to TRPA of cell 1 via a first joint/UL TCI state and/or a first spatial relation. In some examples, the UE may transmit PUCCH 804 to TRPB of cell 1 via a second joint/UL TCI state and/or a second spatial relation. In some examples, the UE may transmit PUSCH 806 to cell 2 via a third joint/UL TCI state and/or a third spatial relation. In some examples, the UE may receive a first beam indication DCI for cell 2 and a second beam indication DCI for cell 1 (since cell 1 and cell 2 are inter-band cells, for example). In some examples, the three channels are (at least) in a same slot/subslot.

In some examples, when starting symbol of two PUCCHs 802 and 804 are the same (e.g., the two PUCCHs 802 and 804 start at the same starting symbol) and the UE multiplexes UCI0 (which is discussed in the foregoing description with respect to the sixth concept, for example) on the PUCCH 802 to TRPA and UCI1 (which is discussed in the foregoing description with respect to the sixth concept, for example) on the PUCCH 804 to TRPB, respectively. Alternatively and/or additionally, the UE may multiplex UCI0+UCI1 (which is discussed in the foregoing description with respect to the sixth concept, for example) on the PUCCH 802 to TRPA (which is associated with the first index, for example). Alternatively and/or additionally, the UE may multiplex UCI0+UCI1 on both PUCCHs 802 and 804.

In some examples, for joint HARQ feedback mode, PUSCH 806 to cell 2 may comprise UCI from both PUCCHs 802 and 804 (and/or said UCI0 and UCI1 discussed in the foregoing description with respect to the sixth concept, for example).

In some examples, for per TRP UCI multiplexing, when PUSCH 806 to cell 2 is without being configured with index associated with TRP (e.g., when PUSCH 806 to cell 2 is not configured with an index associated with TRP and/or when the UE is not configured with a TRP-associated index associated with PUSCH 806), PUSCH 806 to cell 2 may be determined as being associated with a first index. In some examples, the UE may multiplex UCI of PUCCH 802 to TRPA into PUSCH 806 to cell 2.

In some examples, considering priority index aspect, after multiplexing UCI of PUCCH 802 to TRPA into PUSCH 806 to cell 2, the UE may transmit PUCCH 804 to TRPB and PUSCH 806 to cell 2 (with UCI of PUCCH 802 to TRPA, for example) concurrently (e.g., simultaneously). In some examples, the UE concurrently (e.g., simultaneously) transmits PUCCH 804 to TRPB and PUSCH 806 to cell 2 when cell 1 and cell 2 are inter-band cells (e.g., cell 1 and cell 2 are associated with different bands) and/or the UE supports simultaneous transmission of PUCCH and PUSCH. In some examples, priority index of PUCCH 804 to TRPB may be same or different than priority index of PUSCH 806 to cell 2. In some examples, for PUSCH with multiplexed UCI from PUCCH 802 to TRPA, if priority index of PUCCH 804 to TRPB is different from priority index of PUSCH to cell 2, higher priority index may be determined as priority index of PUSCH with multiplexed UCI. In some examples, for inter-TRP group among cells (e.g., inter-TRP group may refer to with different TRP group indexes, such as where cell 1 is associated with a different TRP group index than cell 2), concurrent (e.g., simultaneous) PUCCH and PUSCH transmission on different cells (e.g., inter-band cells) may be associated with the same priority index or different priority indexes. In some examples, for intra-TRP group among cells (e.g., cell 1 and cell 2 are associated with the same TRP group index), concurrent (e.g., simultaneous) PUCCH and PUSCH transmission on different cells (e.g., inter-band cells) is associated with different priority indexes.

In some examples, the UE may consider two PUCCHs as one pair of PUCCHs. In some examples, for the one pair of PUCCHs, one PUCCH may be used as reference PUCCH. In some examples, the reference PUCCH may start earlier than other PUCCH of the pair of PUCCHs. In some examples, the reference PUCCH may be associated with lower or higher index (e.g., CORESETPoolindex, TRP group index, SRS resource set index) than the other PUCCH of the pair of PUCCHs. In some examples, when the UE multiplex UCI into PUSCH, the UE uses at least the reference PUCCH (e.g., the UE multiplexes at least UCI of the reference PUCCH into the PUSCH). In some examples, once the reference PUCCH (e.g., UCI corresponding to the reference PUCCH) is multiplexed into PUSCH, the other PUCCH in the pair is also multiplexed into PUSCH. In some examples, the UE multiplexes the reference PUCCH (e.g., UCI corresponding to the reference PUCCH) into PUSCH, and after multiplexing the reference PUCCH into the PUSCH, the UE multiplexes the other PUCCH (e.g., UCI corresponding to the other PUCCH) into the PUSCH (e.g., PUSCH 806). In some examples, when performing multiplexing procedure, PUCCH of a pair which is not a reference PUCCH is excluded for determining multiplexing (e.g., the other PUCCH may not be multiplexed into PUSCH and/or the reference PUCCH may be the only PUCCH multiplexed into PUSCH). Alternatively and/or additionally, the UE may merely multiplex UCI of the reference PUCCH and/or may not multiplex UCI of the other PUCCH (which is not reference PUCCH) in the pair of PUCCH. In some examples, a motivation and/or rationale (for merely multiplexing UCI of the reference PUCCH, for example) may be that same UCI content are associated with the pair of PUCCHs (e.g., UCI of the reference PUCCH is the same as UCI of the other PUCCH). In some examples, the pair of PUCCHs may be associated with the same UCI content when sDCI scheduling PUCCH with FDM/SDM mTRP operation (e.g., concurrent, such as simultaneous, PUCCH transmission associated with a DCI). In some examples, for mDCI mTRP PUCCH, a pair of PUCCHs may be applicable.

FIG. 9 illustrates a timing diagram of an exemplary scenario 900 associated with a UE transmitting PUSCH 906 to TRP1 of cell 2, PUSCH 908 to TRP2 of cell 2, PUCCH 902 to TRPA of cell 1, and PUCCH 904 to TRPB of cell 1, wherein these four channels are overlapped in time domain. In some examples, starting symbol of PUCCH 902 to TRPA of cell 1 and starting symbol of PUCCH 904 to TRPB of cell 1 may be different (as shown in the exemplary scenario 900 of FIG. 9) or the same. In some examples, the UE may transmit PUCCH 902 to TRPA of cell 1 via a first joint/UL TCI state and/or a first spatial relation. In some examples, the UE may transmit PUCCH 904 to TRPB of cell 1 via a second joint/UL TCI state and/or a second spatial relation. In some examples, the UE may transmit PUSCH 906 to TRP1 of cell 2 via a third joint/UL TCI state and/or a third spatial relation. In some examples, the UE may transmit PUSCH 908 to TRP2 of cell 2 via a fourth joint/UL TCI state and/or a fourth spatial relation. In some examples, the UE may receive a first beam indication DCI for cell 2 and a second beam indication DCI for cell 1 (since cell 1 and cell 2 are inter-band cells, for example). In some examples, the four channels are (at least) in a same slot/subslot.

In some examples, the UE may multiplex UCI of PUCCH 902 to TRPA into PUSCH 906 to TRP1 based on same TRP group index (e.g., the UE may multiplex UCI of PUCCH 902 to TRPA into PUSCH 906 to TRP1 based on TRPA and TRP1 being associated with the same TRP group index). In some examples, the UE may multiplex UCI of PUCCH 904 to TRPB into PUSCH 908 to TRP2 based on same TRP group index (e.g., the UE may multiplex UCI of PUCCH 904 to TRPB into PUSCH 908 to TRP2 based on TRPB and TRP2 being associated with the same TRP group index).

In some examples, embodiments of the present disclosure may include any of the techniques provided herein with respect to FIGS. 7-9. In some examples, techniques provided herein with respect to FIGS. 7-9 may be implemented independently and/or separately. Alternatively and/or additionally, some embodiments of the present disclosure may include combinations of techniques from some and/or all of FIGS. 7-9.

With respect to one or more embodiments herein, in some examples, for FDM mTRP operation for PUCCH, one PUCCH and another PUCCH in a serving cell may be overlapping in time domain. The one PUCCH and the another PUCCH may be partially overlapped with each other in frequency domain. Alternatively and/or additionally, the one PUCCH and the another PUCCH may occupy different sets of PRBs. Alternatively and/or additionally, PRBs for the one PUCCH and the another PUCCH may be the same (e.g., totally the same) (which may occupy a pair of PRB and symbols may be different, for example). In some examples, each of the one PUCCH and the another PUCCH may occupy one or more PRBs (e.g., a pair of PRBs), wherein the one PUCCH occupies one or more first symbols of the one or more PRBs and the another PUCCH occupies one or more second symbols of the one or more PRBs, and wherein the one or more first symbols are different than the one or more second symbols.

In some examples, for SDM mTRP operation for PUCCH, one PUCCH and another PUCCH in a serving cell may be overlapping in time domain. PRBs for the one PUCCH and the another PUCCH may be the same (e.g., totally the same).

In some examples, for FDM mTRP operation for PUSCH, one PUSCH and another PUSCH in a serving cell may be overlapping in time domain. The one PUSCH and the another PUSCH may be partially overlapped with each other in frequency domain. Alternatively and/or additionally, the one PUSCH and the another PUSCH may occupy different sets of PRBs. Alternatively and/or additionally, PRBs for the one PUSCH and the another PUSCH may be the same (e.g., totally the same) (which may occupy a pair of PRB and symbols may be different, for example). In some examples, each of the one PUSCH and the another PUSCH may occupy one or more PRBs (e.g., a pair of PRBs), wherein the one PUSCH occupies one or more first symbols of the one or more PRBs and the another PUSCH occupies one or more second symbols of the one or more PRBs, and wherein the one or more first symbols are different than the one or more second symbols.

In some examples, for SDM mTRP operation for PUSCH, one PUSCH and another PUSCH in a serving cell may be overlapping in time domain. PRBs for the one PUSCH and the another PUSCH may be the same (e.g., totally the same).

For Physical Downlink Shared Channel (PDSCH) in NR Rel-15, UE may receive Medium Access Control (MAC) Control Element (CE) (e.g., discussed in Section 6.1.3.14 in 3GPP TS 38.321 V17.0.0) for indicating up to 8 Transmission Configuration Indicator (TCI) states among a maximum number of TCI states (e.g., a maximum number of configured TCI states), such as 128 configured TCI states. UE may receive Downlink Control Information (DCI) with TCI field indicating a code-point (e.g., one code-point) associated with the MAC CE indicating TCI state. In NR Rel-15, a beam indication for receiving a downlink (DL) transmission may consider (e.g., may only consider) transmission from a single TRP and/or transmission using a panel within a time duration (e.g., a time duration of at least one of one or more slots such as one slot, one or more mini-slots such as one mini-slot, etc.), such as from the perspective of UE.

In NR Rel-16, downlink transmission from multiple TRPs and/or multiple panels may be considered. For transmission from multiple TRPs and/or multiple panels, it may be implied that a single downlink transmission (e.g., transmission for a single Transport Block (TB)) may be performed using different beams from multiple TRPs and/or multiple panels (e.g., for transmission from multiple TRPs and/or multiple panels, it may be implied that a single downlink transmission may be performed using different beams from multiple TRPs and/or multiple panels). Alternatively and/or additionally, (for transmission from multiple TRPs and/or multiple panels, for example) it may be implied that a UE may receive multiple downlink transmissions from multiple TRPs and/or multiple panels within a time duration (e.g., a time duration of at least one of one or more slots such as one slot, one or more mini-slots such as one mini-slot, etc.). In NR Rel-16, one or more enhancements to ultra-reliable and low latency communications (URLLC) with consideration of multiple TRP scenario have been made. Alternatively and/or additionally, one or more Physical Downlink Shared Channel (PDSCH) repetition schemes may be used to improve reliability of receiving PDSCH. For example, the one or more PDSCH repetition schemes may comprise at least one of a Spatial Division Multiplexing (SDM) repetition scheme, a Frequency Division Multiplexing (FDM) repetition scheme, a mini-slot-based repetition scheme, a slot based repetition scheme, etc. With multiple TRP (mTRP) PDSCH, a TB (e.g., one TB) may be transmitted by multiple beams, TCI states and/or spatial relations. In order to indicate two TCI states for mTRP by a single DCI, a MAC CE (e.g., discussed in Section 6.1.3.24 in 3GPP TS 38.321 V17.0.0) may be used for associating one or more codepoints of a TCI field to one or more TCI state IDs. In some examples, a MAC CE may associate up to 16 TCI state IDs (e.g., the MAC CE may associate one or more code-points of the TCI field to up to 16 TCI state IDs), and a field (e.g., field Ci) may indicate either one TCI state or two TCI states for a code-point of a TCI field (e.g., the code-point of the TCI field may be associated with one or two TCI states). In some examples, a UE may receive a DCI with a TCI field indicating a code-point (e.g., one code-point), and if the one code-point indicates one TCI state as MAC CE associating (e.g., if the MAC CE indicates that the one-code-point is associated with only one TCI state), the UE may consider single TRP (e.g., the UE may determine that the MAC CE and/or the on-code-point is associated with only a single TRP and/or may perform single TRP operation), while if the one code-point indicates two TCI states as MAC CE associating (e.g., if the MAC CE indicates that the one-code-point is associated with two TCI states), the UE may consider mTRP (e.g., the UE may determine that the MAC CE and/or the on-code-point is associated with multiple TRPs and/or may perform mTRP operation).

With respect to one or more embodiments herein, in some examples, a beam indication DCI may provide a TCI codepoint of TCI bit field.

With respect to one or more embodiments herein, in some examples, TCI codepoint may indicate one joint TCI state, two joint TCI states, one DL TCI state, one UL TCI state, one DL TCI state+one UL TCI state, two DL TCI states, two UL TCI states, two DL TCI state+one UL TCI state, one DL TCI state+two UL TCI state, or two DL TCI state+two UL TCI state.

With respect to one or more embodiments herein, in some examples, a MAC CE may indicate association between one or more TCI codepoints and corresponding TCI state(s).

With respect to one or more embodiments herein, in some examples, based on the beam indication DCI, the UE may apply the indicated TCI state(s) for at least UE-specific downlink channel/signal and/or UE-specific uplink channel/signal and/or one or more channels configured with followUnifiedTCIstate.

With respect to one or more embodiments herein, in some examples, beam indication DCI may or may not schedule downlink assignment.

With respect to one or more embodiments herein, in some examples, the UE apply the indicated TCI state(s) from a first slot/symbol after a time interval from transmitting Acknowledgement (ACK) (e.g., HARQ ACK) in response to the beam indication DCI and/or downlink assignment of the beam indication DCI.

With respect to one or more embodiments herein, in some examples, when a scheduling DCI with TCI bit field indicating a TCI codepoint which is different than current applied/used TCI state(s), the UE may determine/consider the scheduling DCI is also a beam indication DCI.

With respect to one or more embodiments herein, in some examples, when a scheduling DCI with TCI bit field indicating a TCI codepoint which is the same as current applied/used TCI state(s), the UE may determine/consider the scheduling DCI is merely a scheduling DCI (and not a beam indication DCI).

With respect to one or more embodiments herein, in some examples, a first joint/UL TCI state is associated with a first index (e.g., CORESETPoolIndex=0, a first TRP group index).

With respect to one or more embodiments herein, in some examples, a second joint/UL TCI state is associated with a second index (e.g., CORESETPoolIndex=1, a second TRP group index).

With respect to one or more embodiments herein, in some examples, a first TRP group may comprise TRP(s) associated with a first index in a first plurality of cell(s).

With respect to one or more embodiments herein, in some examples, a second TRP group may comprise TRP(s) associated with a second index in a second plurality of cell(s).

With respect to one or more embodiments herein, in some examples, a first TRP group may comprise TRP(s) associated with the first joint/UL TCI state (in the beam indication DCI).

With respect to one or more embodiments herein, in some examples, a second TRP group may comprise TRP(s) associated with the second joint/UL TCI state (in the beam indication DCI).

With respect to one or more embodiments herein, in some examples, the first plurality of cell(s) comprises cell(s) without being configured with the first or the second index.

With respect to one or more embodiments herein, in some examples, the first plurality of cell(s) comprises cell(s) without being configured with mTRP operation for PDCCH, PDSCH, PUSCH, and/or PUCCH.

With respect to one or more embodiments herein, in some examples, the first plurality of cell(s) comprises cell(s) with the first and the second index.

With respect to one or more embodiments herein, in some examples, the second plurality of cell(s) comprises cell(s) with the first and the second index.

With respect to one or more embodiments herein, in some examples, one cell in the first plurality of cell(s) may be serving cell or cell with additionalPCI/additionalPCIindex.

With respect to one or more embodiments herein, in some examples, one cell in the second plurality of cell(s) may be serving cell or cell with additionalPCI/additionalPCIindex.

With respect to one or more embodiments herein, in some examples, the first and the second plurality of cells comprises cell(s) in one band.

With respect to one or more embodiments herein, in some examples, UE may receive a beam indication DCI for intra-band cell(s).

With respect to one or more embodiments herein, in some examples, UE may receive another beam indication DCI for cell(s) in another band.

With respect to one or more embodiments herein, in some examples, a third and a fourth plurality of cell(s) may be in another band.

With respect to one or more embodiments herein, in some examples, a third TRP group may comprise TRP(s) associated with a third index in a third plurality of cell(s).

With respect to one or more embodiments herein, in some examples, a fourth TRP group may comprise TRP(s) associated with a fourth index in a fourth plurality of cell(s).

With respect to one or more embodiments herein, in some examples, a third TRP group may comprise TRP(s) associated with the first joint/UL TCI state in the another beam indication DCI.

With respect to one or more embodiments herein, in some examples, a fourth TRP group may comprise TRP(s) associated with the second joint/UL TCI state in the another beam indication DCI.

With respect to one or more embodiments herein, in some examples, the third plurality of cell(s) comprises cell(s) without being configured with the third or the fourth index.

With respect to one or more embodiments herein, in some examples, the third plurality of cell(s) comprises cell(s) without being configured with mTRP operation for PDCCH, PDSCH, PUSCH, and/or PUCCH.

With respect to one or more embodiments herein, in some examples, the third plurality of cell(s) comprises cell(s) with the third and the fourth index.

With respect to one or more embodiments herein, in some examples, the fourth plurality of cell(s) comprises cell(s) with the third and the fourth index.

With respect to one or more embodiments herein, in some examples, one cell in the third plurality of cell(s) may be serving cell or cell with additionalPCI/additionalPCIindex.

With respect to one or more embodiments herein, in some examples, one cell in the fourth plurality of cell(s) may be serving cell or cell with additionalPCI/additionalPCIindex.

In NR Rel-17, there may be an attempt to have a unified beam indication framework for DL and UL, for UE-specific DL channel and/or signal, and/or for UE-specific UL channel and/or signal. A motivation (e.g., a motivation to have the unified beam indication framework) may be to reduce signaling overhead and have a unified framework for DL channels and/or signals and/or for UL channels and/or signals. A motivation (e.g., a motivation to have the unified beam indication framework) may be that a UE (in most real deployments, for example) may use one or more same UE beams for downlink reception and/or one or more same UE beams for uplink transmission. Alternatively and/or additionally, in a Frequency Range 2 (FR2) band (e.g., a typical FR2 band), since beam correspondence may be a major scenario and/or issue, it may be justified to have a joint beam (e.g., one joint beam) for DL and UL. However, due to some MPE issues for some UE beams (e.g., regulation considering maximum transmit power restriction toward human body with respect to some UE beams), joint beam for DL and UL cannot be guaranteed while separate beam indication for DL and UL may be useful for this scenario. As for separate DL/UL TCI state, with respect to signaling overhead, beam indication for two TCI states corresponding to DL TCI state and UL TCI state may be considered.

With respect to one or more embodiments herein, in some examples, a UE (e.g., the first UE) has capability to concurrently (e.g., simultaneously) transmit two PUSCHs on one serving cell.

With respect to one or more embodiments herein, in some examples, a UE (e.g., the first UE) has capability to concurrently (e.g., simultaneously) transmit two PUCCHs on one serving cell.

With respect to one or more embodiments herein, in some examples, a TRP (mentioned in the foregoing description, for example) may be associated with a CORESET Pool (e.g. a coresetPoolIndex) of a Cell. In some embodiments, one, some and/or all instances of the term "TRP" in the present disclosure may be replaced with the term "CORESET pool". In some examples, for a UE performing single TRP operation on a Cell, the UE may receive and/or monitor signaling from the cell via a single CORESET pool. In some examples, for a UE performing multi-TRP operation on a Cell, the UE may receive and/or monitor signaling from the cell via multiple CORESET pools.

Alternatively and/or additionally, the TRP (mentioned in the foregoing description, for example) may be associated with a SRS resource (and/or a SRS resource set) of a Cell. In some embodiments, one, some and/or all instances of the term "TRP" in the present disclosure may be replaced with the term "SRS resource" and/or the term "SRS resource set". In some examples, for a UE performing single TRP operation on a Cell, the UE may receive and/or monitor signaling on the cell via one activated TCI state. In some examples, for a UE performing multi-TRP operation on a Cell, the UE may receive and/or monitor signaling via multiple activated TCI states.

Alternatively and/or additionally, the TRP (mentioned in the foregoing description, for example) may be associated with one or more TCI states of a Cell. In some embodiments, one, some and/or all instances of the term "TRP" in the present disclosure may be replaced with the term "TCI state" and/or the term "one or more TCI states". In some examples, for a UE performing single TRP operation on a Cell, the UE may transmit SRS on the cell via one SRS resource. In some examples, for a UE performing multi-TRP operation on a Cell, the UE may transmit SRS via multiple SRS resources, wherein each of the multiple SRS resources may be associated with a (different) TRP.

Alternatively and/or additionally, the TRP (mentioned in the foregoing description, for example) may be associated with PUSCH or PUCCH. In some embodiments, one, some and/or all instances of the term "TRP" in the present disclosure may be replaced with the term "PUSCH" and/or the term "PUCCH". For a UE performing intra-cell mTRP operation on a Cell, the UE may perform UL transmission via multiple PUSCHs associated with the Cell. For a UE performing inter-cell mTRP operation on a Cell, the UE may perform UL transmissions via multiples PUSCHs associated with different Cells, wherein the UL transmissions may comprise transmitting a same TB on different PUSCHs associated with different Cells.

Alternatively and/or additionally, the TRP (mentioned in the foregoing description, for example) may be associated with a spatial relation info of a Cell. In some embodiments, one, some and/or all instances of the term "TRP" in the present disclosure may be replaced with the term "spatial relation info". For a UE performing single TRP operation on a Cell, the UE may activate (and/or may be indicated with) one spatial relation info (of the Cell, for example). For a UE performing multi-TRP operation on a Cell, the UE may activate (and/or may be indicated with) more than one spatial relation info (of the Cell, for example), wherein each spatial relation info of the more than one spatial relation info may be associated with a (different) TRP.

With respect to one or more embodiments herein, in some examples, a non-serving cell of a UE may be associated with (e.g., configured with) a PCI value different from PCI values of Serving Cells of the UE. A non-serving Cell may be a neighboring Cell of the UE.

With respect to one or more embodiments herein, in some examples, at least one symbol of one of two uplink channels/signals (e.g., the two PUSCHs comprising the first PUSCH and the second PUSCH0 overlaps (in time domain) with the other one of the two uplink channels/signals. In the present disclosure, the term "channels/signals" may refer to channels and/or signals. In some examples, one of the two uplink channels/signals is fully overlapped with the other one of the two uplink channels/signals in time domain.

With respect to one or more embodiments herein, in some examples, the two uplink channels/signals may be multiplexed (with each other, for example) in frequency domain. In some examples, the two uplink channels/signals may be multiplexed (with each other, for example) in spatial domain.

With respect to one or more embodiments herein, in some examples, no Physical Resource Block (PRB) of one of the two uplink channels/signals overlaps with any PRB of the other one of the two uplink channels/signals (in frequency domain).

With respect to one or more embodiments herein, in some examples, no resource element of one of the two uplink channels/signals overlaps with any resource element of the other one of the two uplink channels/signals (in frequency domain).

Alternatively and/or additionally, with respect to one or more embodiments herein, in some examples, at least one PRB or resource element of one of the two uplink channels/signals overlaps with a PRB or a resource element of the other one of the two uplink channels/signals (in frequency domain).

Alternatively and/or additionally, with respect to one or more embodiments herein, in some examples, all PRBs of one of the two uplink channels/signals overlap with (some or all PRBs of) the other one of the two uplink channels/signals (in frequency domain).

Alternatively and/or additionally, with respect to one or more embodiments herein, in some examples, all resource elements of one of the two uplink channels/signals overlap with (some or all resource elements of) the other one of the two uplink channels/signals (in frequency domain).

With respect to one or more embodiments herein, in some examples, the UE has at least two UE panels.

With respect to one or more embodiments herein, in some examples, the UE may perform concurrent (e.g., simultaneous) uplink transmission (via the at least two UE panels, for example).

With respect to one or more embodiments herein, in some examples, a first SRS resource (and/or a first SRS resource set) is associated with a first UE panel of the at least two UE panels.

With respect to one or more embodiments herein, in some examples, a second SRS resource (and/or a second SRS resource set) is associated with a second UE panel of the at least two UE panels.

In some embodiments, one, some and/or all instances of the term "beam" in the present disclosure may be replaced with the term "TCI state". In some embodiments, one, some and/or all instances of the term "TCI state" in the present disclosure may be replaced with the term "beam".

In some examples, although some examples of the present disclosure are associated with two transmissions/channels (e.g., two overlapping channels, two overlapping PUSCHs, two overlapping PUCCHs, etc.), it may be appreciated that the quantity "two" may be changed to a different quantity (e.g., any quantity such as three transmissions/channels, four transmissions/channels, etc.).

One, some and/or all of the foregoing examples, concepts, techniques and/or embodiments can be formed and/or combined to a new embodiment.

In some examples, embodiments disclosed herein, such as embodiments shown and/or described with respect to the first concept, the second concept, the third concept, the fourth concept, the fifth concept, the sixth concept, the seventh concept, FIG. 5, FIG. 6, FIG. 7, FIG. 8, and FIG. 9 may be implemented independently and/or separately. Alternatively and/or additionally, a combination of embodiments described herein, such as embodiments described with respect to the first concept, the second concept, the third concept, the fourth concept, the fifth concept, the sixth concept, the seventh concept, FIG. 5, FIG. 6, FIG. 7, FIG. 8, and/or FIG. 9, may be implemented. Alternatively and/or additionally, a combination of embodiments described herein, such as embodiments described with respect to the first concept, the second concept, the third concept, the fourth concept, the fifth concept, the sixth concept, the seventh concept, FIG. 5, FIG. 6, FIG. 7, FIG. 8, and/or FIG. 9, may be implemented concurrently (e.g., simultaneously).

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently (e.g., simultaneously).

FIG. 10 is a flow chart 1000 according to one exemplary embodiment from the perspective of a UE. In step 1005, the UE determines a first channel (e.g., one channel) of two overlapping channels in time domain for UCI multiplexing, wherein the two overlapping channels have the same starting symbol in a first serving cell (e.g., the two overlapping channels both start at the same starting symbol), and wherein a first index associated with the first channel of the two overlapping channels is lower than a second index associated with a second channel of the two overlapping channels. The first channel of the two overlapping channels at least partially overlaps with the second channel of the two overlapping channels. In an example, the UE selects the first channel (from the two overlapping channels, for example) for UCI multiplexing based on the first index being lower than the second index.

In one embodiment, the first index may be a first SRS resource set index and/or the second index may be a second SRS resource set index.

In one embodiment, the first index may be a first TRP index and/or the second index may be a second TRP index.

In one embodiment, the first index may be a first TRP group index and/or the second index may be a second TRP group index.

In one embodiment, the first index may be a first CORESETPoolIndex and/or the second index may be a second CORESETPoolIndex.

In one embodiment, the first index may correspond to a first joint/UL TCI state (e.g., 1-st joint/UL TCI state) and/or the second index may correspond to a second joint/UL TCI state (e.g., 2-nd joint/UL TCI state). The first joint/UL TCI state may be associated with the first channel and/or the second joint/UL TCI state may be associated with the second channel. The first joint/UL TCI state and/or the second joint/UL TCI state may be indicated by a beam indication DCI. In some examples, the first index may correspond to a first octet index of the first joint/UL TCI state (e.g., a TCI codepoint may indicate the first octet index for the first joint/UL TCI state) and/or the second index may correspond to a second octet index of the second joint/UL TCI state (e.g., the TCI codepoint may indicate the second octet index for the second joint/UL TCI state).

In one embodiment, the first channel of the two overlapping channels may comprise two PUSCHs associated with different joint/UL TCI states.

In one embodiment, the first channel of the two overlapping channels may comprise a first PUSCH associated with a first joint/UL TCI state and the second channel of the two overlapping channels may comprise a second PUSCH associated with a second joint/UL TCI state different than the first joint/UL TCI state.

In one embodiment, the first channel the two overlapping channels is merely one channel (e.g., merely the first PUSCH) of the two overlapping channels (e.g., the first PUSCH and the second PUSCH).

In one embodiment, the UE supports concurrent (e.g., simultaneous) uplink transmission via multiple UE panels.

In one embodiment, the UE transmits a plurality of PUSCHs and/or PUCCHs on a plurality of serving cells, wherein the plurality of PUSCHs and/or PUCCHs are at least partially overlapping in time domain.

In one embodiment, the plurality of PUSCHs and/or PUCCHs comprises the two overlapping channels (and/or one or more other overlapping channels at least partially overlapping with the two overlapping channels), and the plurality of serving cells comprises the first serving cell.

In one embodiment, the UE transmits the first channel of the two overlapping channels with UCI to a network node.

In one embodiment, the UE transmits the first channel of the two overlapping channels via a first joint/UL TCI state (e.g., 1-st joint/UL TCI state) (associated with the first channel, for example).

In one embodiment, the UE transmits the second channel, without UCI, to a network node, wherein the transmission of the second channel is performed concurrently with the transmission of the first channel.

In one embodiment, the UE transmits the second channel of the two overlapping channels via a second joint/UL TCI state (e.g., 2-nd joint/UL TCI state).

Referring back to FIGS. 3 and 4, in one exemplary embodiment of a UE, the device 300 includes a program code 312 stored in the memory 310. The CPU 308 may execute program code 312 to enable the UE to determine a first channel of two overlapping channels in time domain for UCI multiplexing, wherein the two overlapping channels have the same starting symbol in a first serving cell, and wherein a first index associated with the first channel of the two overlapping channels is lower than a second index associated with a second channel of the two overlapping channels. Furthermore, the CPU 308 can execute the program code 312 to perform one, some and/or all of the above-described actions and steps and/or others described herein.

FIG. 11 is a flow chart 1100 according to one exemplary embodiment from the perspective of a UE. In step 1105, based on there being two concurrent (e.g., simultaneous) PUSCHs/PUCCHs, that both have the same starting symbol, on a serving cell for multiplexing UCI, the UE multiplexes and/or transmits the UCI on both of the two concurrent PUSCHs/PUCCHs on the serving cell. In some examples, the UE determines to use the serving cell for multiplexing (and/or transmitting) the UCI based on the serving cell having a lowest serving cell among a plurality of serving cells (associated with the UE, for example) (e.g., the UE selects the serving cell, from among the plurality of serving cells, to use for multiplexing and/or transmitting the UCI).

In an example, the two concurrent PUSCHs/PUCCHs comprise a first channel (e.g., a first PUSCH or a first PUCCH) and a second channel (e.g., a second PUSCH or a second PUCCH). The UE transmits the first channel and the second channel on the serving cell. The first PUSCH transmitted on the first cell comprises the UCI (e.g., at least a portion of the UCI) and/or the second PUSCH transmitted on the second cell comprises the UCI (e.g., at least a portion of the UCI). For example, the UCI (e.g., at least a portion of the UCI) may be multiplexed into the first PUSCH and/or the UCI (e.g., at least a portion of the UCI) may be multiplexed into the second PUSCH.

In one embodiment, the plurality of serving cells are associated with a cell group.

In one embodiment, the plurality of serving cells are associated with a PUCCH group.

In one embodiment, the UE transmits PUSCHs and/or PUCCHs on the plurality of serving cells.

In one embodiment, the plurality of serving cells are with PUCCHs and/or PUSCHs overlapping in time domain in a slot/subslot.

In one embodiment, the UE transmits channels comprising PUCCHs and/or PUSCHs associated with multiple serving cells of the plurality of serving cells, wherein the channels associated with the multiple serving cells overlap in time domain in a slot/subslot.

Referring back to FIGS. 3 and 4, in one exemplary embodiment of a UE, the device 300 includes a program code 312 stored in the memory 310. The CPU 308 may execute program code 312 to enable the UE, based on there being two concurrent (e.g., simultaneous) PUSCHs/PUCCHs, that both have the same starting symbol, on a serving cell for multiplexing UCI, to multiplex and/or transmit the UCI on both of the two concurrent PUSCHs/PUCCHs on the serving cell. Furthermore, the CPU 308 can execute the program code 312 to perform one, some and/or all of the above-described actions and steps and/or others described herein.

Figure 12:
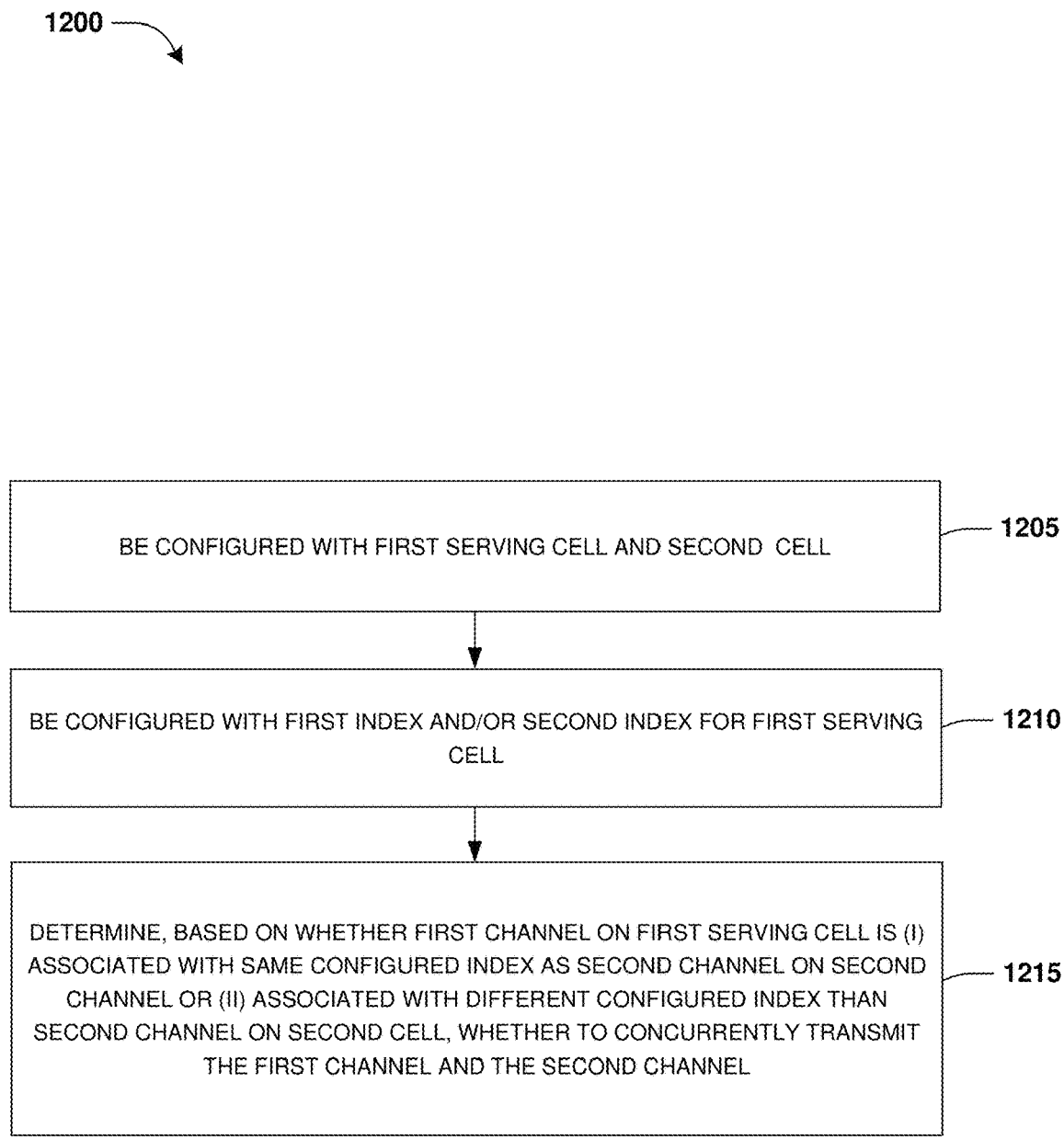
FIG. 12 is a flow chart according to one exemplary embodiment.

FIG. 12 is a flow chart 1200 according to one exemplary embodiment from the perspective of a UE. In step 1205, the UE is configured with a first serving cell and a second cell (e.g., a second serving cell). For example, the UE may be configured with the first serving cell via a cell configuration, associated with the first serving cell, received by the UE. The UE may be configured with the second cell via a cell configuration, associated with the second cell, received by the UE. In step 1210, the UE is configured with a first index and/or a second index for the first serving cell (and/or for one or more other serving cells in addition to the first serving cell). For example, the UE may receive an indication of the first index and/or the second index. In step 1215, based on whether a first channel on the first serving cell is (i) associated with a same configured index as a second channel on the second channel or (ii) associated with a different configured index than the second channel on the second cell, the UE determines whether to concurrently (e.g., simultaneously) transmit the first channel and the second channel. In some examples, both of the first channel and the second channel are associated with the same priority index. In some examples, the first channel and the second channel at least partially overlap with each other in time domain.

In one embodiment, the first serving cell and the second cell are in different bands (e.g., inter-band cell).

In one embodiment, the UE supports concurrent transmission of PUSCH and PUCCH on different cells. For example, the UE has capability to concurrently (e.g., simultaneously) transmit PUSCH and PUCCH on different cells.

In one embodiment, the first channel is PUSCH and the second channel is PUCCH.

In one embodiment, the first channel is PUCCH and the second channel is PUSCH.

In one embodiment, based on a determination that the first channel on the first serving cell is associated with the same configured index (e.g., intra TRP group) as the second channel on the second cell (e.g., the first channel and the second channel are associated with the same configured index, such as the same TRP group index), the UE (i) transmits the first channel and/or drops the second channel, (ii) transmits the second channel and/or drops the first channel, (iii) multiplexes content of the first channel into the second channel (and transmits the second channel and/or drops the first channel, for example), and/or (iv) multiplexes content of the second channel into the first channel (and transmits the first channel and/or drops the second channel, for example). In some examples, the first channel and the second channel are associated with the same priority index.

In one embodiment, based on a determination that the first channel on the first serving cell is associated with a different configured index (e.g., inter TRP group) than the second channel on the second cell (e.g., a first index, such as a first TRP group index, associated with the first channel is different than a second index, such as a second TRP group index, associated with the second channel), the UE transmits (and/or is configured and/or allowed to transmit) the first channel and the second channel (with the same priority index, for example) concurrently (e.g., simultaneously).

In one embodiment, the first index and/or the second index may each correspond to at least one of (i) CORESET-PoolIndex, (ii) TRP group index, (iii) index associated with TRP, or (iv) index associated with TRP group.

In one embodiment, the second cell comprises a serving cell (e.g., a second serving cell of the UE), and/or the second cell is without being configured with additionalPCI/additionalPCIindex (e.g., the second cell is not configured with additionalPCI/additionalPCIindex and/or the UE is not configured with additionalPCI/additionalPCIindex for the second cell).

In one embodiment, the second cell is not a serving cell, and/or the second cell is a neighboring cell (e.g., a neighboring cell of the first serving cell), and/or the second cell is configured with additionalPCI/additionalPCIindex.

In one embodiment, the priority index for the first channel and the second channel may be determined based on a RRC signaling.

In one embodiment, the priority index for the first channel and the second channel may be indicated by DCI (e.g., a downlink assignment DCI or uplink grant DCI).

Referring back to FIGS. 3 and 4, in one exemplary embodiment of a UE, the device 300 includes a program code 312 stored in the memory 310. The CPU 308 may execute program code 312 to enable the UE (i) to be configured with a first serving cell and a second cell, (ii) to be configured with a first index and/or a second index for the first serving cell, and (iii) to determine, based on whether a first channel on the first serving cell is (A) associated with a same configured index as a second channel on the second channel or (B) associated with a different configured index than the second channel on the second cell, whether to concurrently (e.g., simultaneously) transmit the first channel and the second channel. Furthermore, the CPU 308 can execute the program code 312 to perform one, some and/or all of the above-described actions and steps and/or others described herein.

Figure 13:
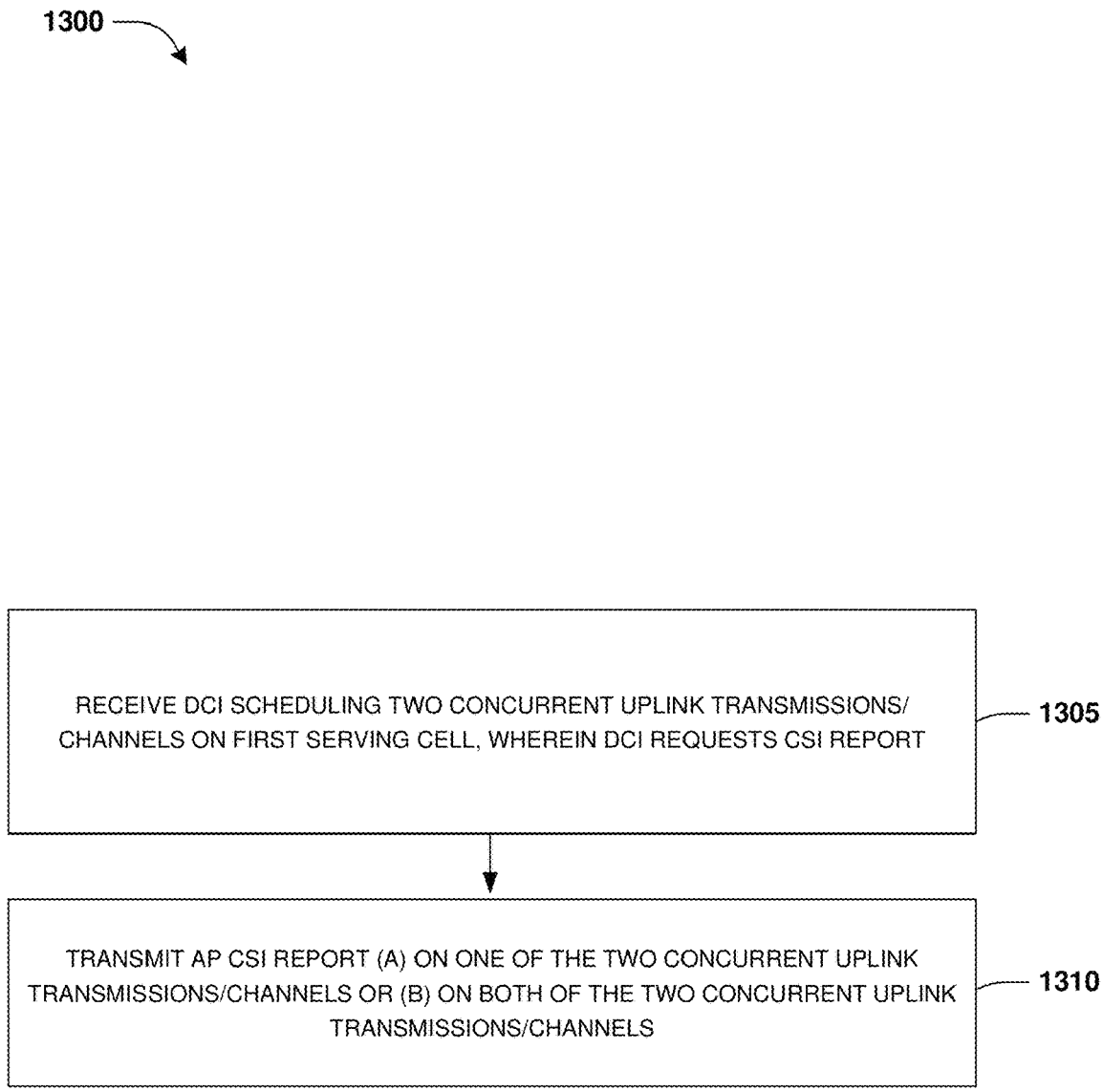
FIG. 13 is a flow chart according to one exemplary embodiment.

FIG. 13 is a flow chart 1300 according to one exemplary embodiment from the perspective of a UE. In step 1305, the UE receives a DCI scheduling two concurrent (e.g., simultaneous) uplink transmissions/channels on a first serving cell, wherein the DCI requests a CSI report (e.g., aperiodic CSI report). In some examples, the two concurrent uplink transmissions/channels have the same starting symbol (e.g., both of the two concurrent uplink transmissions/channels start at the same starting symbol). In some examples, the two concurrent uplink transmissions/channels have different starting symbols (e.g., the two concurrent uplink transmissions/channels start at different starting symbols). In an example, a CSI request field of the DCI is set to 1 (to indicate that the DCI requests a CSI report, for example). In step 1310, the UE transmits an AP CSI report (i) on one of the two concurrent uplink transmissions/channels (e.g., only one of the two concurrent uplink transmissions/channels) or (ii) on both of the two concurrent uplink transmissions/channels.

In one embodiment, the UE determines whether to transmit and/or multiplex the AP CSI report on one transmission occasion or on two transmission occasions based on (i) whether there is inter-slot/subslot repetition, (ii) whether the two concurrent uplink transmissions/channels both have the same starting symbol or different starting symbols, (iii) whether there is another UCI (available for transmission, for example) other than AP CSI report, and/or (iv) sDCI/mDCI based mTRP.

In one embodiment, one transmission occasion may correspond to one of the two concurrent uplink transmissions/channels. In some examples, two transmission occasions may correspond to both of the two concurrent uplink transmissions/channels.

In one embodiment, when the two concurrent uplink transmissions/channels have the same starting symbol (in a slot, for example), the UE transmits the AP CSI report on both of the two concurrent uplink transmissions/channels (e.g., each of the two concurrent uplink transmissions/channels comprises at least a portion of the AP CSI report). For example, the UE may use both of the two concurrent uplink transmissions/channels to transmit the AP CSI report based on the two concurrent uplink transmissions/channels having the same starting symbol.

In one embodiment, when the two concurrent uplink transmissions/channels have the same starting symbol (in a slot, for example) and the UE may multiplex another UCI other than the AP CSI report (e.g., the UE has another UCI, other than the AP CSI report, available for transmission), the UE transmits the AP CSI report (multiplexed with the another UCI, for example) on one of the two concurrent uplink transmissions/channels. For example, the UE may use one of the two concurrent uplink transmissions/channels (e.g., only one of the two concurrent uplink transmissions/channels) to transmit the AP CSI report based on the two concurrent uplink transmissions/channels having the same starting symbol and the another UCI (being available for transmission, for example).

In one embodiment, when the two concurrent uplink transmissions/channels have the same starting symbols (in a slot, for example) and the UE may multiplex another UCI other than the AP CSI report (e.g., the UE has another UCI, other than the AP CSI report, available for transmission), the UE transmits the AP CSI report (multiplexed with the another UCI, for example) on both of the two concurrent uplink transmissions/channels. For example, the UE may use both of the two concurrent uplink transmissions/channels to transmit the AP CSI report based on the two concurrent uplink transmissions/channels having the same starting symbol and the another UCI (being available for transmission, for example).

In one embodiment, when one of the two concurrent uplink transmissions/channels (e.g., only the one of the two concurrent uplink transmissions/channels) is used to transmit the AP CSI report (e.g., the AP CSI report is multiplexed into the one of the two concurrent uplink transmissions/channels), the one of the two concurrent uplink transmissions/channels may be determined (e.g., derived and/or selected) based on (i) which uplink transmission/channel is associated with a first joint/UL TCI state (e.g., the one of the two concurrent uplink transmissions/channels may be determined to be an uplink transmission/channel that is associated with the first joint/UL TCI state), (ii) which uplink transmission/channel is associated with a joint/UL TCI state which is associated with a cell that is a serving cell and/or that does not have additionalPCI/additionalPCIindex (e.g., the one of the two concurrent uplink transmissions/channels may be determined to be an uplink transmission/channel that is associated with a joint/UL TCI state which is associated with a cell that is a serving cell and/or that does not have additionalPCI/additionalPCIindex), (iii) which uplink transmission/channel is associated with a lower index (e.g., a lower additionalPCI/additionalPCI index) (e.g., the one of the two concurrent uplink transmissions/channels may be determined to be an uplink transmission/channel that is associated with an index that is lower than an index associated with another of the two concurrent uplink transmissions/channels), and/or (iv) which uplink transmission/channel is associated with a first SRS resource set (which is with lower SRS resource set index than a second SRS resource set, for example) (e.g., the one of the two concurrent uplink transmissions/channels may be determined to be an uplink transmission/channel that is associated with the first SRS resource set associated with a first SRS resource set index lower than a second SRS resource set index associated with another uplink transmission/channel of the two concurrent uplink transmissions/channels, for example).

In one embodiment, the UE determines whether to transmit and/or multiplex the AP CSI report on one of the two concurrent uplink transmissions/channels (e.g., only one of the two concurrent uplink transmissions/channels) or on both of the two concurrent uplink transmissions/channels based on (i) whether there is inter-slot/subslot repetition, (ii) whether the two concurrent uplink transmissions/channels both have the same starting symbol or different starting symbols, (iii) whether there is another UCI (available for transmission, for example) other than AP CSI report, and/or (iv) sDCI/mDCI based mTRP.

Referring back to FIGS. 3 and 4, in one exemplary embodiment of a UE, the device 300 includes a program code 312 stored in the memory 310. The CPU 308 may execute program code 312 to enable the UE (i) to receive a DCI scheduling two concurrent uplink transmissions/channels on a first serving cell, wherein the DCI requests a CSI report, and (ii) to transmit an AP CSI report (A) on one of the two concurrent uplink transmissions/channels (e.g., only one of the two concurrent uplink transmissions/channels) or (B) on both of the two concurrent uplink transmissions/channels. Furthermore, the CPU 308 can execute the program code 312 to perform one, some and/or all of the above-described actions and steps and/or others described herein.

Figure 14:
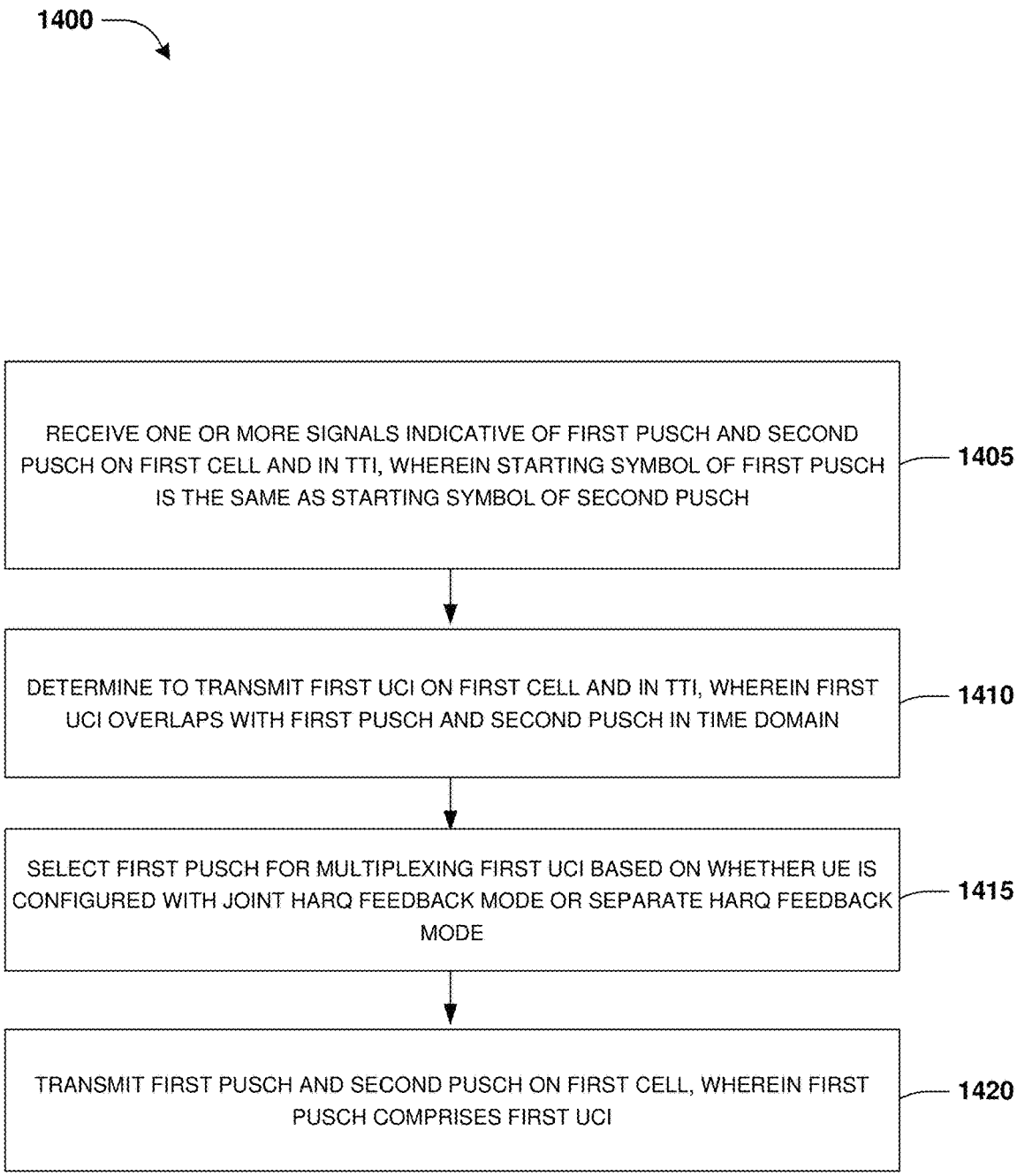
FIG. 14 is a flow chart according to one exemplary embodiment.

FIG. 14 is a flow chart 1400 according to one exemplary embodiment from the perspective of a UE. In step 1405, the UE receives one or more signals indicative of a first PUSCH on a first cell and a second PUSCH on the first cell. The first PUSCH and the second PUSCH are in a TTI (e.g., at least a portion of the first PUSCH is in the TTI and/or at least a portion of the second PUSCH is in the TTI). A starting symbol of the first PUSCH is the same as a starting symbol of the second PUSCH. Accordingly, the first PUSCH and the second PUSCH may overlap (e.g., at least partially overlap) in time domain. The one or more signals may comprise (wherein a time resource allocated for the first PUSCH at least partially overlaps with a time resource allocated for the second PUSCH, for example). In step 1410, the UE determines to transmit a first Uplink Control Information (UCI) on the first cell and in the TTI, wherein the first UCI overlaps (e.g., at least partially overlaps) with the first PUSCH and the second PUSCH in time domain. In step 1415, the UE selects the first PUSCH for multiplexing the first UCI based on the UE being configured with joint HARQ feedback mode or separate HARQ feedback mode. For example, the UE may select the first PUSCH for multiplexing the first UCI based on whether the UE is configured with the joint HARQ feedback mode or the separate HARQ feedback mode. In some examples, the UE selects the first PUSCH for multiplexing the first UCI based on other information (in addition to whether the UE is configured with the joint HARQ feedback mode or the separate HARQ feedback mode, for example). In step 1420, the UE transmits (e.g., concurrently transmits) the first PUSCH and the second PUSCH on the first cell, wherein the first PUSCH transmitted on the first cell comprises the first UCI. For example, the UE may multiplex the first UCI into the first PUSCH (e.g., the UE may multiplex at least a portion of the first UCI into the first PUSCH). In some examples, the first PUSCH and the second PUSCH are transmitted in the TTI.

In some examples, the joint HARQ feedback mode is associated with transmitting UCIs for different TRPs in the same PUCCH or the same PUSCH. In some examples, when the UE is configured with the joint HARQ feedback mode, the UE may transmit UCIs for different TRPs in the same PUCCH or the same PUSCH.

In some examples, the separate HARQ feedback mode is associated with transmitting UCIs for different TRPs in different PUCCHs and/or different PUSCHs. In some examples, when the UE is configured with separate HARQ feedback mode, the UE may transmit UCIs for different TRPs in different PUCCHs or different PUSCHs.

In one embodiment, the UE selects the first PUSCH for multiplexing the first UCI based on the UE being configured with the joint HARQ feedback mode and (i) a first SRS resource set index associated with the first PUSCH being lower than a second SRS resource set index associated with the second PUSCH, (ii) a first TRP index associated with the first PUSCH being lower than a second TRP index associated with the second PUSCH, (iii) a first TRP group index associated with the first PUSCH being lower than a second TRP group index associated with the second PUSCH, and/or (iv) a first CORESET pool index (e.g., CORESETPoolIndex) associated with the first PUSCH being lower than a second CORESET pool index (e.g., CORESETPoolIndex) associated with the second PUSCH. In an example, the second PUSCH transmitted on the first cell does not comprise the second UCI.

In one embodiment, the UE selects the first PUSCH for multiplexing the first UCI based on the UE being configured with the separate HARQ feedback mode and (i) a first PUCCH and the first PUSCH being associated with a same Transmission Configuration Indicator (TCI) state, wherein the first PUCCH is associated with the first UCI, and/or (ii) the first PUCCH and the first PUSCH being associated with a same Control Resource Set (CORESET) pool index. In an example, the second PUSCH transmitted on the first cell does not comprise the first UCI.

In one embodiment, the UE receives one beam indication DCI indicating a first joint/UL TCI state (e.g., 1-st joint/UL TCI state) and a second joint/UL TCI state (e.g., 2-nd joint/UL TCI state). In some examples, an octet index associated with the first joint/UL TCI state (e.g., 1-st joint/UL TCI state) is lower than an octet index associated with the second joint/UL TCI state (e.g., 2-nd joint/UL TCI state). In some examples, when the UE is configured with sDCI multiple transmission/reception point (mTRP), the UE receives one beam indication DCI (which may indicate both the first joint/UL TCI state and the second joint/UL TCI state, for example).

In one embodiment, the UE receives a first beam indication DCI indicating a first joint/UL TCI state (e.g., 1-st joint/UL TCI state) and receives a second beam indication DCI indicating a second joint/UL TCI state (e.g., 2-nd joint/UL TCI state). In some examples, when the UE is configured with mDCI mTRP, the UE receives the first beam indication DCI (which may indicate the first joint/UL TCI state, for example) and the second beam indication DCI (which may indicate the second joint/UL TCI state, for example). For example, when the UE is configured with mDCI mTRP, the UE may not receive one beam indication DCI indicating (both) the first joint/UL TCI state and the second joint/UL TCI state.

In one embodiment, a first signal, of the one or more signals, is indicative of the first PUSCH. The first signal may correspond to a first UL grant associated with the first PUSCH and/or a first configuration associated with the first PUSCH (e.g., the UE may be configured with the first configuration via the first signal). The first signal may indicate that the first PUSCH is associated with the first joint/UL TCI state (e.g., the first signal may explicitly and/or implicitly indicate that the first joint/UL TCI state is applied to the first PUSCH). In some examples, based on a first CORESET pool index associated with the first signal being 0 (e.g., the first CORESET pool index may correspond to a CORESETPoolIndex of a CORESET for the first signal), the first PUSCH is determined to be associated with the first joint/UL TCI state (e.g., the UE may determine that the first PUSCH is associated with the first joint/UL TCI state based on the first CORESET pool index being 0). In some examples, the first signal schedules and/or configures the first PUSCH.

In some examples, a first signal of the one or more signals schedules the first PUSCH and a second signal of the one or more signals schedules the second PUSCH.

In one embodiment, a second signal, of the one or more signals, is indicative of the second PUSCH. The second signal may correspond to a second UL grant and/or a second configuration (with which the UE is configured via the second signal, for example). The second signal may indicate that the second PUSCH is associated with the second joint/UL TCI state (e.g., the second signal may explicitly and/or implicitly indicate that the second joint/UL TCI state is applied to the second PUSCH). In some examples, based on a second CORESET pool index associated with the second signal being 1 (e.g., the second CORESET pool index may correspond to a CORESETPoolIndex of a CORESET for the second signal), the second PUSCH is determined to be associated with the second joint/UL TCI state (e.g., the UE may determine that the second PUSCH is associated with the second joint/UL TCI state based on the first CORESET pool index being 1). In some examples, the second signal schedules and/or configures the second PUSCH.

In one embodiment, the first joint/UL TCI state and/or the second joint/UL TCI state are configured for transmission of one or more UE-specific UL channels.

In one embodiment, the UE determines to transmit a second UCI on the first cell and in the TTI, wherein the second UCI overlaps with the first PUSCH and the second PUSCH in time domain.

In one embodiment, the first UCI and the second UCI correspond to the same PUCCH group. In one embodiment, the first UCI corresponds to (e.g., comprises) first HARQ information in response to a first downlink assignment by a first CORESET associated with a first CORESET pool index (e.g., CORESETPoolIndex) corresponding to (e.g., equal to) 0, wherein the second UCI corresponds to (e.g., comprises) second HARQ information in response to a second downlink assignment by a second CORESET associated with a second CORESET pool index (e.g., CORESETPoolIndex) corresponding to (e.g., equal to) 1.

In one embodiment, the first UCI is associated with a first PUCCH. A third signal, comprising a first DCI signal and/or a first RRC signal, indicates that the first PUCCH is associated with the first joint/UL TCI state (e.g., the third signal may indicate that the first joint/UL TCI state is applied to the first PUCCH). The UE may receive the third signal.

In one embodiment, the second UCI is associated with a second PUCCH.

In one embodiment, a fourth signal, comprising a second DCI signal and/or a second RRC signal, indicates that the second PUCCH is associated with the second joint/UL TCI state (e.g., the fourth signal may indicate that the second joint/UL TCI state is applied to the second PUCCH). The UE may receive the fourth signal.

In one embodiment, the UE selects the first PUSCH for multiplexing the first UCI based on (i) a first SRS resource set index associated with the first PUSCH being lower than a second SRS resource set index associated with the second PUSCH, (ii) a first TRP index associated with the first PUSCH being lower than a second TRP index associated with the second PUSCH, (iii) a first TRP group index associated with the first PUSCH being lower than a second TRP group index associated with the second PUSCH, and/or (iv) a first CORESET pool index (e.g., CORESETPoolIndex) associated with the first PUSCH being lower than a second CORESET pool index (e.g., CORESETPoolIndex) associated with the second PUSCH.

In one embodiment, the UE selects the first PUSCH for multiplexing the second UCI based on the UE being configured with the joint HARQ feedback mode and (i) a first SRS resource set index associated with the first PUSCH being lower than a second SRS resource set index associated with the second PUSCH, (ii) a first TRP index associated with the first PUSCH being lower than a second TRP index associated with the second PUSCH, (iii) a first TRP group index associated with the first PUSCH being lower than a second TRP group index associated with the second PUSCH, and/or (iv) a first CORESET pool index (e.g., CORESETPoolIndex) associated with the first PUSCH being lower than a second CORESET pool index (e.g., CORESETPoolIndex) associated with the second PUSCH. In an example, the second PUSCH transmitted on the first cell does not comprise the second UCI.

In one embodiment, the UE selects the second PUSCH for multiplexing the first UCI (in addition to selecting the first PUSCH for multiplexing the first UCI, for example). The second PUSCH transmitted on the first cell comprises the first UCI. For example, the UE may select both the first PUSCH and the second PUSCH for multiplexing the first UCI. In an example, the first PUSCH transmitted on the first cell may comprise at least a portion of the first UCI and the second PUSCH transmitted on the first cell may comprise at least a portion of the first UCI. In some examples, the UE may multiplex at least a portion of the first UCI into the first PUSCH and at least a portion of the first UCI into the second PUSCH.

In one embodiment, the UE selects the second PUSCH for multiplexing the second UCI based on the UE being configured with the separate HARQ feedback mode and (i) a second PUCCH and the second PUSCH being associated with a same TCI state, wherein the second PUCCH is associated with the second UCI, and/or (ii) the second PUCCH and the second PUSCH being associated with a same CORESET pool index (e.g., CORESETPoolIndex). In an example, the second PUSCH transmitted on the first cell comprises the second UCI.

In one embodiment, the UE selects the first PUSCH for multiplexing the first UCI based on (i) a SRS resource set index associated with the first PUSCH corresponding to a SRS resource set index associated with the first UCI (e.g., the first PUSCH and the first UCI correspond to the same SRS resource set index), (ii) a TRP index associated with the first PUSCH corresponding to a TRP index associated with the first UCI (e.g., the first PUSCH and the first UCI correspond to the same TRP index), (iii) a TRP group index associated with the first PUSCH corresponding to a TRP group index associated with the first UCI (e.g., the first PUSCH and the first UCI correspond to the same TRP group index), (iv) the first PUCCH (for the first UCI, for example) and the first PUSCH being associated with the first joint/UL TCI state, and/or (v) the first PUCCH and the first PUSCH being associated with a same CORESET pool index (e.g., CORESETPoolIndex).

In one embodiment, the UE selects the second PUSCH for multiplexing the second UCI based on (i) a SRS resource set index associated with the second PUSCH corresponding to a SRS resource set index associated with the second UCI (e.g., the second PUSCH and the second UCI correspond to the same SRS resource set index), (ii) a TRP index associated with the second PUSCH corresponding to a TRP index associated with the second UCI (e.g., the second PUSCH and the second UCI correspond to the same TRP index), (iii) a TRP group index associated with the second PUSCH corresponding to a TRP group index associated with the second UCI (e.g., the second PUSCH and the second UCI correspond to the same TRP group index), (iv) the second PUCCH (for the second UCI, for example) and the second PUSCH being associated with the second joint/UL TCI state, and/or (v) the second PUCCH and the second PUSCH being associated with a same CORESET pool index (e.g., CORESETPoolIndex).

In one embodiment, the UE selects the second PUSCH for multiplexing the second UCI. In an example, the second PUSCH transmitted on the first cell may comprise the second UCI (e.g., the second PUSCH transmitted on the first cell comprises at least a portion of the second UCI). In some examples, the UE may multiplex at least a portion of the second UCI into the second PUSCH.

In one embodiment, the second PUSCH transmitted on the first cell does not comprise the first UCI (e.g., only the first PUSCH comprises the first UCI).

In one embodiment, the second PUSCH transmitted on the first cell comprises the first UCI.

In one embodiment, the second PUSCH transmitted on the first cell comprises the second UCI.

In one embodiment, the UE receives a UL grant indicating a third PUSCH on a second cell. In some examples, the second PUCCH (for the second UCI, for example) and the third PUSCH are associated with the same joint/UL TCI state (e.g., 2-nd joint/UL TCI state). In some examples, the second PUCCH and the third PUSCH are associated with a same CORESET pool index (e.g., CORESETPoolIndex). In some examples, the third PUSCH overlaps with the first UCI in time domain. In some examples, the third PUSCH overlaps with the second UCI in time domain. In some examples, the third PUSCH is in the TTI.

In one embodiment, based on the second cell having a lower cell index than the first cell, the UE transmits the third PUSCH, comprising the second UCI, on the second cell, wherein the UE is configured with the separate HARQ feedback mode. In some examples, the first PUSCH transmitted on the first cell does not comprise the second UCI and/or the second PUSCH transmitted on the first cell does not comprise the second UCI. For example, the UE may multiplex the second UCI into the third PUSCH.

In one embodiment, the UE performs, based on the UE being configured with sDCI mTRP or mDCI mTRP (e.g., based on whether the UE is configured with sDCI mTRP or mDCI mTRP and/or based on other information in addition to whether the UE is configured with sDCI mTRP or mDCI mTRP), one of the following PUSCH selection acts: (i) selecting the first PUSCH for multiplexing the first UCI and selecting the second PUSCH for multiplexing the second UCI, respectively, (ii) selecting the first PUSCH for multiplexing both the first UCI and the second UCI, or (iii) selecting both the first PUSCH and the second PUSCH for multiplexing both the first UCI and the second UCI. For example, the UE may select a selection act (e.g., one selection act) from among the PUSCH selection acts based on the UE being configured with sDCI mTRP or mDCI mTRP (e.g., the UE may select the selection act based on whether the UE is configured with sDCI mTRP or mDCI mTRP and/or based on other information in addition to whether the UE is configured with sDCI mTRP or mDCI mTRP).

In one embodiment, the UE selects the first PUSCH for multiplexing both the first UCI and the second UCI based on the UE being configured with sDCI mTRP and (i) a first SRS resource set index associated with the first PUSCH being lower than a second SRS resource set index associated with the second PUSCH, (ii) a first TRP index associated with the first PUSCH being lower than a second TRP index associated with the second PUSCH, (iii) a first TRP group index associated with the first PUSCH being lower than a second TRP group index associated with the second PUSCH, and/or (iv) a first CORESET pool index (e.g., CORESETPoolIndex) associated with the first PUSCH being lower than a second CORESET pool index (e.g., CORESETPoolIndex) associated with the second PUSCH.

In one embodiment, the UE selects both the first PUSCH and the second PUSCH for multiplexing both the first UCI and the second UCI based on the UE being configured with sDCI mTRP.

In one embodiment, the UE selects the first PUSCH for multiplexing the first UCI and selects the second PUSCH for multiplexing the second UCI, respectively, based on the UE being configured with mDCI mTRP and (i) the first PUCCH and the first PUSCH being associated with same TCI state, (ii) the first PUCCH and the first PUSCH being associated with same CORESET pool index (e.g., CORESETPoolIndex), (iii) the second PUCCH and the second PUSCH being associated with same TCI state, and/or (iv) the second PUCCH and the second PUSCH being associated with same CORESET pool index (e.g., CORESETPoolIndex).

In one embodiment, the UE performs, based on the UE being configured with joint HARQ feedback mode or separate HARQ feedback mode (e.g., based on whether the UE is configured with joint HARQ feedback mode or separate HARQ feedback mode and/or based on other information in addition to whether the UE is configured with joint HARQ feedback mode or separate HARQ feedback mode), one of the following PUSCH selection acts: (i) selecting the first PUSCH for multiplexing the first UCI and selecting the second PUSCH for multiplexing the second UCI, respectively, or (ii) selecting the first PUSCH for multiplexing both the first UCI and the second UCI. For example, the UE may select a selection act (e.g., one selection act) from among the PUSCH selection acts based on the UE being configured with joint HARQ feedback mode or separate HARQ feedback mode (e.g., the UE may select the selection act based on whether the UE is configured with joint HARQ feedback mode or separate HARQ feedback mode and/or based on other information in addition to whether the UE is configured with joint HARQ feedback mode or separate HARQ feedback mode).

In one embodiment, the UE selects the first PUSCH for multiplexing both the first UCI and the second UCI based on the UE being configured with joint HARQ feedback mode and (i) a first SRS resource set index associated with the first PUSCH being lower than a second SRS resource set index associated with the second PUSCH, (ii) a first TRP index associated with the first PUSCH being lower than a second TRP index associated with the second PUSCH, (iii) a first TRP group index associated with the first PUSCH being lower than a second TRP group index associated with the second PUSCH, and/or (iv) a first CORESET pool index (e.g., CORESETPoolIndex) associated with the first PUSCH being lower than a second CORESET pool index (e.g., CORESETPoolIndex) associated with the second PUSCH.

In one embodiment, the UE selects the first PUSCH for multiplexing the first UCI and selects the second PUSCH for multiplexing the second UCI, respectively, based on the UE being configured with separate HARQ feedback mode and (i) the first PUCCH and the first PUSCH being associated with same TCI state, (ii) the first PUCCH and the first PUSCH being associated with same CORESET pool index (e.g., CORESETPoolIndex), (iii) the second PUCCH and the second PUSCH being associated with same TCI state, and/or (iv) the second PUCCH and the second PUSCH being associated with same CORESET pool index (e.g., CORESETPoolIndex).

In one embodiment, the UE determines, based upon a type of UCI of the first UCI, a selection function. The UE selects the first PUSCH for multiplexing the first UCI according to the selection function.

In one embodiment, the UE determines whether the first UCI is (i) a first type of UCI comprising periodic CSI (e.g., periodic CSI report) and/or HARQ (e.g., HARQ information, such as HARQ feedback information) or (ii) a second type of UCI comprising aperiodic CSI (e.g., aperiodic CSI report) and/or semi-persistent CSI (e.g., semi-persistent CSI report). The UE determines the selection function based on whether the first UCI is the first type or the second type of UCI. The UE selects the first PUSCH for multiplexing the first UCI according to the selection function.

In one embodiment, the first PUSCH for multiplexing the first UCI is selected according to a selection function.

In some examples, the selection function comprises a first selection function corresponding to selecting the first PUSCH for multiplexing the first UCI based on (i) a first SRS resource set index associated with the first PUSCH being lower than a second SRS resource set index associated with the second PUSCH, (ii) a first TRP index associated with the first PUSCH being lower than a second TRP index associated with the second PUSCH, and/or (iii) a first TRP group index associated with the first PUSCH being lower than a second TRP group index associated with the second PUSCH.

In some examples, the selection function comprises a second selection function corresponding to selecting both the first PUSCH and the second PUSCH for multiplexing the first UCI. In an example in which the UE selects both the first PUSCH and the second PUSCH for multiplexing the first UCI (according to the second selection function, for example), the first PUSCH transmitted on the first cell may comprise at least a portion of the first UCI and the second PUSCH transmitted on the first cell may comprise at least a portion of the first UCI. For example, the UE may multiplex at least a portion of the first UCI into the first PUSCH and at least a portion of the first UCI into the second PUSCH. In some examples, the UE may multiplex (i) an entirety of the first UCI into the first PUSCH and (ii) the (same) entirety of the first UCI into the second PUSCH. In some examples, the UE may multiplex (i) a first portion of the first UCI into the first PUSCH and (ii) the (same) first portion of the first UCI into the second PUSCH.

In some examples, the selection function comprises a third selection function corresponding to selecting the first PUSCH for multiplexing the first UCI and/or selecting the second PUSCH for multiplexing the second UCI based on (i) the first SRS resource set index associated with the first PUSCH corresponding to a SRS resource set index associated with the first UCI (e.g., the first PUSCH and the first UCI are both associated with the same SRS resource set index), (ii) the first TRP index associated with the first PUSCH corresponding to a TRP index associated with the first UCI (e.g., the first PUSCH and the first UCI are both associated with the same TRP index), (iii) the first TRP group index associated with the first PUSCH corresponding to a TRP group index associated with the first UCI (e.g., the first PUSCH and the first UCI are both associated with the same TRP group index), and/or (iv) the first PUCCH (for the first UCI, for example) being associated with the first joint/UL TCI state. In an example in which the UE selects the first PUSCH for multiplexing the first UCI and/or the second PUSCH for multiplexing the second UCI (according to the third selection function, for example), the first PUSCH transmitted on the first cell may comprise at least a portion of the first UCI and the second PUSCH transmitted on the first cell may comprise at least a portion of the second UCI. For example, the UE may multiplex at least a portion of the first UCI into the first PUSCH and at least a portion of the second UCI into the second PUSCH.

In one embodiment, the UE may use (and/or may be allowed to use) the first selection function, the second selection function and/or the third selection function to select one or more PUSCHs (e.g., the first PUSCH) for multiplexing the first UCI (and/or the second UCI) based on the UE being configured with sDCI mTRP (e.g., the UE may be configured with a configuration for performing sDCI mTRP transmission, such as performing concurrent transmissions on multiple TRPs based on one DCI).

In one embodiment, the UE may use (and/or may be allowed to use) the first selection function, the second selection function and/or the third selection function to select one or more PUSCHs (e.g., the first PUSCH) for multiplexing the first UCI (and/or the second UCI) based on the UE being configured with joint HARQ feedback mode. In some examples, the joint HARQ feedback mode is associated with transmitting UCIs for different TRPs in the same PUCCH or the same PUSCH. In some examples, when the UE is configured with mDCI mTRP with the joint HARQ feedback mode, the UE transmits UCIs for different TRPs in the same PUCCH or the same PUSCH.

In one embodiment, the UE may use (and/or may be allowed to use) the first selection function, the second selection function and/or the third selection function to select one or more PUSCHs (e.g., the first PUSCH) for multiplexing the first UCI (and/or the second UCI) based on (i) the UE being configured with sDCI mTRP (e.g., the UE may be configured with a configuration for performing sDCI mTRP transmission, such as performing concurrent transmissions on multiple TRPs based on one DCI), (ii) the first PUSCH and the second PUSCH being scheduled and/or configured by one DCI and/or one CG PUSCH configuration, (iii) the UE not being configured with a CORESET pool index (e.g., CORESETPoolIndex), (iv) the UE being configured with a TRP group index, and/or (v) the UE being configured with joint HARQ feedback mode. In some examples, sDCI mTRP may be used for ideal backhaul between two TRPs, wherein one DCI from one TRP (of the two TRPs, for example) can schedule transmission (e.g., UL transmission) for the two TRPs. In some examples, the joint HARQ feedback mode is associated with transmitting UCIs for different TRPs in the same PUCCH or the same PUSCH. In some examples, when the UE is configured with mDCI mTRP with the joint HARQ feedback mode, the UE transmits UCIs for different TRPs in the same PUCCH or the same PUSCH.

In one embodiment, the UE may use (and/or may be allowed to use) the third selection function to select one or more PUSCHs (e.g., the first PUSCH) for multiplexing the first UCI (and/or the second UCI) based on (i) the UE being configured with mDCI mTRP (e.g., the UE may be configured with a configuration for performing mDCI mTRP transmission), (ii) the first PUSCH being scheduled and/or configured by a first DCI and/or a first CG PUSCH configuration and the second PUSCH being scheduled and/or configured by a second DCI (different than the first DCI) and/or a second CG PUSCH configuration (different than the first CG PUSCH configuration), and/or (iii) the UE being configured with a CORESET pool index (e.g., CORESETPoolIndex), and/or (iv) the UE being configured with separate HARQ feedback mode. In some examples, mDCI mTRP may be used for non-ideal backhaul between two TRPs, wherein each TRP of the two TRPs is associated with a respective DCI and/or scheduling information, and/or wherein cross-TRP is not allowed. In some examples, separate HARQ feedback mode is associated with transmitting UCIs for different TRPs in different PUCCHs and/or different PUSCHs. In some examples, when the UE is configured with mDCI mTRP with separate HARQ feedback mode, the UE transmits UCIs for different TRPs in different PUCCHs or different PUSCHs.

In one embodiment, the UE may use (and/or may be allowed to use) the third selection function to select one or more PUSCHs (e.g., the first PUSCH) for multiplexing the first UCI (and/or the second UCI) based on the UE being configured with mDCI mTRP (e.g., the UE may be configured with a configuration for performing mDCI mTRP transmission).

In one embodiment, the UE may use (and/or may be allowed to use) the third selection function to select one or more PUSCHs (e.g., the first PUSCH) for multiplexing the first UCI (and/or the second UCI) based on the UE being configured with separate HARQ feedback mode. In some examples, separate HARQ feedback mode is associated with transmitting UCIs for different TRPs in different PUCCHs and/or different PUSCHs. In some examples, when the UE is configured with mDCI mTRP with separate HARQ feedback mode, the UE transmits UCIs for different TRPs in different PUCCHs or different PUSCHs.

In an example, the UE may select one or more PUSCHs (e.g., the first PUSCH) (from the first PUSCH and the second PUSCH, for example) for multiplexing the first UCI in response to a determination that (i) the UE is configured with sDCI mTRP (e.g., the UE may be configured with a configuration for performing sDCI mTRP transmission, such as performing concurrent transmissions on multiple TRPs based on one DCI), (ii) the first PUSCH and the second PUSCH being scheduled and/or configured by one DCI and/or one CG PUSCH configuration, (iii) the UE not being configured with a CORESET pool index (e.g., CORESETPoolIndex), and/or (iv) the UE being configured with a TRP group index. In some examples, the UE may determine which selection function to use (from among a plurality of selection functions comprising the first selection function, the second selection function, the third selection function and/or one or more other selection functions, for example) based on whether the first UCI is the first type of UCI or the second type of UCI, and/or based on other information associated with the first UCI, the first PUSCH and/or the second PUSCH.

In an example, the UE may use the first selection function (to select the one or more PUSCHs, for example) based on a determination that the first UCI is the first type of UCI (and that the UE is configured with sDCI mTRP, for example). Alternatively and/or additionally, the UE may use the second selection function (to select the one or more PUSCHs, for example) based on a determination that the first UCI is the first type of UCI (and that the UE is configured with sDCI mTRP, for example). Alternatively and/or additionally, the UE may use the third selection function (to select the one or more PUSCHs, for example) based on a determination that the first UCI is the first type of UCI. Alternatively and/or additionally, the UE may use the first selection function (to select the one or more PUSCHs, for example) based on a determination that the first UCI is the second type of UCI (and that the UE is configured with sDCI mTRP, for example). Alternatively and/or additionally, the UE may use the second selection function (to select the one or more PUSCHs, for example) based on a determination that the first UCI is the second type of UCI (and that the UE is configured with sDCI mTRP, for example). Alternatively and/or additionally, the UE may use the third selection function (to select the one or more PUSCHs, for example) based on a determination that the first UCI is the second type of UCI.

In an example scenario in which the UE uses the first selection function to select the one or more PUSCHs (e.g., the first PUSCH), the UE may select the first PUSCH for multiplexing the first UCI based on (i) the first SRS resource set index associated with the first PUSCH being lower than the second SRS resource set index associated with the second PUSCH, (ii) the first TRP index associated with the first PUSCH being lower than the second TRP index associated with the second PUSCH, (iii) the first TRP group index associated with the first PUSCH being lower than the second TRP group index associated with the second PUSCH, and/or (iv) the first PUCCH (for the first UCI, for example) being associated with the first joint/UL TCI state In the example scenario, the UE may multiplex the first UCI (e.g., at least a portion of the first UCI) into the first PUSCH, and/or transmit the first PUSCH comprising the first UCI on the first cell. In the example scenario, in some examples, the UE does not multiplex the first UCI into the second PUSCH (e.g., only the first PUSCH is selected for multiplexing the first UCI and/or the second PUSCH is not selected for multiplexing the first UCI).

In an example scenario in which the UE uses the second selection function to select the one or more PUSCHs (e.g., the first PUSCH), the UE may select both the first PUSCH and the second PUSCH for multiplexing the first UCI. In the example scenario, the UE may multiplex the first UCI (e.g., at least a portion of the first UCI) into the first PUSCH and may multiplex the first UCI (e.g., at least a portion of the first UCI) into the second PUSCH. In the example scenario, the UE may transmit (e.g., concurrently transmit), on the first cell, the first PUSCH comprising the first UCI and the second PUSCH comprising the first UCI.

In an example scenario in which the UE uses the third selection function to select the one or more PUSCHs (e.g., the first PUSCH), the UE may select the first PUSCH for multiplexing the first UCI and select the second PUSCH for multiplexing the second UCI based on (i) the first SRS resource set index associated with the first PUSCH corresponding to a SRS resource set index associated with the first UCI (e.g., the first PUSCH and the first UCI are both associated with the same SRS resource set index), (ii) the first TRP index associated with the first PUSCH corresponding to a TRP index associated with the first UCI (e.g., the first PUSCH and the first UCI are both associated with the same TRP index), (iii) the first TRP group index associated with the first PUSCH corresponding to a TRP group index associated with the first UCI (e.g., the first PUSCH and the first UCI are both associated with the same TRP group index), and/or (iv) the first PUCCH (for the first UCI, for example) being associated with the first joint/UL TCI state. In the example scenario, the UE may multiplex the first UCI (e.g., at least a portion of the first UCI) into the first PUSCH and multiplex the second UCI (e.g., at least a portion of the second UCI) into the second PUSCH. In the example scenario, the UE may transmit the first PUSCH comprising the first UCI on the first cell and may transmit the second PUSCH comprising the second UCI on the first cell.

In one embodiment, the UE supports concurrent uplink transmission on the first cell via multiple UE panels. For example, the UE has capability to concurrently transmit multiple uplink transmissions (e.g., PUSCH and/or PUCCH transmissions) on the first cell.

In one embodiment, the second PUSCH is transmitted on the first cell without multiplexing the first UCI (e.g., the second PUSCH may be transmitted on the first cell without multiplexing the first UCI into the second PUSCH). For example, the UE determines not to multiplex the first UCI into the second PUSCH based on the UE selecting only the first PUSCH for multiplexing the first UCI (and/or based on the UE not selecting the second PUSCH for multiplexing the first UCI, for example). The second PUSCH transmitted on the first cell may not comprise the first UCI.

In one embodiment, a cell index of the first cell corresponds to a serving cell index (e.g., ServCellIndex).

In one embodiment, the UE receives one or more second signals indicative of a fourth PUSCH and a fifth PUSCH on the first cell in a second TTI, wherein a starting symbol of the fourth PUSCH is earlier than a starting symbol of the fifth PUSCH. The one or more second signals may comprise one or more second UL grants and/or one or more second configurations (indicating the fourth PUSCH and the fifth PUSCH on the first cell in the second TTI, for example). In an example, the one or more signals may schedule and/or configure one or more resources (e.g., one or more time resources and/or one or more frequency resources) for the fourth PUSCH and/or the fifth PUSCH. In some examples, the fourth PUSCH at least partially overlaps the fifth PUSCH. In some examples, the fourth PUSCH does not overlap with the fifth PUSCH. In some examples, the UE determines to transmit a third UCI in the second TTI (and on the first cell, for example), wherein the third UCI overlaps (e.g., at least partially overlaps) with the fourth PUSCH and the fifth PUSCH in time domain.

In one embodiment, the UE selects the fourth PUSCH to comprise (and/or multiplex) the third UCI based on the UE being configured with the joint HARQ feedback mode and the fourth PUSCH being earlier than the fifth PUSCH. In some examples, the UE transmits the fourth PUSCH and the fifth PUSCH on the first cell, wherein the fourth PUSCH transmitted on the first cell comprises the third UCI (e.g., only the fourth PUSCH comprises the third UCI) and the fifth PUSCH transmitted on the first cell does not comprise the third UCI.

In one embodiment, the UE selects the fifth PUSCH to comprise (and/or multiplex) the third UCI based on the UE being configured with the separate HARQ feedback mode and (i) a third PUCCH and the fifth PUSCH being associated with a same TCI state, wherein the third PUCCH is associated with the third UCI, and/or (ii) the third PUCCH and the fifth PUSCH being associated with a same CORESET pool index (e.g., CORESETPoolIndex). In some examples, the UE transmits the fourth PUSCH and the fifth PUSCH on the first cell, wherein the fifth PUSCH transmitted on the first cell comprises the third UCI (e.g., only the fifth PUSCH comprises the third UCI) and the fourth PUSCH transmitted on the first cell does not comprise the third UCI.

In one embodiment, the selection function comprises a rule.

In the present disclosure, instances in which a channel (e.g., PUSCH) is selected for multiplexing a UCI may be supplemented with the channel being selected to comprise (e.g., carry) the UCI. For example, the UE selecting the first PUSCH for multiplexing the first UCI (in step 1415 of FIG. 14, for example) may be supplemented with (and/or replaced with) the UE selecting the first PUSCH to comprise (e.g., carry) the first UCI (e.g., the first PUSCH may be selected for use in transmitting the first UCI on the first cell, such as by way of inserting, the first UCI into the first PUSCH and/or transmitting the first PUSCH, comprising the first UCI, on the first cell, wherein the first UCI may be inserted into the first PUSCH via multiplexing the first UCI into the first PUSCH).

Embodiments are contemplated in which techniques of the present disclosure (e.g., techniques provided with respect to FIG. 14 and/or other techniques herein) are used (by the UE, for example) to select the first PUSCH (and/or another PUSCH) for multiplexing the first UCI based upon other information other than (and/or in addition to) whether the UE is configured with joint HARQ feedback mode or separate HARQ feedback mode (e.g., the UE may select one or more PUSCHs, such as the first PUSCH and/or the second PUSCH, for multiplexing the first UCI without considering joint HARQ feedback mode or separate HARQ feedback mode).

Referring back to FIGS. 3 and 4, in one exemplary embodiment of a UE, the device 300 includes a program code 312 stored in the memory 310. The CPU 308 may execute program code 312 to enable the UE (i) to receive one or more signals indicative of a first PUSCH a second PUSCH on a first cell and in a TTI, wherein a starting symbol of the first PUSCH is the same as a starting symbol of the second PUSCH, (ii) to determine to transmit a first UCI in the TTI, wherein the first UCI overlaps with the first PUSCH and the second PUSCH in time domain, (iii) to select the first PUSCH for multiplexing the first UCI based on at least the UE being configured with joint Hybrid Automatic Repeat Request (HARQ) feedback mode or separate HARQ feedback mode, and (iv) to transmit the first PUSCH and the second PUSCH on the first cell, wherein the first PUSCH comprises the first UCI. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 10-14. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 10-14, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node), such as due, at least in part, to enabling the devices to perform UCI transmission (e.g., enhanced UCI transmission) with concurrent (e.g., simultaneous) uplink transmission via multiple panels.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method for a User Equipment (UE), the method comprising:
   receiving one or more signals indicative of:
      a first Physical Uplink Shared Channel (PUSCH) on a first cell and in a Transmission Time Interval (TTI); and
      a second PUSCH on the first cell and in the TTI, wherein a starting symbol of the first PUSCH is the same as a starting symbol of the second PUSCH;
   determining to transmit a first Uplink Control Information (UCI) on the first cell, wherein the first UCI is associated with a first Physical Uplink Control Channel (PUCCH) overlapping with the first PUSCH and the second PUSCH in time domain; and
   when the UE is configured with joint Hybrid Automatic Repeat Request (HARQ) feedback mode, selecting a PUSCH, from the first PUSCH and the second PUSCH, for multiplexing the first UCI, wherein the PUSCH is associated with a Control Resource Set (CORESET) pool index corresponding to 0.

2. The method of claim 1, comprising:
   when the UE is configured with separate HARQ feedback mode, selecting the PUSCH, wherein the PUSCH is associated with a same CORESET pool index as the first PUCCH.

3. The method of claim 1, comprising:
   transmitting the first PUSCH and the second PUSCH on the first cell, wherein the PUSCH, selected from the first PUSCH and the second PUSCH, comprises the first UCI.

4. The method of claim 1, wherein:
   at least one of the first PUSCH or the second PUSCH transmitted on the first cell does not comprise the first UCI.

5. The method of claim 1, wherein at least one of:
   determining to transmit a second UCI on the first cell, wherein the second UCI is associated with a second PUCCH overlapping with the first PUSCH and the second PUSCH in time domain;
   the first UCI and the second UCI correspond to a same PUCCH group; or
   the first UCI corresponds to first HARQ information in response to a first downlink assignment by a first CORESET associated with a first CORESET pool index corresponding to 0, and the second UCI corresponds to second HARQ information in response to a second downlink assignment by a second CORESET associated with a second CORESET pool index corresponding to 1.

6. The method of claim 5, comprising:
   when the UE is configured with the joint HARQ feedback mode, selecting the PUSCH, from the first PUSCH and the second PUSCH, for multiplexing the second UCI.

7. The method of claim 6, comprising:
   at least one of the first PUSCH or the second PUSCH transmitted on the first cell does not comprise the second UCI.

8. The method of claim 5, comprising:
   when the UE is configured with separate HARQ feedback mode, selecting another PUSCH, from the first PUSCH and the second PUSCH, for multiplexing the second UCI, wherein the another PUSCH is associated with a same CORESET pool index as the second PUCCH.

9. The method of claim 5, wherein at least one of:
   the method comprises receiving a UL grant indicating a third PUSCH on a second cell;
   the second PUCCH, associated with the second UCI, and the third PUSCH are associated with a same Transmission Configuration Indicator (TCI) state;
   the second PUCCH and the third PUSCH are associated with a same CORESET pool index;
   the third PUSCH overlaps with the first PUCCH, associated with the first UCI, in time domain;
   the third PUSCH overlaps with the second PUCCH, associated with the second UCI, in time domain; or
   the third PUSCH is in the TTI.

10. The method of claim 9, comprising:
    based on the second cell having a lower cell index than the first cell when the UE is configured with separate HARQ feedback mode, transmitting the third PUSCH, comprising the second UCI, on the second cell.

11. The method of claim 1, wherein at least one of:
    the method comprises:
       receiving a first beam indication Downlink Control Information (DCI) indicating a first Transmission Configuration Indicator (TCI) state; and
       receiving a second beam indication DCI indicating a second TCI state, wherein at least one of the first TCI state or the second TCI state is configured for transmission of one or more UE-specific UL channels;
    a first signal of the one or more signals indicates that the first PUSCH is associated with the first TCI state;
    based on a first CORESET pool index associated with the first signal being 0, the first PUSCH is determined to be associated with the first TCI state;
    a second signal of the one or more signals indicates that the second PUSCH is associated with the second TCI state; or based on a second CORESET pool index associated with the second signal being 1, the second PUSCH is determined to be associated with the second TCI state.

12. The method of claim 1, wherein:
a first signal of the one or more signals schedules the first PUSCH, and
a second signal of the one or more signals schedules the second PUSCH.

13. The method of claim 11, wherein at least one of:
a third signal, comprising at least one of a first DCI signal or a first Radio Resource Control (RRC) signal, indicates that the first PUCCH is associated with the first TCI state;
a second UCI is associated with a second PUCCH; or
a fourth signal, comprising at least one of a second DCI signal or a second RRC signal, indicates that the second PUCCH is associated with the second TCI state.

14. The method of claim 1, comprising:
receiving one or more second signals indicative of a fourth PUSCH and a fifth PUSCH on the first cell in a second TTI, wherein a starting symbol of the fourth PUSCH is earlier than a starting symbol of the fifth PUSCH; and
determining to transmit a third UCI, wherein the third UCI is associated with a third PUCCH overlapping with the fourth PUSCH and the fifth PUSCH in time domain.

15. The method of claim 14, comprising at least one of:
selecting the fourth PUSCH, from the fourth PUSCH and the fifth PUSCH, to comprise the third UCI based on the UE being configured with the joint HARQ feedback mode and the fourth PUSCH being earlier than the fifth PUSCH; or
transmitting the fourth PUSCH and the fifth PUSCH on the first cell, wherein the fourth PUSCH transmitted on the first cell comprises the third UCI and the fifth PUSCH transmitted on the first cell does not comprise the third UCI.

16. The method of claim 14, comprising at least one of:
selecting the fifth PUSCH, from the fourth PUSCH and the fifth PUSCH, to comprise the third UCI based on the UE being configured with separate HARQ feedback mode and the third PUCCH and the fifth PUSCH being associated with a same CORESET pool index; or
transmitting the fourth PUSCH and the fifth PUSCH on the first cell, wherein the fifth PUSCH transmitted on the first cell comprises the third UCI and the fourth PUSCH transmitted on the first cell does not comprise the third UCI.

17. A User Equipment (UE) comprising:
a control circuit;
a processor installed in the control circuit; and
a memory installed in the control circuit and operatively coupled to the processor, wherein the processor is configured to execute a program code stored in the memory to perform operations, the operations comprising:
receiving one or more signals indicative of:
a first Physical Uplink Shared Channel (PUSCH) on a first cell and in a Transmission Time Interval (TTI); and
a second PUSCH on the first cell and in the TTI, wherein a starting symbol of the first PUSCH is the same as a starting symbol of the second PUSCH;
determining to transmit a first Uplink Control Information (UCI) on the first cell, wherein the first UCI is associated with a first Physical Uplink Control Channel (PUCCH) overlapping with the first PUSCH and the second PUSCH in time domain; and
when the UE is configured with joint Hybrid Automatic Repeat Request (HARQ) feedback mode, selecting a PUSCH, from the first PUSCH and the second PUSCH, to comprise the first UCI, wherein the PUSCH is associated with a Control Resource Set (CORESET) pool index corresponding to 0.

18. The UE of claim 17, the operations comprising:
when the UE is configured with separate HARQ feedback mode, selecting the PUSCH, wherein the PUSCH is associated with a same CORESET pool index as the first PUCCH.

19. The UE of claim 17, the operations comprising:
transmitting the first PUSCH and the second PUSCH on the first cell, wherein the PUSCH, selected from the first PUSCH and the second PUSCH, comprises the first UCI.

20. The UE of claim 17, wherein:
at least one of the first PUSCH or the second PUSCH transmitted on the first cell does not comprise the first UCI.

* * * * *